(12) United States Patent
Tamai et al.

(10) Patent No.: US 8,449,722 B2
(45) Date of Patent: May 28, 2013

(54) USED PAPER RECYCLING APPARATUS AND ITS CONSTITUTENT DEVICES

(75) Inventors: Shigeru Tamai, Osaka (JP); Yuji Koyama, Osaka (JP)

(73) Assignee: Seed Company Limited, Osaka (JP)

( * ) Notice: Subject to any disclaimer, the term of this patent is extended or adjusted under 35 U.S.C. 154(b) by 458 days.

(21) Appl. No.: 11/798,104

(22) Filed: May 10, 2007

(65) Prior Publication Data

US 2007/0267163 A1 Nov. 22, 2007

(30) Foreign Application Priority Data

May 19, 2006 (JP) ................................. 2006-140275

(51) Int. Cl.
*D21B 1/32* (2006.01)
*D21D 1/30* (2006.01)

(52) U.S. Cl.
USPC ............................................. 162/261; 162/8

(58) Field of Classification Search
USPC .................. 162/147, 212, 336, 261
See application file for complete search history.

(56) References Cited

U.S. PATENT DOCUMENTS

| | | | | | |
|---|---|---|---|---|---|
| 2,148,613 | A | * | 2/1939 | Frost | 162/336 |
| 3,357,880 | A | * | 12/1967 | Curtis | 162/344 |
| 4,141,388 | A | * | 2/1979 | Romanski et al. | 139/383 AA |
| 4,706,391 | A | * | 11/1987 | Urbas | 34/114 |
| 4,966,651 | A | * | 10/1990 | Olson et al. | 162/28 |
| 5,567,273 | A | * | 10/1996 | Offerhaus et al. | 162/199 |
| 2002/0152630 | A1 | * | 10/2002 | Lindsay et al. | 34/111 |
| 2007/0113994 | A1 | * | 5/2007 | Ogunjimi | 162/19 |

OTHER PUBLICATIONS

Smook, Handbook for Pulp and Paper Technologists, 1992, Angus Wilde Publications, 2nd edition, Chapters 13, 14, 16, 17, 23, and 34.*
Can-Am Machinery, The Story of the Eagle Paper Machine [downloaded online from www.canammachinery.com], downloaded on Jul. 20, 2009, whole document.*

* cited by examiner

*Primary Examiner* — Anthony Calandra
(74) *Attorney, Agent, or Firm* — Cheng Law Group, PLLC

(57) ABSTRACT

A used paper recycling apparatus being installed in a room of a small shop or the like, friendly to the environment, low in running cost, and capable of maintaining a high confidentiality. The apparatus includes, in an apparatus case of furniture size, a pulp making section for manufacturing used paper pulp by macerating and mashing used paper, a paper making section for manufacturing recycled paper by making the used paper pulp manufactured in the pulp making section, and a control section for driving and controlling the pulp making section and paper making section, in which the pulp making section comprises a macerating unit for macerating the used paper by agitating and tearing, and a mashing unit for mashing the used paper macerated in the macerating unit, and the mashing machine of the mashing unit has mashing members rotating relatively being disposed oppositely across a slight mashing clearance, and the opposing faces of these mashing members cooperate to form a mashing action surface, and the used paper passing the mashing clearance is pressurized and mashed by the mashing action surface, and the inks forming characters and patterns on the used paper are pulverized.

107 Claims, 33 Drawing Sheets

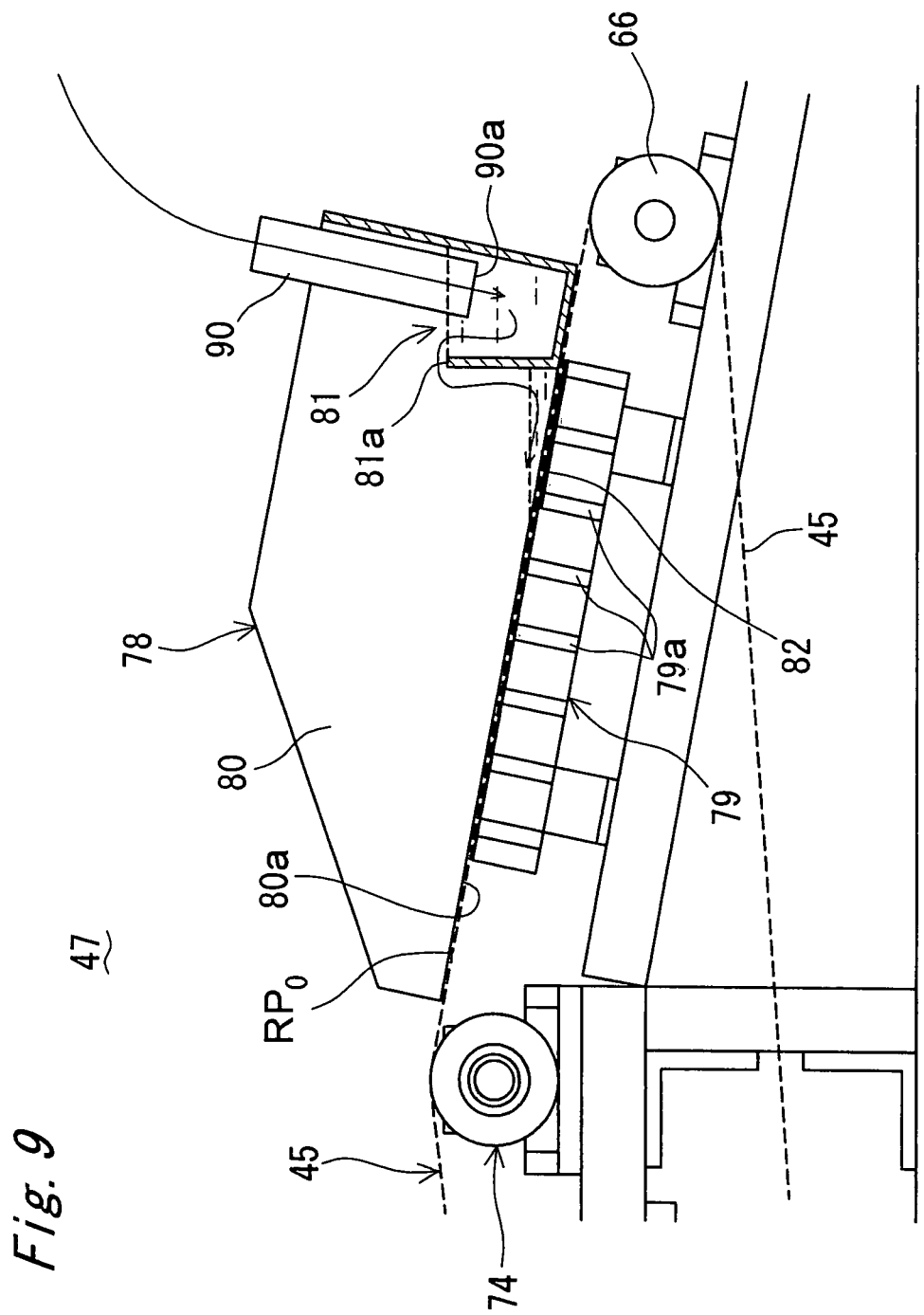

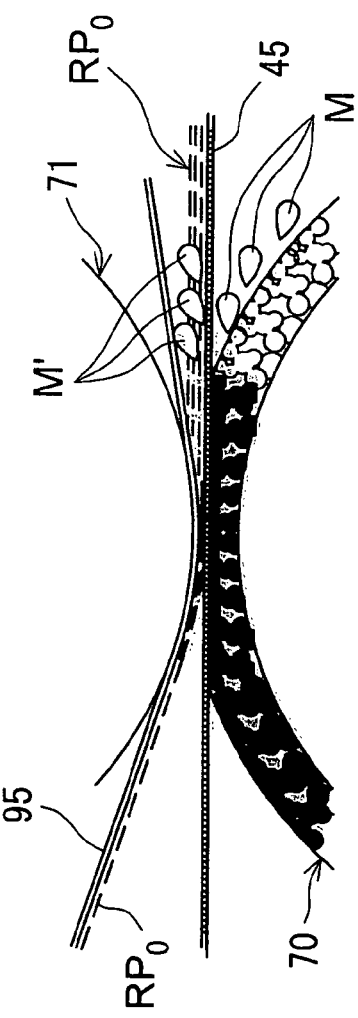
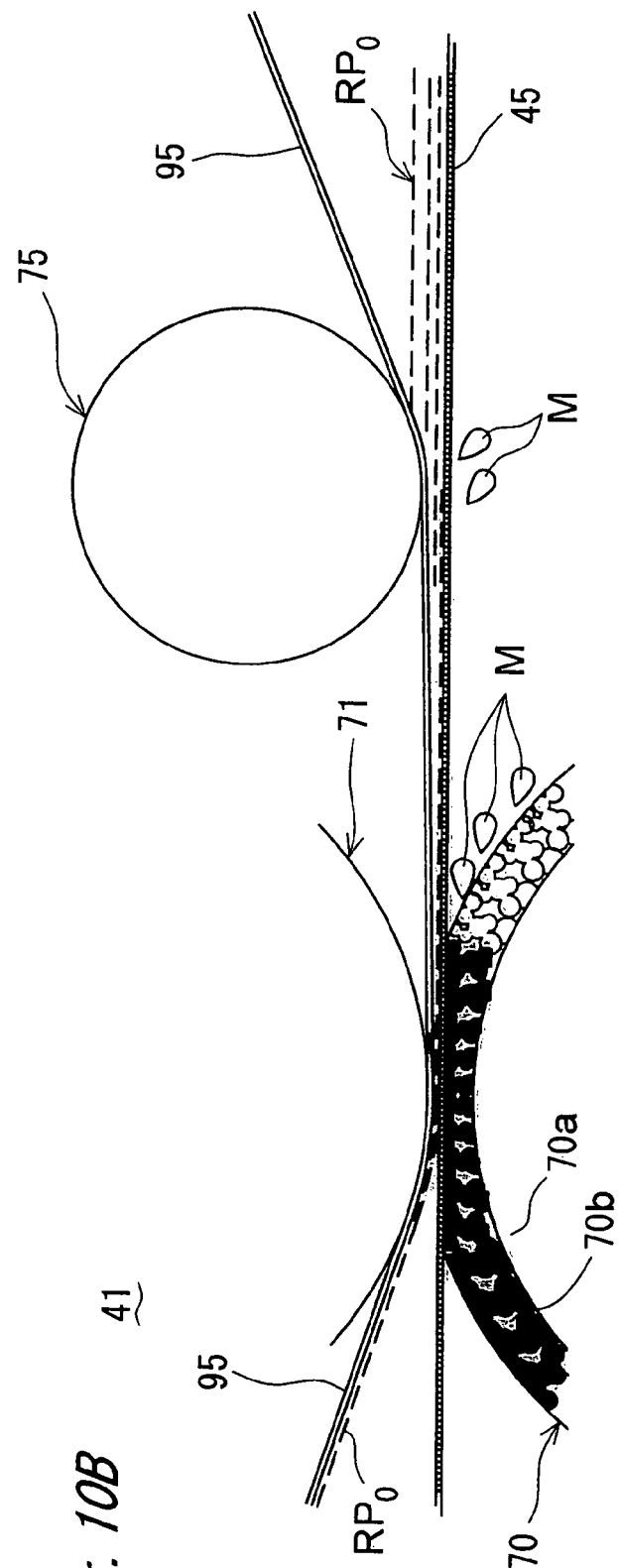
Fig. 10A
Fig. 10B

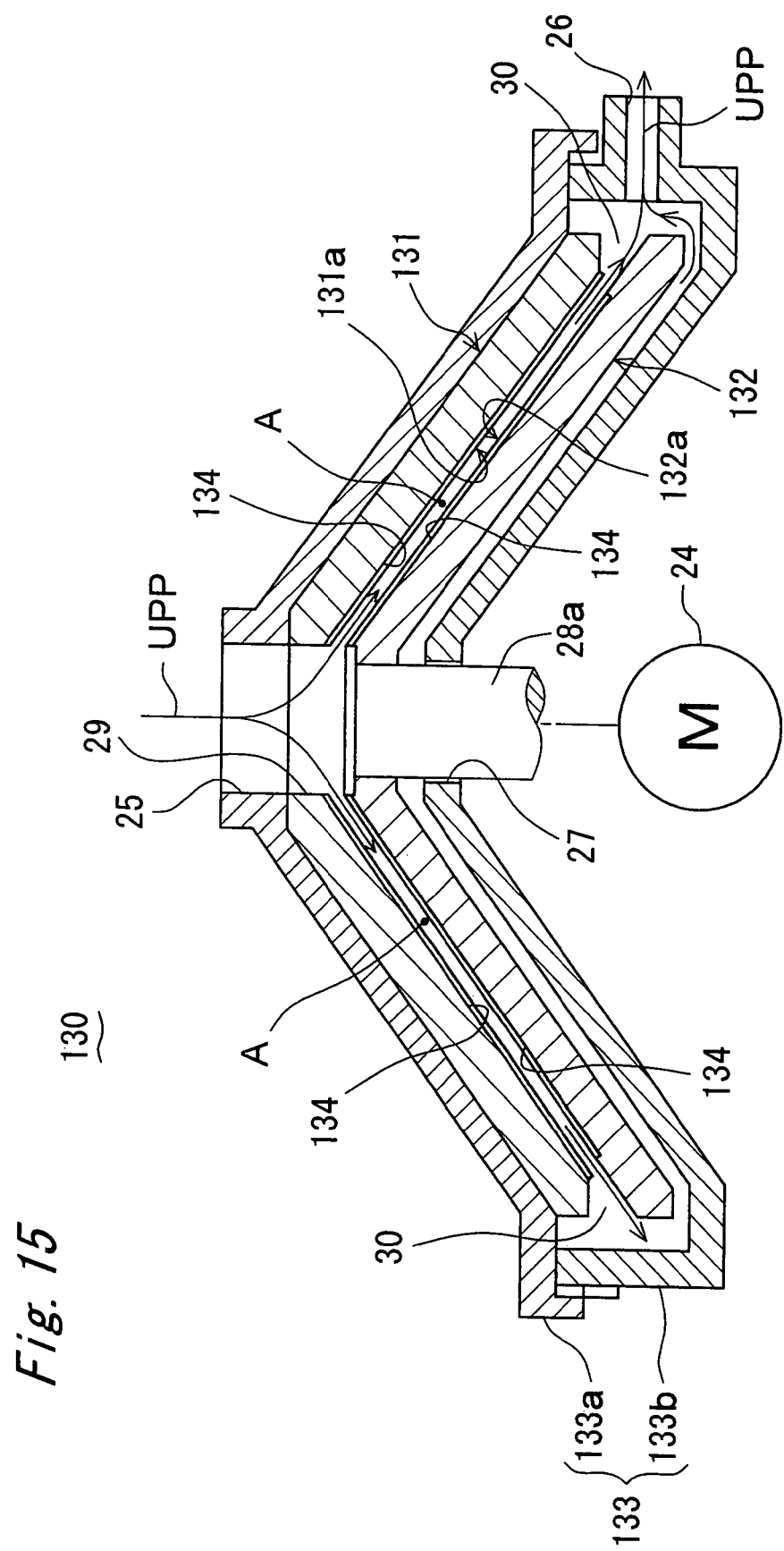

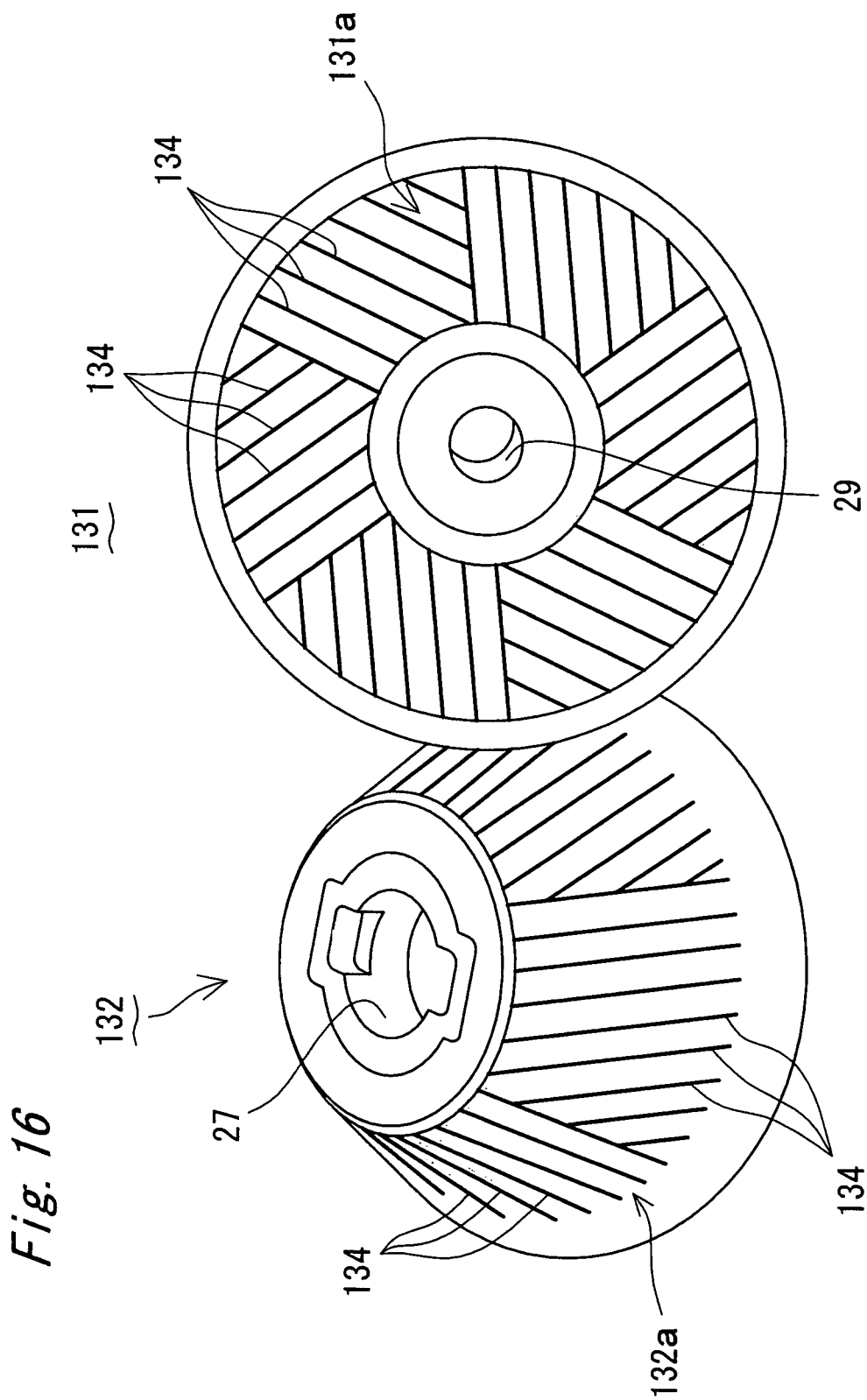

USED PAPER RECYCLING APPARATUS AND ITS CONSTITUTENT DEVICES

BACKGROUND OF THE INVENTION

1. Field of the Invention

The invention relates to a used paper recycling apparatus and its constituent devices, and more particularly to a used paper recycling technology for regenerating into recycled paper, at the site of origin of used paper, without discarding the used paper.

2. Description of the Related Art

Used paper of various types occurs not only in government offices or private companies, but also in daily life or general household. Used paper is usually discarded, incinerated, or disposed as refuse.

On the other hand, in the global concern about effective use of limited resources on earth, various technologies have been developed to regenerate and reuse the used paper being disposed and discarded so far.

Such used paper recycling technologies are mostly installed in paper making industry, and the water paper recycling plant requires, like the ordinary paper making plant, a vast land, an immense investment, and a huge quantity of water and chemicals for the purpose of high speed and mass production and high quality of recycled paper.

For recycling of used paper, a tremendous manual labor is needed for collecting used paper, and used paper collection involves various problems, such as mixing of foreign matter by garbage collectors, defective classification due to lack of knowledge about used paper recycling, and entry of harmful objects, and if used paper is collected, in order to recycle by 100 percent, final checking by specialists and cleaning works are needed. On the other hand, confidential documents are not easily recycled and are mostly incinerated, and the recycling rate is low.

To solve these problems of used paper recycling, an effective method is the technology capable of recycling at the site of origin of used paper, and from such point of view, a new system is proposed, for example, in Japanese Patent Application Laid-Open No. H6-134331.

This apparatus is a wet process shredder for shredding used paper into small pieces while adding a small mount of water, and shredded chips from the shredder are sent outside to a recycling plant, and used as material for recycled paper.

Shredded chips from the shredder are deformed into pulp, and are not in the state of piece of paper, and a high confidentiality is guaranteed, and it is expected to promote recycling of confidential documents.

This wet process shredder is a giant machine installed in a wide space, and it can be used only in a large office, and it is not suited to small office or general household. If shredded chips may be used as material for recycled paper, processing is possible only in large recycling plant, and the recycling cost is high and it is not economical.

SUMMARY OF THE INVENTION

It is a primary object of the invention to present a novel used paper recycling apparatus capable of solving such conventional problems.

It is other object of the invention to present a used paper recycling apparatus to be installed not only in a large office, but also in a small shop or a room in general household, friendly to the environment and low in running cost, capable of preventing leak of confidential information, private information, and other information, and keeping a high confidentiality.

It is another object of the invention to present constituent devices for constituting the used paper recycling apparatus preferably, that is, pulp making device, pulp concentration adjusting device, paper making device, and pulp feed device.

To achieve these objects, the used paper recycling apparatus of the invention includes, in an apparatus case of furniture size, a pulp making section for manufacturing used paper pulp by macerating and mashing used paper, a paper making section for manufacturing recycled paper by making the used paper pulp manufactured in the pulp making section, and a control section for driving and controlling the pulp making section and paper making section by interlocking, and the pulp making section comprises a macerating unit for macerating the used paper by agitating and tearing, and a mashing unit for mashing the used paper macerated in the macerating unit, and the mashing unit has at least one mashing machine, and this mashing machine includes a plurality of mashing members disposed oppositely across a slight mashing clearance and moving relatively, and the opposing faces of these mashing members cooperate to form a mashing action surface, and the used paper passing the mashing clearance is pressurized and mashed by the mashing action surface, and the inks forming characters and patterns on the used paper are pulverized.

"Smashing" is a process of controlling the fiber length by beating and grinding pulp fibers and fibrillating. "Inks" include printing inks for forming characters and patterns on the used paper by printing techniques, and inks forming characters and patterns on the used paper by pencil, ball-point pen, fountain pen, and other writing tools (these terms are meant the same throughout the specification and the claims).

Preferred embodiments include the following.

(1) The mashing machine comprises a mashing tank having a feed port and a discharge port communicating with an agitating tank of the macerating section, the plurality of mashing members disposed relatively movably in this mashing tank, and a drive source for relatively moving these mashing members, and the used paper pulp supplied into the feed port of the mashing tank from the agitating tank is pressurized and mashed by the mashing action surface while passing the mashing clearance of the mashing members, and the inks forming characters and patterns on the used paper are pulverized, and returned back to the agitating tank again from the discharge port of the mashing tank.

(2) The mashing section comprises a plurality of mashing machines, the feed port of the mashing machine at the uppermost upstream side communicates with the agitating tank of the macerating section, the discharge port of the mashing machine at the lowermost downstream side communicates with the agitating tank of the macerating section, and the mashing machines interposed between the mashing machines at the mashing machines at the uppermost upstream side and lowermost downstream side have their feed ports communicating with the discharge ports of the mashing machines adjacent to the upstream side, and their discharge ports communicating with the feed ports of the mashing machines adjacent to the downstream side, and the used paper pulp supplied into the feed port of the mashing tank at the uppermost upstream side from the agitating tank is pressurized and mashed by the mashing action surface while sequentially passing through the mashing clearances of the consecutive mashing machines, and the inks forming characters and patterns on the used paper are pulverized, and returned back to the agitating tank of the macerating section again from the discharge port of the mashing tank at the lowermost downstream side.

(3) The pulp making section is a circulation type in which the used paper pulp circulates between the macerating section and the mashing section in a specified time.

(4) The apparatus operates on a water circulation system in which the water used in the pulp making section is the water collected from the paper making section after dewatering.

(5) Drive sources of the pulp making section and paper making section are power drive sources driven by general household power source.

(6) The apparatus case is provided with moving means, and is movable on the floor.

(7) The macerating unit of the pulp making section includes agitating means for agitating used paper, and water feed means for supplying water to this agitating means, and the used paper supplied from the inlet of the apparatus case is agitated in water, and macerated and mashed.

(8) The agitating means includes a used paper inlet, an agitating tank for storing the water supplied from the water feed means, an agitating impeller rotatably provided in the agitating tank, and a drive motor for rotating and driving the agitating impeller.

(9) A shredder unit is provided at the inlet of the agitating unit, and the water paper charged in the inlet is preliminarily shredded by the shredder unit, and is agitated by the agitating impeller.

(10) The water feed means includes a white water collecting tank for collecting white water filtered and dewatered in the paper making section, and a water feed pump for supplying the water in the white water collecting tank to the agitating means of the pulp making section.

(11) The pulp making section is disposed at the downstream side of the agitating tank of the macerating section, and has pulp concentration adjusting means for adjusting the concentration of the used paper pulp supplied from the agitating tank, and this pulp concentration adjusting means includes a concentration adjusting tank for storing the used paper pulp supplied from the agitating tank, and concentration adjusting water feed means for supplying water to this concentration adjusting tank, and in the concentration adjusting tank, the used paper pulp supplied from the agitating tank is adjusted in concentration by the water added from the concentration adjusting water feed means, and a pulp suspension of specified concentration is produced.

(12) The concentration adjusting tank is designed to produce a pulp suspension of specified concentration by adding water from the concentration adjusting water feed means into the whole volume of the used paper pulp supplied from the agitating tank, and adjusting the total volume of used paper pulp and water may be a specified amount.

(13) The concentration adjusting tank is designed to produce a pulp suspension of specified concentration by dividing a specific portion from the whole volume of the waster paper pulp supplied from the agitating tank, adding water from the concentration adjusting water feed means into the divided portion, and adjusting the total volume of divided portion of used paper pulp and water may be a specified amount.

(14) The water feed means for supplying water to the agitating means also has a function as concentration adjusting water feed means.

(15) The paper making section includes a paper making net conveyor for making wet paper from mixed slurry pulp suspension of used paper pulp and water sent from the pulp making section, a drying belt conveyor for making recycled paper by drying the wet paper made and formed in the paper making net conveyor, and a dewatering roll for compressing and dewatering the wet paper at the junction of the paper making net conveyor and drying belt conveyor, and is designed to make paper from the pulp suspension supplied from the pulp making section, and dewater and dry.

(16) The paper making net conveyor has a mesh endless belt having a specified width for conveying the pulp suspension while making, a drive motor for moving and driving this mesh endless belt, and a pulp feeder for supplying the pulp suspension from the pulp making section onto the mesh endless belt, and this pulp feeder distributes and supplies the pulp suspension uniformly on the upper surface of the mesh endless belt.

(17) In the pulp feeder, the mesh endless belt is disposed obliquely upward toward the running direction, and the pulp feeder has a partition member slidably disposed on the downside of the mesh endless belt, and a paper making frame slidably disposed on the upside of the mesh endless belt, and the pulp suspension supplied into the paper making frame is uniformly diffused on the upside of the mesh endless belt by the stagnant action by cooperation of the paper making frame and partition member, and is conveyed together with the mesh endless belt while maintaining the width dimension defined by the paper making frame by the running action of the mesh endless belt, and is dewatered by the gravity filtering action by the mesh cells of the mesh endless belt.

(18) The partition member is formed in a louver structure for sliding and supporting the downside of the mesh endless belt.

(19) At the base end side position of the partition member, a flat member is provided for supporting the mesh cells of the mesh endless belt in closed state from the lower side, and overflow tank is provided in the paper making frame, and the pulp suspension supplied in the paper making frame is once stored in the overflow tank, and then overflows and flows down onto the flat member of the partition member.

(20) A meandering passage bending up and down is provided in the paper making frame, and at the outlet side position of the passage, a flat member is provided for covering the mesh cells of the mesh endless belt in closed state from the upper side, and the pulp suspension supplied in the paper making frame passes through the meandering passage, and flows on the flat member.

(21) At the leading edge of the flat member of the paper making frame, a thin guide sheet is provided for assuring a smooth flow of pulp suspension on the mesh endless belt, and the leading edge of this guide sheet is closely disposed at the upper position of the mesh endless belt supported by the beams for forming the louver structure of the partition member.

(22) The flat member of the paper making frame is set and disposed in a downward slope of downward inclination toward the running direction of the mesh endless belt.

(23) At the upstream side of the pulp feeder, a pulp feed tank is provided for storing the pulp suspension manufactured in the pulp making section, and the pulp suspension in the pulp feed tank is continuously supplied into the paper making frame of the pulp feeder by means of a suspension feed pump.

(24) The pulp feed tank includes agitating means for agitating the pulp suspension.

(25) The drying belt conveyor includes a smooth surface endless belt having a specified width for receiving and conveying the wet paper sent from the paper making net conveyor, a drive motor for moving and driving the smooth surface endless belt, and a heating and drying unit for heating and drying the wet paper on the smooth surface endless belt, and at the downstream side position of the dewatering roll, the squeezed and dewatered wet paper on the paper making net conveyor is transferred tightly and conveyed to the downside of the smooth surface endless belt by the smooth surface structure of the smooth surface endless belt.

(26) Running speed of the smooth surface endless belt is set larger than running speed of the mesh endless belt, and by difference in speed of the two belts, a tension is applied to the wet paper.

(27) The heating and drying unit has at least one heating unit provided along the running route of the smooth surface endless belt, and the wet paper on the smooth surface endless belt is heated and dried by the heating unit in the process of conveyance.

(28) The heating unit is provided at a plurality of positions, and heating temperature of each heating unit can be adjusted individually.

(29) The heating unit of the heating and drying unit is formed as a heater plate sliding on the opposite side of the holding side of the wet paper in the smooth surface endless belt, and the wet paper on the smooth surface endless belt is heated and dried indirectly by the smooth surface endless belt heated by the heater plate.

(30) The heating unit of the heating and drying unit is formed as a heater roll rolling and rotating on the wet paper on the smooth surface endless belt, and the wet paper on the smooth surface endless belt is heated and dried directly by the heater roll.

(31) The heating unit of the heating and drying unit is formed as a hot air heater for blowing hot air to the wet paper on the smooth surface endless belt, and the wet paper on the smooth surface endless belt is heated and dried directly by the hot air heater.

(32) The smooth surface endless belt is formed of a flexible heat resistant material capable of withstanding the heating action of the heating and drying unit.

(33) The smooth surface endless belt is a fluoroplastic belt.

(34) The smooth surface endless belt is a steel belt.

(35) The dewatering roll is rolls and squeezes the mesh endless belt of the paper making net conveyor and the smooth surface endless belt of the drying belt conveyor from upper and lower sides, and squeezes and dewaters the wet paper on the mesh endless belt.

(36) The dewatering roll includes a dewatering roll rolling on the mesh endless belt from the lower side, a press roll rolling and pressing the smooth surface endless belt together with the dewatering roll from the upper side, and a drive motor for rotating and driving the two rolls in cooperation, and by these two rolls, the mesh endless belt and smooth surface endless belt are rolled and squeezed from upper and lower sides, and the moisture contained in the wet paper on the mesh endless belt is absorbed in the dewatering roll by way of the mesh endless belt.

(37) The dewatering roll has a dewatering layer of porous material having fine and continuous pores wound on the outer circumference of a cylindrical roll of high rigidity material.

(38) The dewatering roll has a draining roll for squeezing and discharging the moisture contained in its dewatering layer, and this draining roll is rolls on the outer circumference of the dewatering roll in pressurized state, and along with the rotary motion of the dewatering roll, the draining roll rolls and squeezes the dewatering layer of the dewatering roll, and the moisture absorbed in the dewatering layer is squeezed and discharged.

(39) The press roll is a cylindrical roll composed of high rigidity material.

(40) At the downstream side of the dewatering roll, a preliminary dewatering roll is disposed to roll on the mesh endless belt from the lower side.

(41) The preliminary dewatering roll comprises a dewatering sheet of porous material having fine and continuous pores wound on the outer circumference of a cylindrical roll of high rigidity material.

(42) Near the upstream side position of the dewatering roll, a slurry preventive roll is disposed for rolling and pressing the smooth surface endless belt from the upper side.

(43) The slurry preventive roll is a cylindrical roll of high rigidity material.

(44) In the midst of running route of the smooth surface endless belt, a smooth surface finishing roll is disposed for rolling and pressing the wet paper on the smooth surface endless belt.

(45) The smooth surface finishing roll is provided in a plurality in parallel to the opposite side of the smooth surface endless belt, relatively to the heating unit provided along the running route of the smooth surface endless belt of the heating and drying unit.

(46) Crease preventive endless belts are suspended and supported on the plurality of smooth surface finishing rolls so as to be free to rotate and run, and the crease preventive endless belts apply tension while pressing from the upper side to the wet paper on the smooth surface endless belt, and prevent the wet paper from creasing, thereby maintaining smoothness.

(47) Running speed of the crease preventive endless belt is set larger than running speed of the smooth surface endless belt, and by difference in speed of the two belts, a tension is applied to the wet paper.

(48) The crease preventive endless belt comprises a permeable material enough to pass and evaporate moisture and steam remaining in the wet paper on the smooth surface endless belt.

(49) The crease preventive endless belt is a felt belt.

(50) The crease preventive endless belt is a mesh belt having fine mesh cells.

(51) The crease preventive endless belt is a belt of mesh base material having fine mesh cells coated with a felt material.

(52) The smooth surface finishing roll has a built-in heater, and functions also as heating roll.

(53) The heating and drying unit of the drying belt conveyor includes a steam collection unit for collecting the steam generated by heating and drying, and this steam collection unit has a steam collection chamber formed in the cover of the apparatus case, and an exhaust fan for exhausting the steam collection chamber.

(54) An exhaust duct is extending from the steam collection chamber to the white water collect tank of the water feed means, and an exhaust fan is provided at the exhaust port of the opposite exhaust duct in the white water collect tank, and the steam collected in the steam collection chamber is circulated and returned to the white water collect tank.

(55) A reflux route of steam to the white water collect tank is provided to intersect with drop collection route of filtered and dewatered white water in the white water collect tank.

(56) At the downstream side of the heating an drying unit of the smooth surface endless belt, a stripping member is provided for peeling off the dried paper on the smooth surface endless belt.

(57) At terminal end of drying belt conveyor, a size cutter is provided for cutting the recycled paper peeled from the smooth surface endless belt to a specified size.

(58) In the paper making section, the smooth surface endless belt of the drying belt conveyor and the mesh endless belt of the paper making net conveyor at the upstream side are laminated in upper and lower layers, and in the vertical adjacent parts of the smooth surface endless belt and mesh endless belt, the dewatering roll squeezes and rolls on the smooth surface endless belt and mesh endless belt from the upper and lower sides.

(59) The paper making net conveyor and drying belt conveyor are driven by a common drive source.

The used paper recycling apparatus in a second aspect of the invention includes, in an apparatus case of furniture size, a pulp making section for manufacturing used paper pulp by macerating and mashing used paper, and a paper making section for manufacturing recycled paper by making the used paper pulp manufactured in the pulp making section, and the pulp making section comprises a macerating unit for macerating the used paper by agitating and tearing, and a mashing unit for mashing the used paper macerated in the macerating unit, and the mashing unit has at least one mashing machine, and this mashing machine includes a plurality of mashing members disposed oppositely across a slight mashing clearance and moving relatively, and the opposing faces of these mashing members cooperate to form a mashing action surface, and the used paper passing the mashing clearance is pressurized and mashed by the mashing action surface, and the inks forming characters and patterns on the used paper are pulverized, and therefore being installed at the site of origin of used paper, the used paper is mashed by the pulp making section into used paper pulp, and the used paper pulp is made into recycled paper in the paper section, and hence the used paper is circulated and used as recycled paper at the site of origin.

Preferred embodiments include the following.

(1) The mashing machine comprises a mashing tank having a feed port and a discharge port communicating with an agitating tank of the macerating section, the plurality of mashing members disposed relatively movably in this mashing tank, and a drive source for relatively moving these mashing members, and the used paper pulp supplied into the feed port of the mashing tank from the agitating tank is pressurized and mashed by the mashing action surface while passing the mashing clearance of the mashing members, and the inks forming characters and patterns on the used paper are pulverized, and returned back to the agitating tank again from the discharge port of the mashing tank.

(2) The mashing section comprises a plurality of mashing machines, the feed port of the mashing machine at the uppermost upstream side communicates with the agitating tank of the macerating section, the discharge port of the mashing machine at the lowermost downstream side communicates with the agitating tank of the macerating section, and the mashing machines interposed between the mashing machines at the mashing machines at the uppermost upstream side and lowermost downstream side have their feed ports communicating with the discharge ports of the mashing machines adjacent to the upstream side, and their discharge ports communicating with the feed ports of the mashing machines adjacent to the downstream side, and the used paper pulp supplied into the feed port of the mashing tank at the uppermost upstream side from the agitating tank is pressurized and mashed by the mashing action surface while sequentially passing through the mashing clearances of the consecutive mashing machines, and the inks forming characters and patterns on the used paper are pulverized, and returned back to the agitating tank of the macerating section again from the discharge port of the mashing tank at the lowermost downstream side.

(3) The pulp making section is a circulation type in which the used paper pulp circulates between the macerating section and the mashing section in a specified time.

(4) The macerating unit of the pulp making section includes agitating means for agitating used paper, and water feed means for supplying water to this agitating means, and the used paper supplied from the inlet of the apparatus case is agitated in water, and macerated and mashed.

(5) The agitating means includes a used paper inlet, an agitating tank for storing the water supplied from the water feed means, an agitating impeller rotatably provided in the agitating tank, and a drive motor for rotating and driving the agitating impeller.

(6) The paper making section includes a paper making net conveyor for making wet paper from mixed slurry pulp suspension of used paper pulp and water sent from the pulp making section, a drying belt conveyor for making recycled paper by drying the wet paper made and formed in the paper making net conveyor, and a dewatering roll for compressing and dewatering the wet paper at the junction of the paper making net conveyor and drying belt conveyor, and is designed to make paper from the pulp suspension supplied from the pulp making section, and dewater and dry.

(7) The water used in the pulp making section is the water recirculated from the paper making section after dewatering and collection.

(8) The drive source of the pulp making section and paper making section is a power source driven by a general household power supply.

The pulp manufacturing apparatus of the invention is preferably used as a constituent device of the used paper recycling apparatus, being a pulp manufacturing apparatus for manufacturing used paper pulp by macerating and mashing the used paper in a used paper recycling apparatus of furniture size installed at the site of origin of used paper, composed of a macerating unit for macerating the used paper by agitating and tearing, and a mashing unit for mashing the used paper macerated in the macerating unit, and the mashing unit has at least one mashing machine, and this mashing machine includes a plurality of mashing members disposed oppositely across a slight mashing clearance and moving relatively, and the opposing faces of these mashing members cooperate to form a mashing action surface, and the used paper passing the mashing clearance is pressurized and mashed by the mashing action surface, and the inks forming characters and patterns on the used paper are pulverized.

Preferred embodiments include the following.

(1) The mashing machine comprises a mashing tank having a feed port and a discharge port communicating with an agitating tank of the macerating section, the plurality of mashing members disposed relatively movably in this mashing tank, and a drive source for relatively moving these mashing members, and the used paper pulp supplied into the feed port of the mashing tank from the agitating tank is pressurized and mashed by the mashing action surface while passing the mashing clearance of the mashing members, and the inks forming characters and patterns on the used paper are pulverized, and returned back to the agitating tank again from the discharge port of the mashing tank.

(2) The mashing section comprises a plurality of mashing machines, the feed port of the mashing machine at the uppermost upstream side communicates with the agitating tank of the macerating section, the discharge port of the mashing machine at the lowermost downstream side communicates with the agitating tank of the macerating section, and the mashing machines interposed between the mashing machines at the mashing machines at the uppermost upstream side and lowermost downstream side have their feed ports communicating with the discharge ports of the mashing machines adjacent to the upstream side, and their discharge ports communicating with the feed ports of the mashing machines adjacent to the downstream side, and the used paper pulp supplied into the feed port of the mashing tank at the uppermost upstream side from the agitating tank is pressurized and mashed by the mashing action surface while sequentially passing through the mashing clearances of the consecutive mashing machines, and the inks forming characters and patterns on the used paper are pulverized, and returned back to the agitating tank of the macerating section again from the discharge port of the mashing tank at the lowermost downstream side.

(3) The mashing machine includes a fixed mashing member fixed to the inside of the mashing tank, a rotating mashing member provided oppositely to the fixed mashing member, and a rotary drive source for rotating and driving the rotating mashing member, and an inlet communicating with the feed port of the mashing tank is formed near the center of the mashing action surface of the fixed mashing member, and the annular clearance formed between the outer peripheral edges of the mashing action surfaces of the both mashing members is an outlet communicating with the discharge port of the mashing tank.

(4) The opposing mashing action surfaces of the both mashing members are grindstone surfaces having multiple abrasive grains coupled by a binding material, and these two mashing action surfaces are formed in a taper shape gradually increased in diameter toward the mutually opposite directions, and mashing clearances of conical shape are formed between them.

(5) The mashing action surface at the rotating mashing member side has a plurality of guide ribs for guiding the used paper pulp flowing in from the inlet to the outlet.

(6) The opposing mashing action surfaces of the both mashing members are formed in a flat plane having multiple mashing grooves, and a mashing clearance formed in parallel at a close direction are provided between these mashing action surfaces.

(7) The opposing mashing action surfaces of the both mashing members are formed in a taper shape gradually increased in diameter downward, and a plurality of mashing grooves are provided, and mashing clearance formed of parallel conical planes at close distance are formed between these two mashing action surfaces.

(8) On the outer circumference of the rotating mashing member, blades are formed at specified intervals in the peripheral direction for acting as a pump for forcing out the used paper pulp from the outlet to the discharge port of the mashing tank.

(9) The mashing machine includes a fixed mashing member fixed to the inside of the mashing tank, a movable mashing member provided parallel and oppositely to the fixed mashing member, and a reciprocating drive source for moving the moving mashing member back and forth.

(10) The mashing machine includes a pair of fixed mashing members fixed to the upper and lower inside of the mashing tank, a rotating mashing member provided oppositely to these two fixed mashing members between the two fixed mashing members, and a rotary drive source for rotating and driving the rotating mashing member, and an inlet communicating with the feed port of the mashing tank is formed near the center of the mashing action surface of the upper fixed mashing member, and two annular clearances formed between the outer peripheral edges of the mashing action surfaces of the three mashing members are outlets communicating with the discharge port of the mashing tank, and the mutually opposite mashing action surfaces of the mashing members are grindstone surfaces having multiple abrasive grains coupled by a binding material, and these two mashing action surfaces are formed in a taper shape gradually increased in diameter toward the mutually opposite directions, and mashing clearances of conical shape are formed between them.

(11) Near the center of the rotating mashing member, blades are formed at specified intervals in the peripheral direction for passing the used paper pulp from the inlet into the upper and lower mashing clearances and forcing out toward the outlet.

(12) The pulp making section is a circulation type in which the used paper pulp circulates between the macerating section and the mashing section in a specified time.

(13) The macerating unit of the pulp making section includes agitating means for agitating used paper, and water feed means for supplying water to this agitating means, and the used paper supplied from the inlet of the apparatus case is agitated in water, and macerated and mashed.

(14) The agitating means includes a used paper inlet, an agitating tank for storing the water supplied from the water feed means, an agitating impeller rotatably provided in the agitating tank, and a drive motor for rotating and driving the agitating impeller.

(15) A shredder is provided at the inlet of the agitating tank, and the used paper supplied in the inlet is preliminarily shredded by the shredder, and is agitated by the agitating impeller.

The concentration adjusting apparatus of the invention is preferably used as a constituent device of the used paper recycling apparatus, being a pulp concentration adjusting apparatus for adjusting the concentration of used paper pulp provided in the pulp manufacturing apparatus for manufacturing used paper pulp by macerating and mashing the used paper, in a used paper recycling apparatus of furniture size installed at the site of origin of used paper, composed of a concentration adjusting tank for storing the used paper pulp manufactured in the pulp manufacturing apparatus, and concentration adjusting water feed means for supplying water into the concentration adjusting tank, and the concentration of the used paper pulp supplied from the agitating tank is adjusted in the concentration adjusting tank by the water supplied from the concentration adjusting water feed means, and a pulp suspension of specified concentration is prepared.

Preferred embodiments include the following.

(1) In the concentration adjusting tank, in the whole volume of used paper pulp supplied from the agitating tank, water is added from the concentration adjusting water feed means, and when the total volume of used paper pulp and water becomes a specified value, the pulp suspension is adjusted to the specified concentration.

(2) In the concentration adjusting tank, a specified portion is dispensed from the whole volume of used paper pulp supplied from the agitating tank, water is added to the specified dispensed portion from the concentration adjusting water feed means, and when the total volume of specified dispensed portion of used paper pulp and water becomes a specified value, the pulp suspension is adjusted to the specified concentration.

(3) The concentration adjusting tank includes a pulp dispensing tank for dispensing a specified amount from the whole volume of used paper pulp supplied from the agitating tank, and a water storage tank receiving a specific volume of water corresponding to the dispensed amount of used paper pulp from the concentration adjusting water feed means, and the used paper pulp in the pulp dispensing tank is supplied and mixed in the water in the water storage tank, and the pulp suspension is adjusted to the specified concentration.

(4) The water feed means for supplying water into the agitating means functions also as the concentration adjusting water feed means.

The paper making apparatus of the invention is preferably used as a constituent device of the used paper recycling apparatus, being a paper making apparatus for manufacturing recycled paper from the used paper pulp manufactured in the pulp making section in the preceding process, in a used paper recycling apparatus of furniture size installed at the site of origin of used paper, composed of a paper making net conveyor for manufacturing wet paper from slurry pulp suspension in a mixture of water and used paper pulp sent from the pulp making section, a drying belt conveyor for manufacturing recycled paper by drying the wet paper manufactured in the paper making net conveyor, and a dewatering roll for squeezing and dewatering the wet paper at the junction of the paper making net conveyor and dewatering roll, and the pulp suspension supplied from the pulp making section is manufactured, dewatered and dried.

Preferred embodiments include the following.

(1) The paper making net conveyor has a mesh endless belt having a specified width for conveying the pulp suspension while making, a drive motor for moving and driving this mesh endless belt, and a pulp feeder for supplying the pulp suspension from the pulp making section onto the mesh endless belt, and this pulp feeder distributes and supplies the pulp suspension uniformly on the upper surface of the mesh endless belt.

(2) At the upstream side of the pulp feeder, a pulp feed tank is provided for storing the pulp suspension manufactured in the pulp making section, and the pulp suspension in this pulp feed tank is continuously supplied into the paper making frame of the pulp feeder by a suspension feed pump.

(3) The drying belt conveyor has a smooth surface endless belt having a specified width for receiving and conveying the wet paper sent from the paper making net conveyor, a drive motor for moving and driving the smooth surface endless belt, and a heating and drying unit for heating and drying the wet paper on the smooth surface endless belt, and at the downstream side position of the dewatering roll, the squeezed and dewatered wet paper on the paper making net conveyor is transferred tightly and conveyed to the downside of the smooth surface endless belt by the smooth surface structure of the smooth surface endless belt.

(4) Running speed of the smooth surface endless belt is set larger than running speed of the mesh endless belt of the paper making net conveyor.

(5) The heating and drying unit has at least one heating unit provided along the running route of the smooth surface endless belt, and the wet paper on the smooth surface endless belt is heated and dried by the heating unit in the process of conveyance.

(6) The dewatering roll is rolls and squeezes the mesh endless belt of the paper making net conveyor and the smooth surface endless belt of the drying belt conveyor from upper and lower sides, and squeezes and dewaters the wet paper on the mesh endless belt.

(7) The dewatering roll includes a dewatering roll rolling on the mesh endless belt from the lower side, a press roll rolling and pressing the smooth surface endless belt together with the dewatering roll from the upper side, and a drive motor for rotating and driving the two rolls in cooperation, and by these two rolls, the mesh endless belt and smooth surface endless belt are rolled and squeezed from upper and lower sides, and the moisture contained in the wet paper on the mesh endless belt is absorbed in the dewatering roll by way of the mesh endless belt.

(8) A smooth surface finishing roll is disposed for rolling and press the wet paper on the smooth surface endless belt while the smooth surface endless belt is running.

(9) A plurality of smooth surface finishing rolls are disposed in parallel to the opposite side of the smooth surface endless belt, to the heating unit provided along the running route of the smooth surface endless belt of the heating and drying unit.

(10) Crease preventive endless belts are suspended and supported on the plurality of smooth surface finishing rolls so as to be free to rotate and run, and the crease preventive endless belts apply tension while pressing from the upper side to the wet paper on the smooth surface endless belt, and prevent the wet paper from creasing, thereby maintaining smoothness.

(11) Running speed of the crease preventive endless belt is set larger than running speed of the smooth surface endless belt, and by difference in speed of the two belts, a tension is applied to the wet paper.

(12) The crease preventive endless belt comprises a permeable material enough to pass and evaporate moisture and steam remaining in the wet paper on the smooth surface endless belt.

(13) The crease preventive endless belt is a felt belt.

(14) The crease preventive endless belt is a mesh belt having fine mesh cells.

(15) The crease preventive endless belt is a belt of mesh base material having fine mesh cells coated with a felt material.

(16) At terminal end of drying belt conveyor, a size cutter is provided for cutting the recycled paper peeled from the smooth surface endless belt to a specified size.

(17) The paper making net conveyor and drying belt conveyor are driven by a common drive source.

The pulp feed apparatus of the invention is preferably used as a constituent device of the used paper recycling apparatus, being an apparatus composing the pulp feeder of the paper making apparatus for manufacturing recycled paper from the used paper pulp manufactured in the pulp making section in the preceding process, in a used paper recycling apparatus of furniture size installed at the site of origin of used paper, composed of a partition member slidably disposed on the downside of the running mesh endless belt of the paper making net conveyor, and a paper making frame slidably disposed on the upside of the mesh endless belt for defining the feed width of slurry pulp suspension in a mixture of water and used paper pulp sent from the pump making section, and a meandering passage bending up and down is provided in the paper making frame, and at the outlet side position of the passage, a flat member is provided for covering the mesh cells of the mesh endless belt in closed state from the upper side, and the pulp suspension supplied in the paper making frame passes through the meandering passage, and flows on the flat member and stays, and is diffused and supplied uniformly on the upside of the running mesh endless belt disposed in an upward slope toward the running direction.

Preferred embodiments include the following.

(1) The partition member is formed in a louver structure for sliding and supporting the downside of the mesh endless belt.

(2) The paper making frame has a flat U-shaped main body frame opened at the leading end side in the running direction of the mesh endless belt, a plurality of gate members for composing the passage in the main body frame, and a flat member.

(3) Since the plurality of gate members are provided upright in the main body frame, the passage is bent up and down, and the forwarding direction of the passage is extended upward from the inlet, and extended upward toward the outlet.

(4) Near the inlet of the passage, a partition board is provided, a plurality of through-holes are opened in the partition board at specified intervals, and of the gate members provided upright in the main body frame, the upper edge of the gate member forming the partition at the changing point from upward to downward direction of the passage is set to be lower than the water level of the pulp suspension flowing and staying on the flat member.

(5) The main body frame has its inside width determined at the width of the recycled paper to be manufactured, and the feed width of the pulp suspension is defined, and its lower end is disposed to slide on the upside of the obliquely running mesh endless belt.

(6) At the leading edge of the flat member of the paper making frame, a thin guide sheet is provided for assuring a smooth flow of pulp suspension on the mesh endless belt, and the leading edge of this guide sheet is closely disposed at the upper position of the mesh endless belt supported by the beams for forming the louver structure of the partition member.

(7) The flat member of the paper making frame is set and disposed in a downward slope of downward inclination toward the running direction of the mesh endless belt.

According to the invention, the following outstanding effects are obtained, and the used paper recycling apparatus of the invention can be installed not only in a large office, but also in a small shop or ordinary household, and is friendly to the environment and low in running cost, and capable of preventing leak of confidential information, private information, and other information, and keeping a high confidentiality.

(1) The used paper recycling apparatus includes, in an apparatus case of furniture size, a pulp making section for manufacturing used paper pulp by macerating and mashing used paper, a paper making section for manufacturing recycled paper by making the used paper pulp manufactured in the pulp making section, and a control section for driving and controlling the pulp making section and paper making section by interlocking, and therefore without discarding the used paper, the waster paper is recycled and reused at the same site of origin, and disposal of used paper is reduced, and refuse problems can be solved, and the limited resources can be utilized effectively.

Hitherto, because of confidential problems, recycling of used paper has not been promoted, but since the used paper can be recycled and reused at the same site of origin, effects of effective utilization of resources are outstanding.

(2) At the site of origin of used paper, a compact used paper recycling system having a same function as large scale system installed in paper making plant or used paper recycling plant is installed, and used paper can be recycled continuously in a closed circuit in a small shop or general household, and refuse collection and transportation expenses and incineration and other costs are saved, and it is very economical.

(3) The mashing machine composing the mashing unit of the pulp making section presses and mashes the used paper by its mashing action surface, and pulverizes the inks forming characters and patterns on the used paper, and only drinking water from city water works can be used, and any particular de-inking agents and other chemicals used in large scale used paper recycling system such as paper making plant and used paper recycling plant are not needed.

That is, inks forming characters and patterns on the used paper are pulverized by the mashing machine, and only innumerable small spots are scattered in the recycled paper like irregular dot pattern (for example, about 4 to 30 dots per square millimeter, or about 8 dots in average), and it is visually recognized as plain paper with a slight tint, or at close-up distance, it is recognized as fine and uniform dot pattern, and recycled paper of high degree of whiteness is obtained, and same effects as de-inking are obtained.

Without using special chemicals, used paper can be recycled by using tap water only, and it is free from environmental problems spreading the world over, conforms easily to the environmental regulations, and presents a used paper recycling system friendly to the environment.

(4) Since used paper pulp circulates between the macerating and mashing unit of the pulp making section, used paper pulp is mashed efficiently according to the purpose, and optimum mashing effects are obtained, and recycled paper of high quality is obtained.

(5) By the pulp making section for macerating and mashing used paper and manufacturing used paper pulp, the used paper is mashed to fiber level (to be pulp), and printed characters and patterns are completely destroyed and cannot be restored. Hence, leak of confidential information and private information of printed characters and patterns can be securely prevented, and a high confidentiality is assured.

(6) Moreover, the apparatus structure is compact, and it can be installed not only in large office, but also in small shop or general household, and from this point of view, too, leak of confidential information and private information can be securely prevented.

(7) The water used in the pulp making section is the water collected from the paper making unit after dewatering in water circulation system, and the driving source of the pulp making section and paper making section is the driving power source driven by an alternating-current power source for general household, and it is friendly to the environment, low in running cost, and economical.

(8) Being installed at the site of origin of used paper, the pulp making section macerates the used paper into used paper pulp, and the paper making section manufactures the used paper pulp into recycled paper, and information of characters and patterns printed on the paper is not diffused outside of the site of origin of used paper, and leak of confidential information and private information can be prevented securely.

That is, by using the used paper recycling apparatus of the invention, it is free from risk of external diffusion of information from a specific institute (for example, school, hospital, city office, law firm, patent office, general household).

In other words, in the case of a conventional shredder, if the used paper is shredded into small chips, and the printed characters and patterns are not legible, the shredded chips are incinerated, and external diffusion cannot be prevented perfectly. In this regard, the waste chips may be stored within an internal warehouse, but storing place is needed, and the resources are used only once and are not utilized effectively.

By contrast, according to the used paper recycling apparatus of the invention, the information printed on the used paper is not diffused outside of the closed system, and the resources can be utilized effectively.

These and other features and objects of the invention will be more clearly appreciated and understood from the following detailed description given together with the accompanying drawings and novel facts disclosed in the claims.

BRIEF DESCRIPTION OF THE DRAWINGS

FIG. 9 is a partially cut-away front view of the pulp feeder.

FIG. 10A is a block diagram of specific mechanism of squeezing and dewatering of dewatering roll in the paper making section, showing a basic squeezing and dewatering mechanism.

FIG. 10B is a block diagram of specific mechanism of squeezing and dewatering of dewatering roll in the paper making section, showing a squeezing and dewatering mechanism when the slurry preventive roll is provided near the upstream side of the dewatering roll.

FIG. 15 is a front sectional view showing essential parts of mashing unit of pulp making section in used paper recycling apparatus in preferred embodiment 3 of the invention.

FIG. 16 is a perspective exploded view of mashing member as preferred principal par of the mashing unit.

DETAILED DESCRIPTION OF THE PREFERRED EMBODIMENTS

Figure 1:
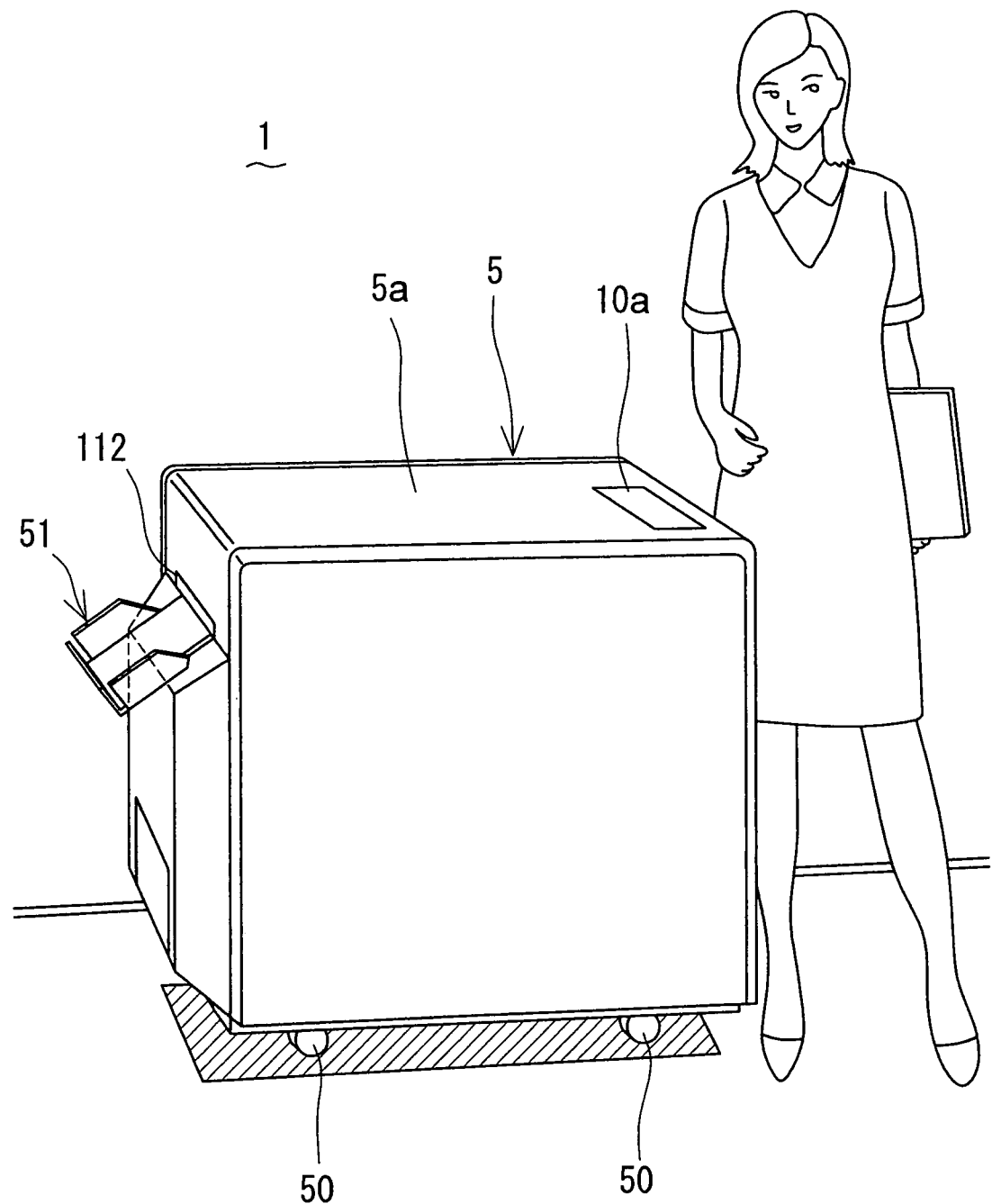
FIG. 1 is a perspective view of outline of used paper recycling apparatus in preferred embodiment 1 of the invention.

Preferred embodiments of the invention are specifically described below while referring to the accompanying drawings. Throughout the drawings, same parts or elements are identified with same reference numerals.

Preferred Embodiment 1

A used paper recycling apparatus of the invention is shown in FIG. 1 to FIG. 10 (FIG. 10A, FIG. 10B), and this used paper recycling apparatus 1 is specifically installed at the site of origin of used paper, and it is an apparatus for manufacturing recycled paper at the site without disposing or discarding the used paper UP, and such used paper UP includes confidential documents occurring in government offices and private companies, and private letters in general household, and other used and unnecessary documents.

Figure 2:
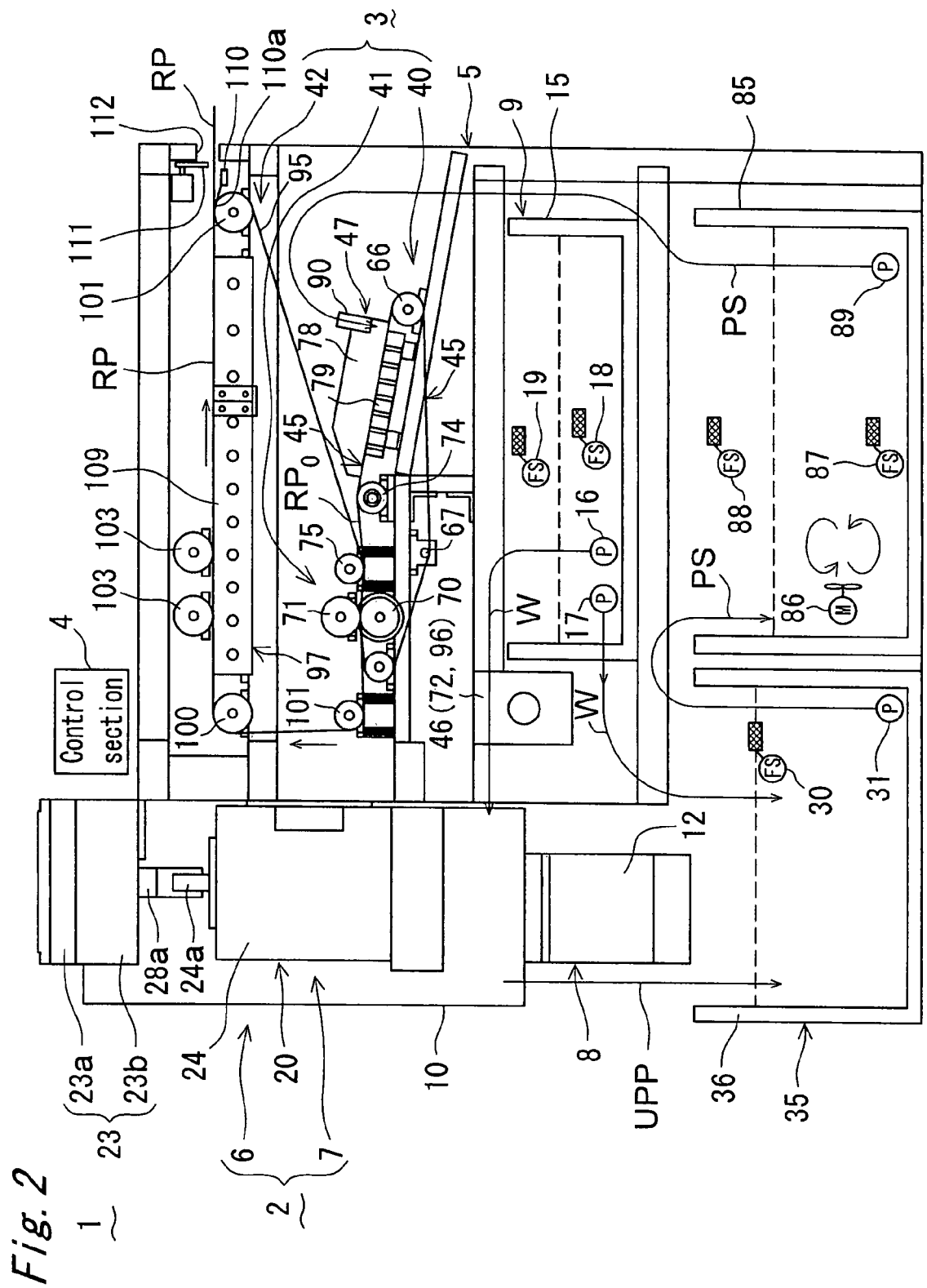
FIG. 2 is a front view of entire structure of the used paper recycling apparatus, showing a cut-away view of apparatus case.

The used paper recycling apparatus 1 has a furniture size as shown in FIG. 1, that is, size and shape similar to office equipment, such as document rack, locker, desk, copier, or personal computer, and is mainly composed of a pulp making section 2, a paper making section 3, and a control section 4 as shown in FIG. 2, and these sections 2 to 4 are contained in an apparatus case 5 in a compact design, and a drive source of the pulp making section 2 and paper making section 3 is a drive source driven by a general household alternating-current power source. The individual components are specifically described below.

I. Apparatus Case 5

The apparatus case 5 has a furniture size as mentioned above, and the specific dimensions and shape are designed properly depending on the purpose and application. The apparatus case 5 in the illustrated preferred embodiment is a box having dimensions and shape like a copier used in an office, and its outer circumference is covered with a decorative case cover 5a. In the bottom of the apparatus case 5, casters 50, 50, . . . are provided as moving means so as to be moved freely on the floor.

In the ceiling of the apparatus case 5, an inlet 10a is provided for supplying used paper UP, and a detachable recycled paper receive tray 51 is provided in the side surface for receiving recycled paper RP, RP, . . . . A discharge port 112 of the apparatus case 5 is provided oppositely to the recycled paper receive tray 51, and recycled paper RP, RP, . . . discharged from the discharge port 112 are received sequentially in layers.

II. Pulp Making Section 2

The pulp making section (pulp manufacturing apparatus) 2 is a process unit for manufacturing used paper pulp by macerating and mashing used paper UP, and comprises a macerating unit 6 for agitating, grinding, and macerating the used paper UP, and a mashing unit 7 for mashing the used paper UP macerated in the macerating unit 6, and in the illustrated preferred embodiment, the macerating unit 6 and mashing unit 7 circulate the used paper UP for a specified time.

The macerating unit 6 includes an agitating device (agitating means) 8 for agitating the used paper UP, and a water feed device (water feeding means) 9 for supplying water into the agitating device 8.

The agitating device 8 includes an agitating tank 10, an agitating impeller 11, and a drive motor 12.

Figure 3:
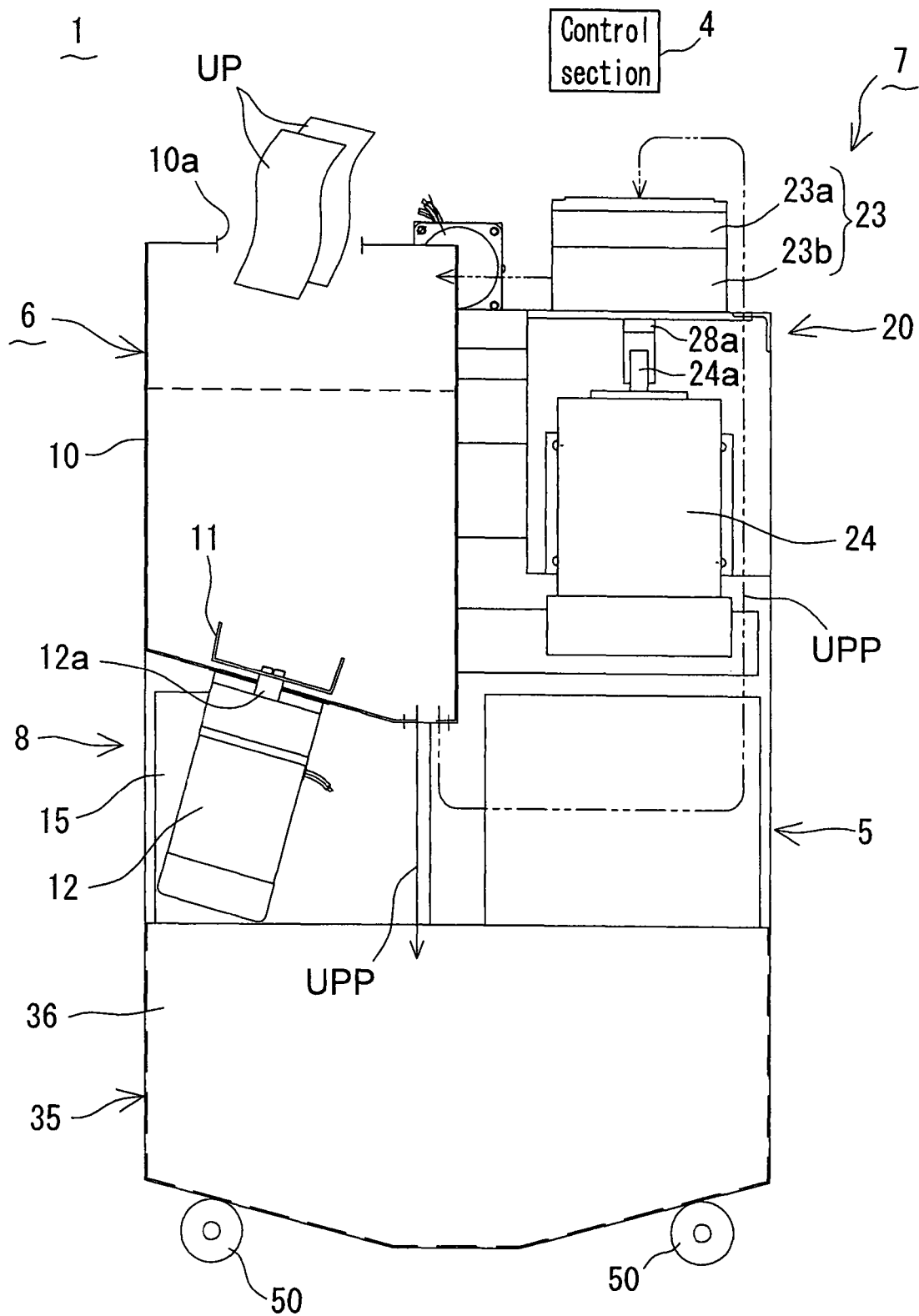
FIG. 3 is a side view of entire structure of the used paper recycling apparatus, showing a cut-away view of apparatus case.

The agitating tank 10 is shown in FIG. 3, in which a closable inlet 10a is provided outside of the case cover 5a of the apparatus case 5 in the ceiling wall, and the agitating impeller 11 is rotatably provided in the inside (in the bottom in the drawing).

The inner volume of the agitating tank 10 is determined depending on the number of sheets of used paper UP to be agitated in batch. In the illustrated preferred embodiment, the agitating tank 10 is supposed to agitate about 8 sheets (about 32 g) of used paper UP of A4 format plain paper copier (PPC) in batch process by adding about 1.5 liters of water.

The agitating impeller 11 is provided in an inclined bottom of the agitating tank 10, and is built in a direct motor structure attached and fixed directly to a rotary shaft 12a of the drive motor 12, and is rotated normally and reversely by the drive motor 12 continuously or intermittently. The drive motor 12 is specifically an electric motor, and the drive motor 12 is electrically connected to the control section 4.

When the agitating impeller 11 is rotated normally and reversely, the used paper UP, if agitated in the size of A4 format, is effectively dispersed by the jet action of water by normal rotation followed by reverse rotation of the agitating impeller 11, and entangling on the agitating impeller 11 can be effectively prevented.

In this relation, the blade shape of agitating impeller 11 is designed to be different in the agitating force (diffusion effect) between normal rotation and reverse rotation, and uniform macerating and mashing action of used paper UP, UP, . . . is realized.

Changeover timing of normal rotation and reverse rotation of agitating impeller 11, agitation time, and other operating conditions are determined on the basis of data of preliminary experiments, and are set to obtain desired macerating and mashing effects of used paper UP, UP, . . . .

The water feed device 9 comprises white water collect tank 15 and water feed pump 16 as shown in FIG. 2. The white water collect tank 15 is desired to collect white water filtered and dewatered in the paper making section 3 (pulp water of ultralow concentration filtered by the paper making mesh in the paper making process), and the white water W collected in the white water collect tank 15 is supplied as water for agitation into the agitation tank 10 of the agitating device 8 by the water feed pump 16.

The water feed device 9 also functions, as described below, as concentration adjusting water feeder (concentration adjusting water feeding means) of pulp concentration adjusting device (pulp concentration adjusting means) 35, and for this purpose, moreover, a concentration adjusting water feed pump 17 is provided for supplying the white water W in the white water collect tank 15 into the concentration adjusting tank 36 as water for adjusting the concentration. Reference numerals 18 and 19 are respectively lower limit water level float switch and upper limit water level float switch provided in the white water collect tank 15.

In the agitating device 8, the used paper UP, UP, . . . supplied into the agitating tank 10 from the opening or inlet 10a of the apparatus case 5 is agitated for a specific time (3 to 5 minutes in the shown case) in water W supplied from the water feed device 9 by normal and reverse rotation of the agitating impeller 11 by the drive motor 12, and macerated and mashed, and transformed into used paper pulp UPP.

The mashing unit 7 has at least one mashing machine, and one mashing machine 20 is shown in the illustrated preferred embodiment.

The mashing machine 20 pressurizes and mashes the used paper UP macerated in the macerating unit 6, and grind and pulverizes the inks forming characters and patterns on the used paper UP.

Figure 4:
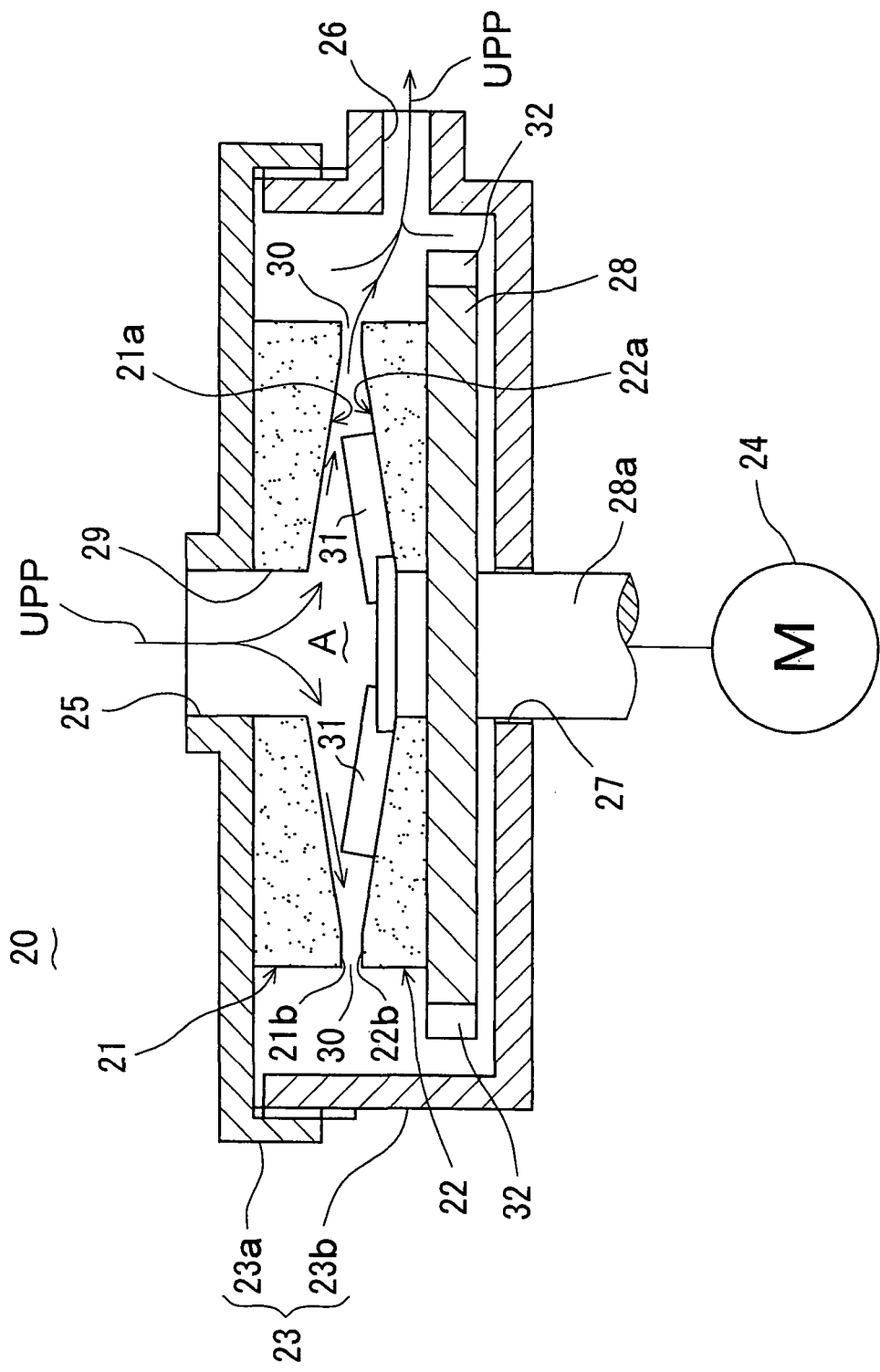
FIG. 4 is a front sectional view showing essential parts of mashing unit of pulp making section in the used paper recycling apparatus.
Figure 5:
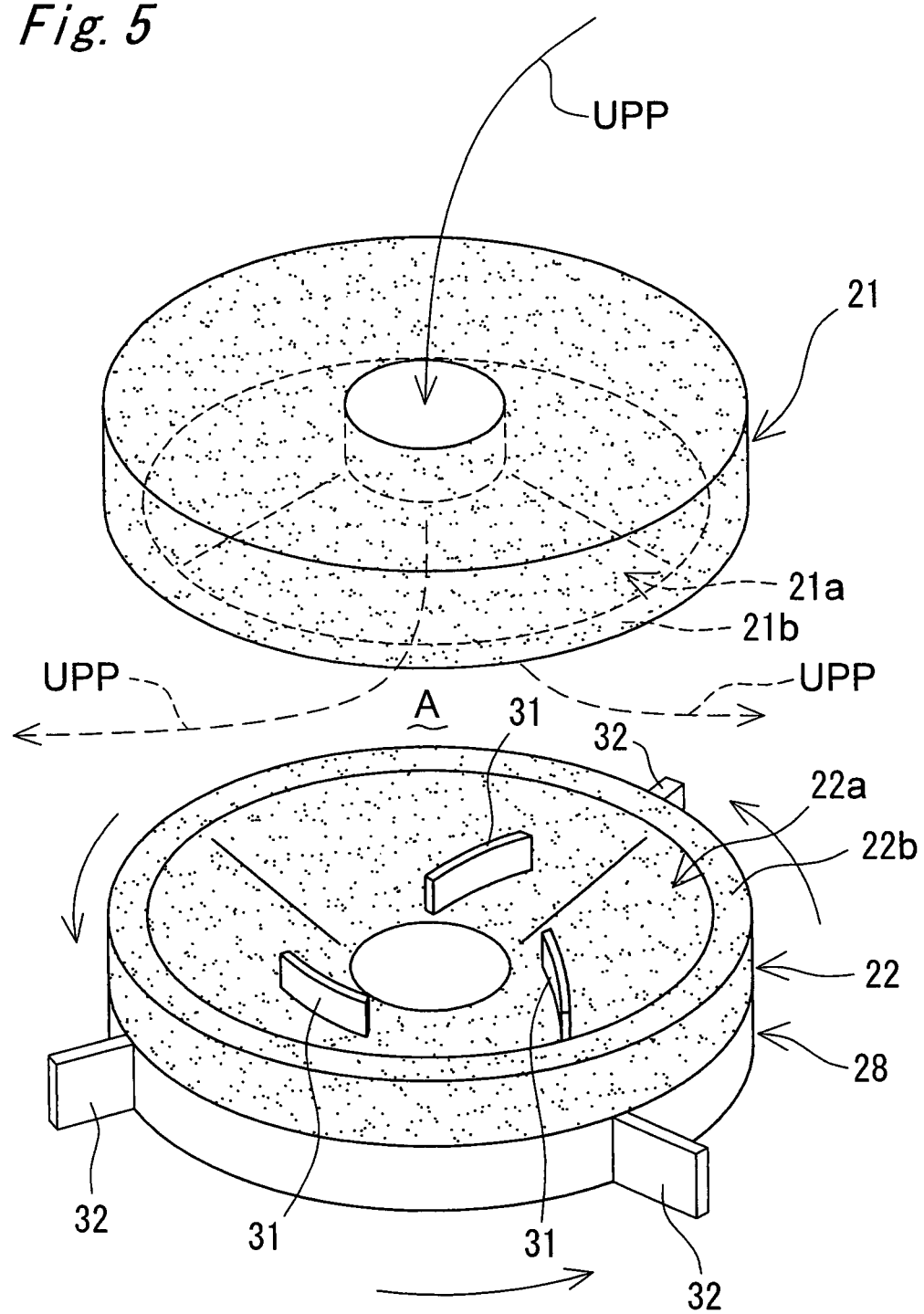
FIG. 5 is a perspective exploded view of essential parts of the mashing unit.

The mashing machine 20 is mainly composed of a plurality of (two in this case) relatively moving mashing members 21, 22 disposed oppositely across a tiny mashing clearance, and specifically includes a mashing tank 23 communicating with the agitating tank 10 of the macerating unit 6, the mashing members 21, 22 provided relatively movably in the mashing tank 21, and a drive source 24 for driving the mashing members 21, 22 relatively, as shown in FIG. 4 and FIG. 5.

In the mashing machine 20, as shown in FIG. 5, the mashing members 21, 22 are relatively moving disks, and more specifically the upper mashing member 21 is fixed, and the lower mashing member 22 is rotatable.

The mashing tank 23 has an upper and lower divided structure so as to contain the pair of mashing members 21, 22 in a closed cylindrical shape, with the upper tank 23a and lower tank 23b mutually engaged. The mashing tank 23 has a feed port 25 opened in the center of the ceiling of the upper tank 23a, and a discharge port 26 opened in the cylindrical side of the lower tank 23b, and the feed port 25 and discharge port 26 are connected to communicate with the agitating tank 10 of the macerating tank 6 by way of piping not shown. Although not shown specifically, the feed port 25 communicates with the bottom position of the agitating tank 10, and the discharge port 26 communicates with the upper position of the agitating tank 10.

The upper fixed side mashing member 21 is fixed to the ceiling inner side of the upper tank 23a by proper fixing means, and the lower rotatable mashing member 22 is provided oppositely to the fixed side mashing member 21 concentrically across a tiny mashing clearance A.

The rotatable mashing member 22 provided integrally on a rotary bench 28, and a rotary support shaft 28a of the rotary bench 28 is opposite to the outside of the mashing tank 23 by way of the opening 27 in the bottom of the mashing tank 23, that is, in the center of bottom of the lower tank 23b, and is directly fixed to the rotary shaft 24a of the drive motor 24 as the rotary drive source in a direct motor structure. This drive motor 24 is specifically an electric motor, and the drive motor 24 is electrically connected to the control section 4.

The opposite sides 21a, 22a of both mashing members 21, 22 forming the tiny mashing clearance A cooperate and form mashing action surfaces. These opposite mashing action surfaces 21a, 22a are grindstone surfaces having multiple abrasive grains coupled by a binding material, and these two mashing action surfaces 21a, 22a are formed in a taper shape gradually increased in diameter toward the mutually opposite directions as shown in FIG. 4, and the mashing clearance A of conical shape is formed between them.

In the central position of mashing action surface 21a of the fixed side mashing member 21, an inlet 29 is formed to communicate concentrically with the feed port 25 of the mashing tank 23, and an annular clearance 30 formed between outer peripheral edges 21b, 22b of mashing action surfaces 21a, 22a of the two mashing members 21, 22 is formed as an outlet communicating with the discharge port 26 of the mashing tank 23.

In this relation, a plurality of guide ribs 31, 31, . . . are provided in the mashing action surface 22a of the rotary mashing member 22 at equal intervals in the circumferential direction, and a plurality of blades 32, 32, . . . are provided on the outer circumference of the rotary bench 28 for supporting the rotary mashing member 22 at equal intervals in the circumferential direction. By rotation of the rotary mashing member 22, the plurality of guide ribs 31, 31, . . . act to guide the used paper pulp UPP flowing into the mashing clearance A from the inlet into the outlet 30, and the plurality of blades 32, 32, . . . act as pump for forcing out the used paper pulp UPP flowing in from the outlet 30 toward the discharge port 26 of the mashing tank 23 by centrifugal force.

The gap of the mashing clearance A is set at about 0.05 to 0.8 mm. The gap of the mashing clearance A can be finely adjusted by relatively rotating the upper tank 23a and lower tank 23b of the mashing tank 23, and moving back and forth the engaged portion. As the gap of the mashing clearance A is finely adjusted depending on the purpose, and high pressure and sliding force depending on the strength and driving force of the apparatus mechanical structure can be obtained in the cooperating action of the mashing action surfaces 21a, 22a. Also by adjusting the gap of the mashing clearance A, the mashing speed of the mashing unit 7 (mashing time) can be also adjusted properly.

In the state of the rotary mashing member 22 rotated and driven on the fixed mashing member 21 by the drive motor 24, the used paper pulp UPP supplied into the feed port 25 of the mashing tank 23 from the agitating tank 10 of the macerating unit 6 flows into the mashing clearance A from the inlet 29, passes through the mashing clearance A, receives the pressurizing and mashing action by the mashing action surfaces 21a, 22a rotating relatively, and returns to the agitating tank 10 from the outlet 30 by way of the discharge port 26 of the mashing tank 23 (see the flow path indicated by arrow in FIG. 4 and FIG. 5).

The feed port 25 and discharge port 26 of the mashing tank 23 are opened and closed by opening means. Specific structure of opening means is not shown, but any conventional manual or automatic opening valve may be used. The opening valve closes the feed port 25 and discharge port 26 when the operation of the mashing unit 7 is stopped, thereby preventing entry of used paper UP or used paper pulp UPP into the mashing tank 23 from the agitating tank 10 of the agitating device 8, and opens the feed port 25 and discharge port 26 when the operation of the mashing unit 7 is started, thereby allowing circulation of used paper UP or used paper pulp UPP between the agitating tank 10 and the mashing tank 23.

In this case, when the macerating unit 6 and mashing unit 7 are driven at the same time, the mashing tank 23 constitutes a pulp swirl tank for allowing circulation of used paper pulp UPP together with the agitating tank 10 of the macerating unit 6, and the used paper pulp UPP flowing and circulating through the circulation tanks 10, 23 receives the agitating and maceration action by the macerating unit 6, and the pressurizing and mashing action and ink grinding and pulverizing action by the mashing unit 7 sequentially and repeatedly. In other words, the used paper pulp UPP processed in the mashing tank 23 by pressurizing, mashing, and ink grinding and pulverizing action of the mashing action surfaces 21a, 22a is discharged into the agitating tank 10 of the macerating unit 6, and is uniformly agitated by the agitating impeller 11 in the agitating tank 10, and supplied again into the mashing tank 23 of the mashing unit 7, and when this process is repeated by a proper number of times, the used paper pulp UPP in the pulp swirl tanks 10, 23 is uniformly processed by macerating, mashing and ink grinding and pulverizing. As a result, an appropriate paper strength is obtained for recycled paper RP to be made and regenerated in the paper making section 3 in a later process, and a recycled paper RP of high degree of whiteness is obtained (same effect as in de-inking process).

The pulp concentration adjusting unit 35 is provided at the downstream side of the agitating tank 10, and is designed for properly adjusting the concentration of used paper pulp UPP manufactured in the agitating tank 10. The pulp concentration adjusting unit 35 includes a concentration adjusting tank 36 for storing the used paper pulp UPP manufactured in the agitating tank 10, and a concentration adjusting water feed unit (concentration adjusting water feeding means) for supplying water into the concentration adjusting tank 36, and the water feed device 9 functions also as the concentration adjusting water feed unit.

The inner volume of the concentration adjusting tank 36 is determined depending on the number of sheets (weight) of used paper UP to be processed in batch in the agitating device 8. In the illustrated preferred embodiment, the concentration adjusting tank 36 is supposed to have a volume enough to adjust the concentration of used paper pulp UPP corresponding to the capacity of batch processing of about 8 sheets (about 32 g) of used paper UP of A4 format as stated above.

In this relation, a drain port 10b is provided in the bottom of the agitating tank 10 of the agitating device 8, and the drain port 10b is opened and closed by drain valve not shown in the drawing. The drain valve is specifically an electromagnetic valve, and is electrically connected to the drive section 4.

A specific concentration adjusting method of the pulp concentration adjusting unit 35 is explained. In the concentration adjusting tank 36, water W is added from the concentration adjusting water feed unit 9 to the whole volume of used paper pulp UPP manufactured in batch process in the agitating tank 10, until the total volume of used paper pulp UPP and water W becomes a specified amount, and pulp suspension PS of specified concentration is prepared. The target concentration of the pulp suspension PS to be adjusted is determined in consideration of paper making capacity of the paper making section 3 specified below, on the basis of the data of preliminary experiments, and it is set at concentration of about 0.1% in the shown example. Reference numeral 30 is a float switch provided in the concentration adjusting tank 36, and it detects the water level when the amount of pulp suspension PS in the concentration adjusting tank 36 (total volume of used paper pulp UPP and water W) becomes the specified amount.

Therefore, in the concentration adjusting tank 36, the whole volume of used paper pulp UPP manufactured in the agitating tank 10 (and mashing tank 23) is dropped and supplied by gravity into the concentration adjusting tank 36 from the drain port 10b of the agitating tank 10, and white water W added to the used paper pulp UPP from the concentration adjusting water feed unit 9 up to the specified value (detected by the float switch 30), and the concentration of the used paper pulp UPP is adjusted, and pulp suspension PS of specified concentration is obtained. In the preferred embodiment, in the whole volume of used paper pulp UPP (about 32 g of used paper UP+1.5 liters of water W), water W for dilution is added from the concentration adjusting feed unit 9, and it is controlled so that the total volume (total weight) of used paper pulp UPP and water W may be 32 liters, and pulp suspension of concentration of about 0.1% (target concentration) is prepared. This pulp suspension of adjusted concentration is sent into pulp feed tank 85 of paper making section 3 in next process by means of first suspension feed pump 31.

While the used paper pulp UPP is dropped and supplied into the concentration adjusting tank 36 from the drain port 10b of the agitating tank 10, water W is supplied by water feed pump 16 from the water feed device 9, and the agitating impeller 11 is rotated by the drive motor 12, and the inside of the agitating tank 10 is cleaned.

The water feed source of the water feed device 9 is the white water W dewatered in the paper making section 3 collected in the white water collect tank 15, and, in other words, the entire white water W dewatered and collected in the paper making section 3 is circulated and reused in the agitating device 8 and pulp concentration adjusting unit 35 in the mashing unit 6.

III. Paper Making Section 3

The paper making section 3 is a process unit for manufacturing recycled paper RP from the used paper pulp UPP manufactured in the mashing unit 6, and includes a paper making net conveyor 40, a dewatering roll 41, and a drying belt conveyor 42.

The paper making net conveyor 40 is a location for manufacturing wet paper from slurry pulp suspension PS of water W and used paper pulp UPP sent from the mashing unit 6 of the pulp making section 2, and includes a mesh endless belt 45, a drive motor 46, and a pulp feed unit 47.

The mesh endless belt 45 is for conveying the pulp suspension PS while processing, and is specifically an endless belt having plate members of paper making mesh structure of specified width connected in a ring form of specified length. The specified width is set slightly larger than the width dimension of the recycled paper RP to be manufactured from pulp suspension PS. Plate members of paper making mesh structure are made of materials capable of filtering and dewatering the pulp suspension PS appropriately through innumerable mesh cells of paper making mesh structure, and preferred examples include polypropylene (PP), polyethylene terephthalate (PET), polyamide (PA) (generally known by the registered trade name of Nylon), and stainless steel (SUS), and other materials excellent in corrosion resistance, and in the illustrated preferred embodiment, the mesh endless belt 45 is made of PET. The specified length is long enough for manufacturing the pulp suspension PS in a proper weight in relation to the running speed of mesh endless belt 45, and is set in a size to be accommodated in the storing space of paper making net conveyor 40 in the apparatus case 5.

Figure 6:
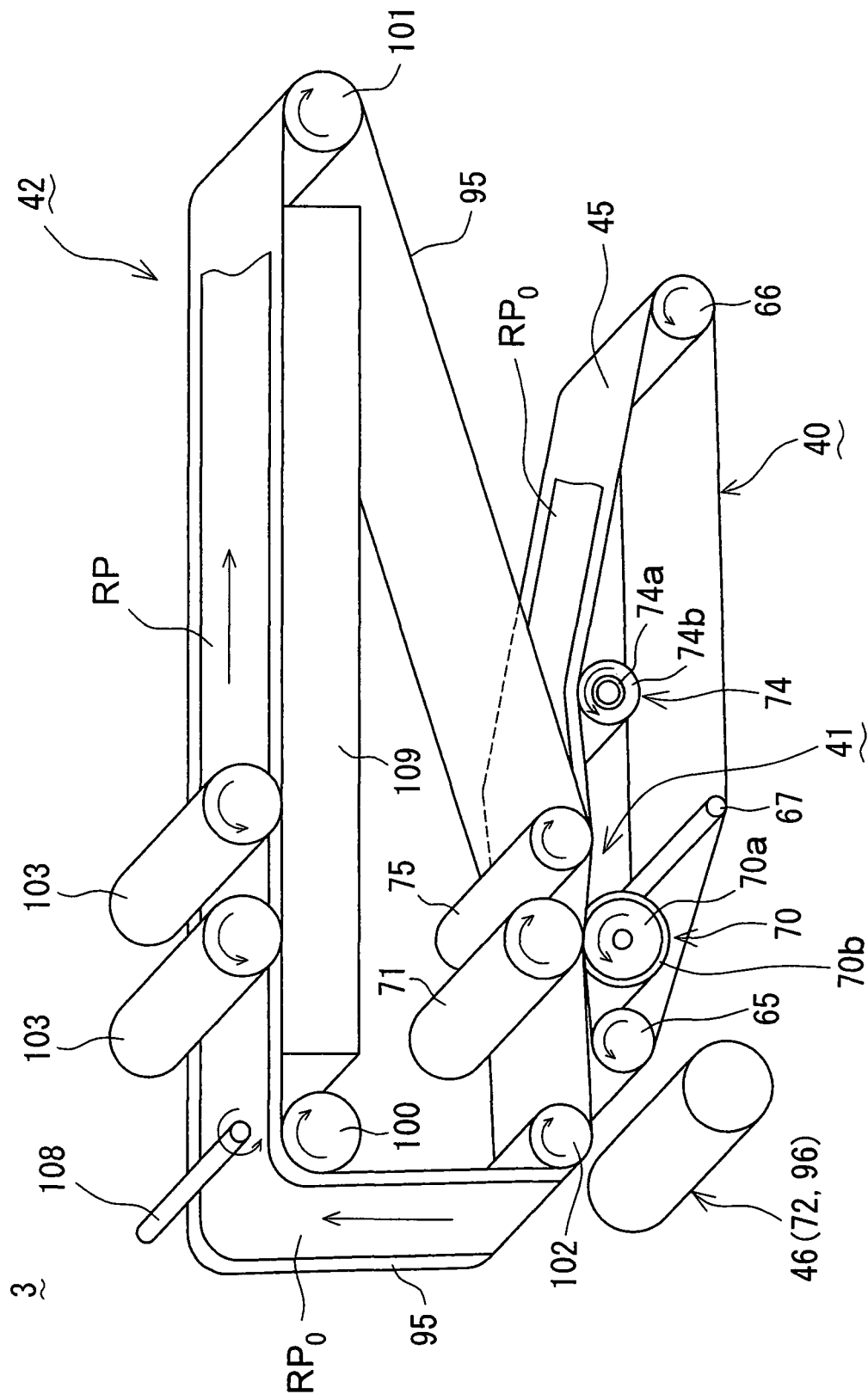
FIG. 6 is a perspective view of outline of paper making section of the used paper recycling apparatus.

The mesh endless belt 45 is rotatably suspended and supported, as shown in FIG. 2 and FIG. 6, by way of drive roller 65, follower roller 66, support roller 67, dewatering roll 70, and preliminary dewatering roll 74, and is driven by and coupled to the drive motor 46 through the drive roller 65.

The drive motor 46 for driving the mesh endless belt 45 is specifically an electric motor, and is connected electrically to the control section 4. The drive motor 46 is also used as drive source of dewatering roll 41 and drying belt conveyor 42 described below, and the structure for common used or the drive coupling mechanism is mentioned below.

The pulp feed unit 47 is a location for supplying pulp suspension PS from the mashing unit 6 onto the mesh endless belt 45, and specifically the pulp feed unit 47 supplies and spreads the pulp suspension PS uniformly on the upper surface of the mesh endless belt 45.

Figure 8:
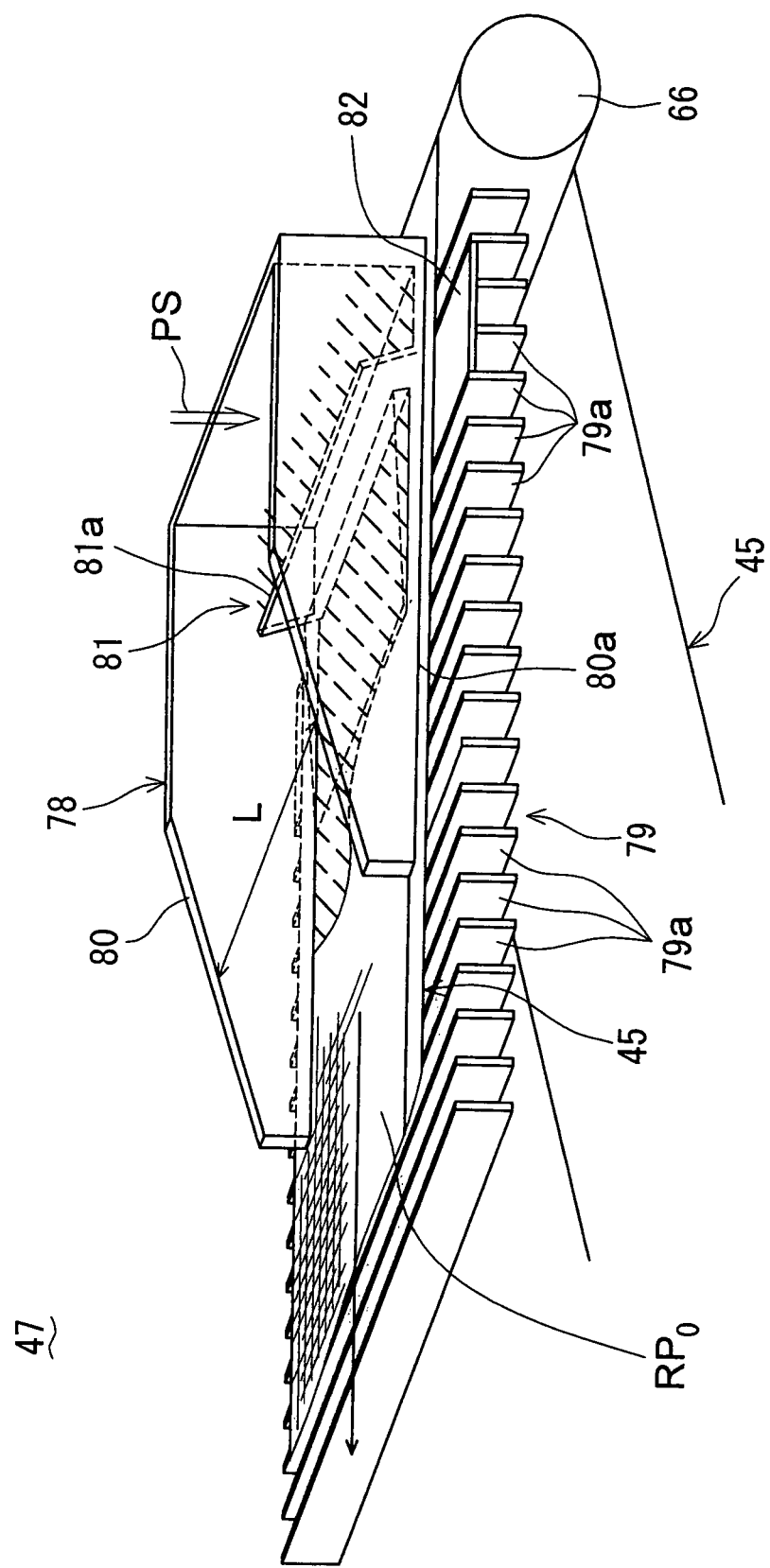
FIG. 8 is a magnified perspective view of pulp feeder in the paper making section.

A specific structure of the pulp feed unit 46 is shown in FIG. 8 and FIG. 9. In this pulp feed unit 47, the mesh endless belt 45 is disposed in an upward slope toward the running direction, and a paper making frame 78 and a partition member 79 are disposed at upper and lower side positions of the mesh endless belt 45.

The paper making frame 78 is slidably disposed on the upside of the mesh endless belt 45, and, as shown in FIG. 8 and FIG. 9, includes a main body frame 80 of U shape plane opened at the leading end, that is, the running direction end of the mesh endless belt 45, and an overflow tank 81 provided at the rear end of the main body frame 80.

The main body frame 80 is disposed so that its lower end 80a may slide on the upside of the mesh endless belt 45 running obliquely, and the frame inner width L (see FIG. 8) of main body fame 80 is set in a width dimension of recycled paper PR to be manufactured.

The overflow tank 81 is integrally fixed to the rear end of the main body frame 80, and its front wall upper edge 81a is the overflow portion formed horizontally and straightly, and a feed opening 90a of the suspension feed piping 90 for supplying pulp suspension PS of pulp feed tank 85 is provided oppositely in the overflow tank 81.

The pulp suspension PS is supplied and stored in the overflow tank 81 from the suspension feed piping 90, and when the overflow tank 81 is fully filled with pulp suspension PS, when pulp suspension PS is further supplied, it overflows from the overflow unit 81a of the overflow tank 81 as indicated by arrow in FIG. 9, and flows down into the flat member 82 of the partition member 79 described below.

Figure 7:
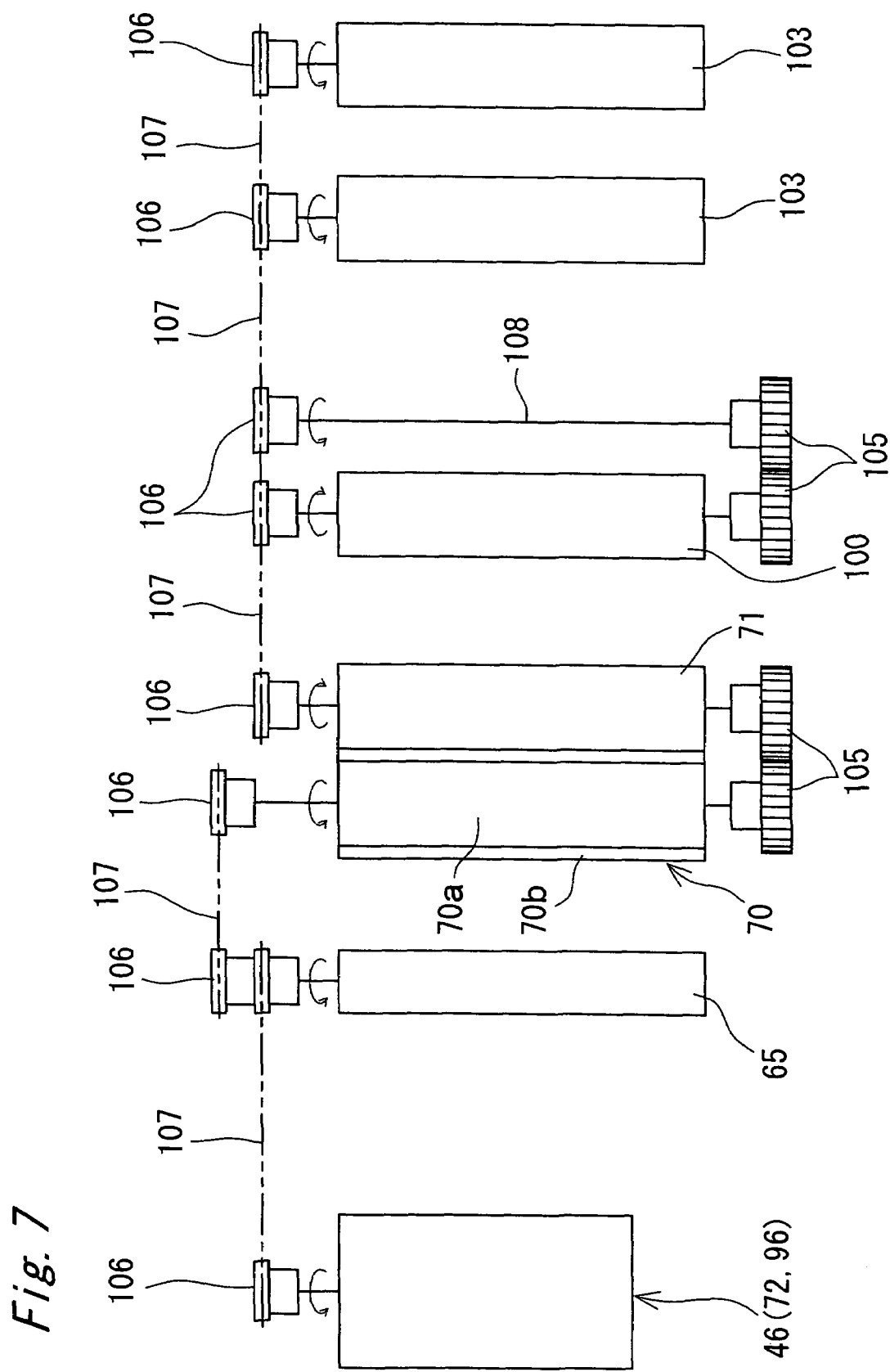
FIG. 7 is a plan view of drive coupling mechanism in the paper making section.

The partition member 79 is disposed slidably at the downside of the mesh endless belt 45, and has a draining louver structure composed of a plurality of framework members 79a, 79a, . . . as shown in FIG. 7 and FIG. 8, having a shape and size capable of slidably supporting the entire width of the downside of the mesh endless belt 45, and the base end position of the louver structure is closed by the flat member 82.

The flat member 82 is provided at a position corresponding to the overflow tank 81 of the paper making frame 78, and is disposed, specifically as shown in FIG. 9, at a position corresponding to the flow-down position of the pulp suspension PS overflowing from the overflow tank 81, and thereby the mesh cells of the flow-down supply position of the pulp suspension PS in the mesh endless belt 45 are supported in closed state by the flat member 82.

At the upstream side of the pulp feed unit 47, a pulp feed tank 85 is provided for supplying the pulp suspension PS into the pulp feed unit 47.

The pulp suspension PS stored in the pulp feed tank 85 is detected by lower limit water level float switch 87 and upper limit water level float switch 88, and is supplied continuously into the overflow tank 81 of the pulp feed unit 47 by second suspension feed pump (suspension feed pump) 89.

The pulp suspension PS stored in the pulp feed tank 85 is thus supplied into the overflow tank 81 of the pulp feed unit 47 by the second suspension feed pump 89, and the pulp suspension PS supplied in the overflow tank 81 overflows from the overflow tank 81 as shown in FIG. 8 and FIG. 9, and flows down onto the flat member 82.

The pulp suspension PS is uniformly disposed on the upside of the mesh endless belt 45 by cooperative stagnant action by the main body frame 80 and partition member 79 of the paper making frame 78, and is conveyed together with the mesh endless belt 45 while maintaining the dimension specified by the main body frame 80 by the running action of mesh endless belt 45 in the arrow direction, and is dewatered by the gravitational filtering action of the mesh cells of the mesh endless belt 45, and wet paper RP0 is prepared. The filtered and dewatered white water W (pulp water of ultralow concentration filtered by the paper making net in the paper making process) is collected in the white water collect tank 15 of the water feed device 9 as described above.

In the pulp feed unit 47, the running position of the mesh endless belt 45 is supported so as to be lateral and horizontal, that is, the upper contour line of the section vertical to the running direction of the mesh endless belt 45 may be in horizontal state. In such configuration, it is effective to prevent bias of stagnant state of pulp suspension PS in lateral width direction by cooperation of main body frame 80 and partition member 79, and thickness of adjusted wet paper RP0 is uniform in lateral width direction, and the thickness of the entire paper surface becomes uniform.

The dewatering roll 41 is a location of squeezing and dewatering the wet paper RP0 on the mesh endless belt 45 at the junction of the paper making net conveyor 40 and smooth surface endless belt conveyor 42 described below.

Specifically, the smooth surface endless belt 95 of the drying belt conveyor 42 at the downstream side and the mesh endless belt 45 of the paper making belt conveyor 40 at the upstream side are disposed in upper and lower layers as shown in FIG. 2 and FIG. 6, and the upper and lower adjacent portions of the smooth surface endless belt 95 and mesh endless belt 45 form the junction, and the dewatering roll 41 rolls and squeezes the mesh endless belt 45 and smooth surface endless belt 95 from upper and lower sides.

The dewatering roll 41, dewatering roll 70, press roll 71, and drive motor 72 are principal components, and preliminary dewatering roll 74 and slurry preventive roll 75 are auxiliary components.

The dewatering roll 70 rolls on the mesh endless belt 45 from the lower side, and is specifically composed of a cylindrical roll 70*a* of high rigidity material, and a dewatering layer 70*b* of porous material of fine continuous pores wound on the outer circumference thereof. The dewatering roll 70*b* is made of material excellent in hydrophilic property, water absorption and water retaining property, and is preferably a porous material of fine continuous pores excellent in flexibility. Rolling structure of dewatering layer 70*b* on the cylindrical roll 70*a* includes single layer structure of rolling a relatively thick dewatering layer 70*b* once on the outer circumference of the cylindrical roll 70*a*, or fitting a cylindrical dewatering layer 70*b* to the cylindrical roll 70*a*, or multilayer structure of rolling a thin cylindrical dewatering layer 70*b* on the outer circumference of the cylindrical roll 70*a* in plural layers.

The dewatering roll 70 in the illustrated preferred embodiment is a single layer structure, that is, a cylindrical dewatering layer 70*b* of fine porous continuous foamed material having micron-size ultrafine continuous pores is fitted to the cylindrical outer circumference of the stainless steel cylindrical roll 70*a*.

The press roll 71 is to roll and press the upside of the smooth surface endless belt 95 of the drying belt conveyor 42 described below. Specifically, it is a cylindrical roll of high rigidity material. The press roll 71 in the illustrated preferred embodiment is a stainless steel cylindrical roll.

The dewatering roll 70 and press roll 71 are specifically driven by and coupled to a single drive motor 72, and the both rolls 70, 71 are rotated and driven in interlock. In this case, the both rolls 70, 71 are rotated and controlled so that the outer circumferences of the both rolls 70, 71 may mutually roll and contact with a slight difference in rotating speed, on the contact surfaces of the mesh endless belt 45 and smooth surface endless belt 95 (the downside of mesh endless belt 45 and upside of smooth surface endless belt 95) rolling and squeezing in pressed state between the outer circumferences.

More specifically, the rotating speed of the press roll 71 is set slightly larger than the rotating speed of the dewatering roll 70, and hence the running speed of the smooth surface endless belt 95 is set larger than the running speed of the mesh endless belt 45. In such configuration, as mentioned below, when the wet paper RP0 squeezed and dewatered by the dewatering roll 41 is rolled and transferred from the upside of the mesh endless belt 45 of the lower side to the downside of the smooth surface endless belt 95 of the upper side, tension is applied to the wet paper RP0, and creasing of wet paper RP0 is effectively prevented.

The drive motor 72 is, in the illustrated preferred embodiment, used commonly with the drive motor 46 of the paper making net conveyor 40 as described below.

By driving of drive motor 72 (46), the both rolls 70, 71 roll and squeeze the both belts 45, 95 from upper and lower side in pressed state, and moisture M contained in the wet paper RP0 on the mesh endless belt 45 is absorbed and dewatered by the dewatering roll 70 through the mesh endless belt 45. The squeezed and dewatered white water W is collected in the white water collect tank 15 of the water feed device 9.

A specific mechanism of squeezing and dewatering is explained by referring to FIG. 10A. By rotation of both rolls 70, 71, the mesh endless belt 45 and smooth surface endless belt 95 having the wet paper RP0 mounted on the upside are guided in between the rolls 70, 71 with the wet paper RP0 interposed thereon, and rolled and squeeze from upper and lower sides in pressed state. As a result, the moisture M contained in the wet paper RP0 is squeezed out to the upstream side of the both rolls 70, 71 (the right side in the drawing), but since the smooth surface endless belt 95 of the upper side has a smooth surface not having pores, and the squeezed moisture M entire passes through fine continuous pores in the mesh endless belt 45 and the lower side, and is absorbed in the dewatering layer 70*b* of the dewatering roll 70.

The preliminary dewatering roll 74 and slurry preventive roll 75 are provided to assist the squeezing and dewatering action of the press roll 71 and dewatering roll 70 in the dewatering roll 41.

The preliminary dewatering roll 74 is disposed, as shown in FIG. 2, so as to apply tension to the mesh endless belt 45 by rolling from the lower side at the upstream side of the dewatering roll 41.

The preliminary dewatering roll 74 is similar to the dewatering roll 70 in its specific structure, and comprises a cylindrical roll 74*a* of high rigidity material, and a dewatering layer 74*b* of porous material of fine continuous pores wound on the outer circumference thereof. The preliminary dewatering roll 74 in the illustrated preferred embodiment is a single layer structure, that is, a cylindrical dewatering layer 74b of fine porous continuous foamed material having micron-size ultrafine continuous pores is fitted to the cylindrical outer circumference of the stainless steel cylindrical roll 74a.

The wet paper RP0 uniformly diffused on the upside of the mesh endless belt 45 and conveyed together with the mesh endless belt 45 is filtered and dewatered by the mesh endless belt 45, and is also absorbed and dewatered by the preliminary dewatering roll 74, and the squeezing and dewatering action of the press roll 71 and dewatering roll 70 is assisted preliminarily.

The slurry preventive roll 75 is disposed, as shown in FIG. 2 and FIG. 10B, so as to press the smooth surface endless belt 95 to the wet paper RP0 on the mesh endless belt 45 at the lower side, by rolling and pressing the smooth surface endless belt 95 from the upper side, near the upstream side of the dewatering roll 41.

Referring now to FIG. 10B, when the mesh endless belt 45 and smooth surface endless belt 95 having the wet paper RP0 mounted on the upside is rolled and squeezed from upper and lower side in pressed state by the dewatering roll 70 and press roll 71, the moisture M contained in the wet paper RP0 is squeezed out to the upstream side (right side in the drawing) of the both rolls 70, 71, and at the same time the moisture M held as a result of previous squeezing and dewatering of the dewatering roll 70 is also squeezed.

In this case, if the slurry preventive roll 75 is not provided, as shown in FIG. 10A, near the upstream side of the both rolls 70, 71, the intersecting angle of the smooth surface endless belt 95 at the upper side and the mesh endless belt 45 at the lower side (the angle enclosed as intersection of pressing points of both rolls 70, 71 by the both belts 45, 95) is relatively large, and hence the smooth surface endless belt 95 at the upper side is departed from the wet paper RP0 on the mesh endless belt 45 at the lower side. Hence, part M' of the total moisture M of the moisture contained in the wet paper RP0 squeezed to the upstream side of the both rolls 70, 71 and moisture held in the dewatering roll 70 is not absorbed by the dewatering roll 70 through the mesh endless belt 45, but may be absorbed in the wet paper RP0, and the wet paper RP0 may return to the state of slurry.

If the intersecting angle of the smooth surface endless belt 95 at the upper side and the mesh endless belt 45 at the lower side is not so large, such problem does not occur, and installation of slurry preventive roll 75 may be omitted.

The wet paper RP0 squeezed and dewatered by the dewatering roll 41 is rolled and transferred on the downside of the smooth surface endless belt 95 at the upper side from the upside of the mesh endless belt 45 at the lower side, and is conveyed together with the smooth surface endless belt 95, and dried by the drying belt conveyor 42.

This transfer action is considered to occur from the smooth surface structure of the smooth surface endless belt 95. That is, the surface of the smooth surface endless belt 95 at the upper side is a rough surface having numerous continuous fine pores, while the surface of the smooth surface endless belt 95 at the upper side is a smooth surface not having pores. As a result, the wet paper RP0 slightly containing moisture is estimated to be attracted by the surface tension on the surface of the smooth surface endless belt 95.

As mentioned above, the running speed of the smooth surface endless belt 95 is set larger than the running speed of the mesh endless belt 45, and when the wet paper RP0 squeezed and dewatered by the dewatering roll 41 is transferred and rolled on the downside of the smooth surface endless belt 95 at the upper side from the upside of the mesh endless belt 45 at the lower side, since a tension is applied to the wet paper RP0 by the difference in speed, the wet paper RP0 is not creased, but is smoothly transferred onto the smooth surface endless belt 95.

The drying belt conveyor 42 has the smooth surface endless belt 95, drive motor 96, and heating and drying unit 97, installed at a position of obtaining recycled paper RP after drying the wet paper RP0 squeezed and dewatered in the dewatering roll 41 after paper making process on the paper making net conveyor 40.

The smooth surface endless belt 95 is for conveying the wet paper RP0 while heating and drying, and is specifically an endless belt of plate member of smooth surface structure having a specified width formed continuously in a ring in specified length.

The specified width is set slightly larger than the width of the recycled paper RP to be manufactured same as in the mesh endless belt 45. The plate material of the smooth surface structure can be finished to an appropriate smooth surface on one side of the wet paper RP0, so as to withstand heating action by the heating and drying unit 97 described below, and is preferably made of elastic heat resistant material such as fluoroplastic or stainless steel, and a fluoroplastic belt is used in the shown preferred embodiment. The specified length is long enough so that the wet paper RP0 may be heated and dried to be a completed product of recycled paper RP, and is set to a size enough to be accommodated in the storing space of the drying belt conveyor 42 in the apparatus case 5.

The smooth surface endless belt 95 is rotatably suspended and supported by way of drive roller 100, follower rollers 101, 102, press roll 71, slurry preventive roll 75, smooth surface finishing rolls 103, 103, and preliminary dewatering roll 74 as shown in FIG. 2 and FIG. 6, and is driven by and coupled to the drive motor 96 by way of the drive roller 100.

The drive motor 96 for driving the smooth surface endless belt 95 is commonly used as the driving source of the paper making net conveyor 40 and dewatering roll 41 as mentioned above, and this common structure or drive coupling mechanism is shown in FIG. 6.

In FIG. 6, reference numeral 105 is a power transmission gear, numeral 106 is a sprocket, numeral 107 is a power transmission chain applied between the sprockets 106, 106, and numeral 78 is a power transmission shaft.

The gear ratio of power transmission gears 105, 105, and sprockets 106, 106, . . . is determined so that all of the drive roller 100, follower rollers 101, 102, press roll 71, slurry preventive roll 75, smooth surface finishing rolls 103, 103, and preliminary dewatering roll 74 may roll and contact on the smooth surface endless belt 95 substantially at an identical peripheral speed because the drive source is a single drive motor 96.

The heating and drying unit 97 is a location for heating and drying the wet paper RP0 on the smooth surface endless belt 95, and includes a heater plate 109 disposed somewhere in the running route of the smooth endless belt 95 as a heating unit.

The heater plate 109 in the shown preferred embodiment is provided in the horizontal running portion in the running route of the smooth surface endless belt 95, and more specifically provided in contact with the opposite side of the upside of the holding side of the wet paper RP0, that is, on the downside, on the smooth surface endless belt 95. Hence, the wet paper RP0 on the smooth surface endless belt 95 is heated and dried indirectly by the smooth surface endless belt 95 heated by the heater plate 109.

In the running route of the smooth surface endless belt 95, the two smooth surface finishing rolls 103, 103 are disposed. Specifically, these smooth surface finishing rolls 103, 103 are disposed parallel opposite to the heater plate 109 in the running portion in the running route of the smooth endless belt 95.

The both smooth surface finishing rolls 103, 103 are sequentially roll and press the wet paper RP0 on the smooth surface endless belt 95, and finish the one side and opposite side of the wet paper RP0 contacting with the surface of the smooth surface endless belt 95 to a proper smooth surface.

In the shown preferred embodiment, two smooth surface finishing rolls 103, 103 are provided, but the number of smooth surface finishing rolls may be properly increased or decreased depending on the purpose.

At the downstream side of the heating and drying unit 97 of the smooth surface endless belt 95, a stripping member 110 is provided. Specifically, the striping member 110 is a heat resistant elastic spatula, and the parting member 110 of the preferred embodiment is made of an elastically deformable stainless steel plate of about 0.1 to 3 mm in thickness coated with Teflon (registered trademark) on the outer circumference, and its base end is supported at the fixed side (not shown), and its leading end edge 110*a* elastically abuts and stops on the surface of the smooth surface endless belt 95.

The paper dried and conveyed on the smooth surface endless belt 95, that is, the recycled paper RP is sequentially separated from the holding side of the smooth surface endless belt 95 by the leading end edge 110*a* of the stripping member 110.

In this relation, at the downstream side of the stripping member 110, that is, at the terminal end position of running route of the smooth surface endless belt 95 or the terminal end position of the drying belt conveyor 42, a size cutter 111 is provided for cutting the recycled paper RP separated from the smooth surface endless belt 95 to a specified size and shape (only the length is shown in the drawing). The size cutter 111 is not particularly shown in the drawing, but may be realized by known structure, such as double-side slitter, or guillotine cutter by solenoid.

The recycled paper RP separated form the smooth surface endless belt 95 is cut specified length by the size cutter 111 (vertical size of A4 format in the shown preferred embodiment), and the recycle paper RP of proper size is obtained, and discharged from the discharge port 112 of the apparatus case 5. Cutting in specified length is realized by measuring the belt feed rate of the smooth surface endless belt 95 by proximity switch, encoder and other sensors.

IV. Control Section 4

The control section 4 automatically controls the operation of driving parts of the macerating unit 6 and paper making section 3 by cooperating mutually, and comprises a microcomputer specifically including CPU, ROM, RAM, and I/O ports.

The control section 4 stores programs for continuously executing the pulp manufacturing process of the pulp making section 2 and the paper making process of the paper making section 3, and also stores preliminarily various data including the driving time of agitating device 8 in the macerating unit 6, operation timing of water feed device 9, running speed of conveyors 40, 42 in the paper making section 3, driving time of heating and drying unit 97, and operation timing of size cutter 111, through keyboard or selective input setting.

Various devices are electrically connected to the control section 4 as mentioned above, such as float switches 18, 19, 30, 87, 88, and drive units 12, 16, 31, 46 (72, 96), 89, 105, 111, and the control section 4 control these drive units 12, 16, 31, 46 (72, 96), 89, 105, 111, according to the measured values and data.

The used paper recycling apparatus 1 having such configuration is started by turning on the power, and the control section 4 automatically controls these drive units in mutual relation, and executes the following processes. Consequently, the used paper UP, UP, . . . charged in the used paper recycling apparatus 1 is macerated in the macerating unit, and leak of confidential information or private information printed on the used paper UP is effectively prevented, and the used paper pulp UPP is processed in the paper making section 3, and is regenerated as recycled paper RP.

i) The heater plate 109 of the heating and drying unit 97 starts heating until reaching a specified temperature, and the specified temperature is maintained thereafter automatically.

ii) The macerating unit 7 starts operation, and a specified amount of water W is supplied in the agitating tank 10 of the agitating device 8 from the water feed device 9. The specified amount is a minimum necessary volume for macerating and mashing the used paper UP, UP, . . . charged in the agitating tank 10 (about 1.5 liters in the illustrated preferred embodiment), and the water feed time of the water feed pump 16 is controller by the timer.

iii) The used paper UP, UP, . . . is charged from the inlet 10*a* of the agitating device 8 by a specified number of sheets (the capacity determined from the processing capacity of the apparatus 1, or about 8 sheets of A4 format or about 32 g in the preferred embodiment), and the switch is turned on, and the agitating device 8 starts to operate, and the agitating impeller 11 repeats normal rotation and reverse rotation for a specified time by timer operation (about 3 to 5 minutes in the illustrated preferred embodiment), and the used paper UP, UP, . . . is macerated and mashed, and used paper pulp UPP is prepared.

iv) When the used paper UP, UP, . . . becomes used paper pulp UPP by timer operation of the impeller 11 for specified time, the mashing unit 7 also starts operation, and the feed port 25 and discharge port 26 of the mashing tank 23 of the mashing machine 20 are opened, and the rotary mashing member 22 of the mashing members 21, 22 starts rotation.

As a result, a pulp swirl tank is formed by the mashing tank 23 and agitating tank 10, and the used paper pulp UPP macerated and mashed by the agitating impeller 11 flows into the mashing tank 23 and flows in the direction of outer circumference from the center of rotation through the mashing clearance A of mashing members 21, 22, and receives the pressing, mashing and ink grinding and pulverizing action from the mashing unit 7, and returns to the agitating tank 10, and circulates between the pulp swirl tanks 10, 23, and is sequentially and repeatedly processed for specified time by timer operation, by agitating and macerating action by the macerating unit 6, and pressurizing, mashing, ink grinding and pulverizing action by the mashing unit 7, and the used paper pulp UPP is mashed until reaching an appropriate paper strength for recycling of paper in the paper making section 3 in a later process.

v) When the used paper pulp UPP is mashed sufficiently, operation of the mashing unit 7 stops, and the drain valve of the agitating device 8 opens, and the whole volume of used paper pulp UPP in the agitating tank 10 is discharged into the concentration adjusting tank 36.

In this case, also for the purpose of cleaning of agitating tank 10, in the midst of discharge of used paper pulp UPP, water is supplied into the agitating tank 10 from the water feed device 9, while the agitating impeller 11 is put in rotation. Opening of discharge valve, feed of cleaning water, and rotation of agitating impeller 11 are all controlled sequentially by the timer.

vi) Simultaneously with or after discharge of used paper pulp UPP in the concentration adjusting tank 36, white water W is added in the concentration adjusting tank 36 from the concentration adjusting water feed unit 9. Supply of white water W continues until the float switch 30 in the concentration adjusting tank 36 is actuated by detecting a specified water level. By addition of white water W, the concentration of used paper pulp UPP is adjusted, and pulp suspension PS of specified concentration is prepared.

In the shown preferred embodiment, in the whole volume of used paper pulp UPP (about 32 g of used paper UP+1.5 l liters of water W), white water W is added until the water volume in the concentration adjusting tank 36 becomes 30.5 liters, that is, the total volume (whole amount) of used paper pulp UPP and water W becomes 32 liters, and hence the concentration of the pulp suspension PD is adjusted to about 0.1%.

vii) When the concentration adjustment of pulp suspension PS is completed in the concentration adjusting tank 36, the float switch 30 is turned on, and the first suspension feed pump 31 is put in operation, and almost whole volume is supplied into the pulp feed tank 85. This supply of whole volume is also controlled by timer operation.

While the pulp suspension PS is being supplied into the pulp feed tank 85, water in the white water collect tank 15 is not supplied into the concentration adjusting tank 36 (to prevent change of adjusted concentration).

viii) When the lower limit water level float switch 87 in the pulp feed tank 85 (disposed corresponding to the water level of minimum required water volume necessary for starting paper making process) is turned on, the drive motor 46 (72, 96) is actuated to start driving of mesh endless belt 45 to start paper making process, and the pulp suspension PS in the pulp feed tank 85 is supplied into the overflow tank 81 of the pulp feed unit 47 by the second suspension feed pump 89.

In this case, by the time of supply of pulp suspension PS in the pulp feed unit 47, the drive motor 46 (72, 96) operates with a specific time lag, and the operation of the mesh endless belt 45 is delayed.

The drive motor 46 (72, 96) is used not only as the drive source for mesh endless belt 45, but also as the rotation drive source for rolls 70, 71 of dewatering roll 41, running drive source for smooth surface endless belt 95 of drying belt conveyor 42, and rotation drive source for smooth surface finishing rolls 103, 103, and they are also driven simultaneously in cooperation.

ix) The pulp suspension PS supplied in the overflow tank 81 overflows from the overflow tank 81, flows down onto the flat member 82 of the partition member 79, and is diffused uniformly on the upside of the mesh endless belt 45 by cooperative stagnant action of main body frame 80 and partition member 79 of the paper making frame 78. At the same time, by the running action of the mesh endless belt 45, the diffused pulp suspension PS is conveyed while being dragged by the mesh endless belt 45 by keeping the width L defined by the main body frame 80, and is filtered and dewatered by the mesh cells of the mesh endless belt 45, and wet paper RP0 is prepared.

The white water W filtered and dewatered by the mesh endless belt 45 is collected in the white water collect tank 15 of the water feed device 9, and is circulated and reused.

x) The wet paper RP0 conveyed together with the mesh endless belt 45 is supplied into the preliminary dewatering roll 74, where the wet paper RP0 is changed in the position from the oblique running state to horizontal running state, and is lightly dewatered by complex and synergistic effect by cooperative action with the water absorbing action of the preliminary dewatering roll 74, and processed by pressing action of the slurry preventive roll 75, and is sent into the dewatering roll 41 while being held between the mesh endless belt 45 and smooth surface endless belt 95.

xi) In the dewatering roll 41, the wet paper RP0 is held between the mesh endless belt 45 and smooth surface endless belt 95 by the pressing action of the slurry preventive roll 75, and passes between the dewatering roll 70 and press roll 71 while being rolled and squeezed by the both rolls 70, 71 from upper and lower sides in pressed state. As a result, the wet paper RP0 is dewatered to a specified moisture content by the squeezing and dewatering mechanism as shown in FIG. 6(*b*), being assisted by preliminary action of the slurry preventive roll 75 as mentioned above.

xii) The wet paper RP0 squeezed and dewatered by the dewatering roll 41 is sent to the downside position of the dewatering roll 41, and is rolled and transferred on the smooth surface endless belt 95 at the upper side from the mesh endless belt 45 at the lower side, and is then transferred together with the smooth surface endless belt 95, and is heated and dried by the heater plate 109 of the drying belt conveyor 42, and recycled paper RP is prepared.

At the same time, the wet paper RP0 or recycled paper RP is continuously rolled and pressurized by the two smooth surface finishing rolls 103, 103 disposed oppositely to the heater plate 109 to the smooth surface endless belt 95, and the opposite side surface of the surface of the side contacting with the surface of the smooth surface endless belt 95 is finished to a proper smooth surface.

xiii) The recycled paper RP finished in surface by the two smooth surface finishing rolls 103, 103 is held in fixed state to the surface of the smooth surface endless belt 95, and is sequentially separated from the holding side of the smooth endless belt 95 by the leading end edge 110*a* of the stripping member 110, and is cut to a specified length by the size cutter 111, and is discharged as recycled paper RP of specified shape and size from the discharge port 112 of the apparatus case 5.

xiv) When the pulp suspension PS in the pulp feed tank 85 is decreased from the minimum volume necessary for starting paper making process (almost empty state), the lower limit water level float switch 87 is turned off, and supply of pulp suspension PS by second suspension feed pump 89 is stopped, and the drive motor 46 (72,96) is also stopped, and the paper making process is terminated.

In this case, the drive motor 46 (72,96) is stopped after a time lag necessary for complete discharge of pulp suspension PS in the paper making process from the discharge port 112 wholly as recycled paper RP.

xv) Back to step iii), the used paper UP, UP, . . . is additionally charged by a specified number of sheets (the capacity determined from the processing capacity of the apparatus 1, or about 8 sheets of A4 format or about 32 g in the illustrated preferred embodiment), and the switch is turned on again, and the process of iv) to xiv) is executed sequentially.

The process so far shows the actions necessary for pulping and recycling of used paper, and actual operation is protected by various safety measures and interlock controls.

The used paper recycling apparatus 1 having such configuration brings about the following effects, and it can be installed not only in a large office, but also in a small shop or a room in general household, is friendly to the environment and low in running cost, capable of preventing leak of confidential information, private information, and other information, and keeping a high confidentiality.

(1) In the apparatus case 5 of furniture size, the apparatus includes the pulp making section 2 for manufacturing used paper pulp UPP by macerating and mashing used paper UP, the paper making section 3 for manufacturing recycled paper RP by making the used paper pulp UPP manufactured in the pulp making section 2, and the control section 4 for driving and controlling the pulp making section 2 and paper making section 3 by interlocking, and the used paper UP can be recycled at the site of origin, and disposal of used paper UP is decreased, and not only the refuse problems can be solved, but also the limited resources can be utilized effectively.

In particular, from confidential problems, recycling of private and confidential used paper UP is not promoted, and by recycling the used paper UP at the site of origin, the resources can be utilized effectively.

(2) At the site of origin of used paper UP, a compact used paper recycling system having a same function as large scale system installed in paper making plant or used paper recycling plant is installed, and used paper UP can be recycled continuously in a closed circuit in a small shop or general household, and refuse collection and transportation expenses and incineration and other costs are saved, and it is very economical.

(3) The mashing machine 20 composing the mashing unit 7 of the pulp making section 2 presses and mashes the used paper UP by its mashing action surfaces 21a, 22a, and pulverizes the inks forming characters and patterns on the used paper UP, and only drinking water from city water works can be used, and any particular de-inking agents and other chemicals used in large scale used paper recycling system such as paper making plant and used paper recycling plant are not needed.

That is, inks forming characters and patterns on the used paper UP are pulverized by the mashing machine, and only innumerable small spots are scattered in the recycled paper RP like irregular dot pattern (for example, about 4 to 30 dots per square millimeter, or about 8 dots in average), and it is visually recognized as plain paper with a slight tint, or at close-up distance, it is recognized as fine and uniform dot pattern, and recycled paper RP of high degree of whiteness is obtained, and same effects as de-inking are obtained.

Without using special chemicals, used paper UP can be recycled by using tap water only, and it is free from environmental problems spreading the world over, conforms easily to the environmental regulations, and presents a used paper recycling system friendly to the environment.

(4) The pulp making section 2 comprises a macerating unit 6 for agitating, grinding and macerating the used paper UP, and a mashing unit 7 for mashing the used paper UP macerated in the macerating unit 6, and the used paper UP pulp circulates between the macerating unit 6 and mashing unit 7, and the used paper pulp UPP is mashed efficiently according to the purpose, and optimum mashing effects are obtained, and recycled paper RP of high quality is obtained.

(5) By the pulp making section 2 for macerating and mashing used paper UP and manufacturing used paper pulp UPP, the used paper UP is mashed to fiber level (to be pulp), and printed characters and patterns are completely destroyed and cannot be restored. Hence, leak of confidential information and private information of printed characters and patterns can be securely prevented, and a high confidentiality is assured.

(6) Moreover, the apparatus structure is compact, and it can be installed not only in large office, but also in small shop or general household, and from this point of view, too, leak of confidential information and private information can be securely prevented.

(7) The water W used in the pulp making section 2 is the water W collected from the paper making unit 3 after dewatering in water circulation system, and the driving source of the pulp making section 2 and paper making section 3 is the driving power source driven by an alternating-current power source for general household, and it is friendly to the environment, low in running cost, and economical.

(8) Being installed at the site of origin of used paper UP, the pulp making section 2 macerates the used paper UP into used paper pulp UPP, and the paper making section 3 manufactures the used paper pulp UPP into recycled paper RP, and information of characters and patterns printed on the paper is not diffused outside of the site of origin of used paper UP, and leak of confidential information and private information can be prevented securely, and a high confidentiality is held and the resources can be utilized effectively.

That is, by using the used paper recycling apparatus 1 of the preferred embodiment, it is free from risk of external diffusion of various information from the closed system of its used (for example, school, hospital, city office, law firm, patent office, general household).

In other words, in the case of a conventional shredder, if the used paper is shredded into small chips, and the printed characters and patterns are not legible, the shredded chips are incinerated, and external diffusion cannot be prevented perfectly. In this regard, the waste chips may be stored within an internal warehouse, but storing place is needed, and the resources are used only once and are not utilized effectively.

By contrast, according to the used paper recycling apparatus 1 of the preferred embodiment, the information printed on the used paper is not diffused outside of the closed system, and the resources can be utilized effectively.

Preferred Embodiment 2

This preferred embodiment is shown in FIG. 11 to FIG. 14 (FIG. 14A, FIG. 14B), and is similar to preferred embodiment 1, except that the structure of mashing unit 7 is modified.

The mashing unit 7 of the preferred embodiment has one mashing machine 120 same as in preferred embodiment 1.

Figure 11:
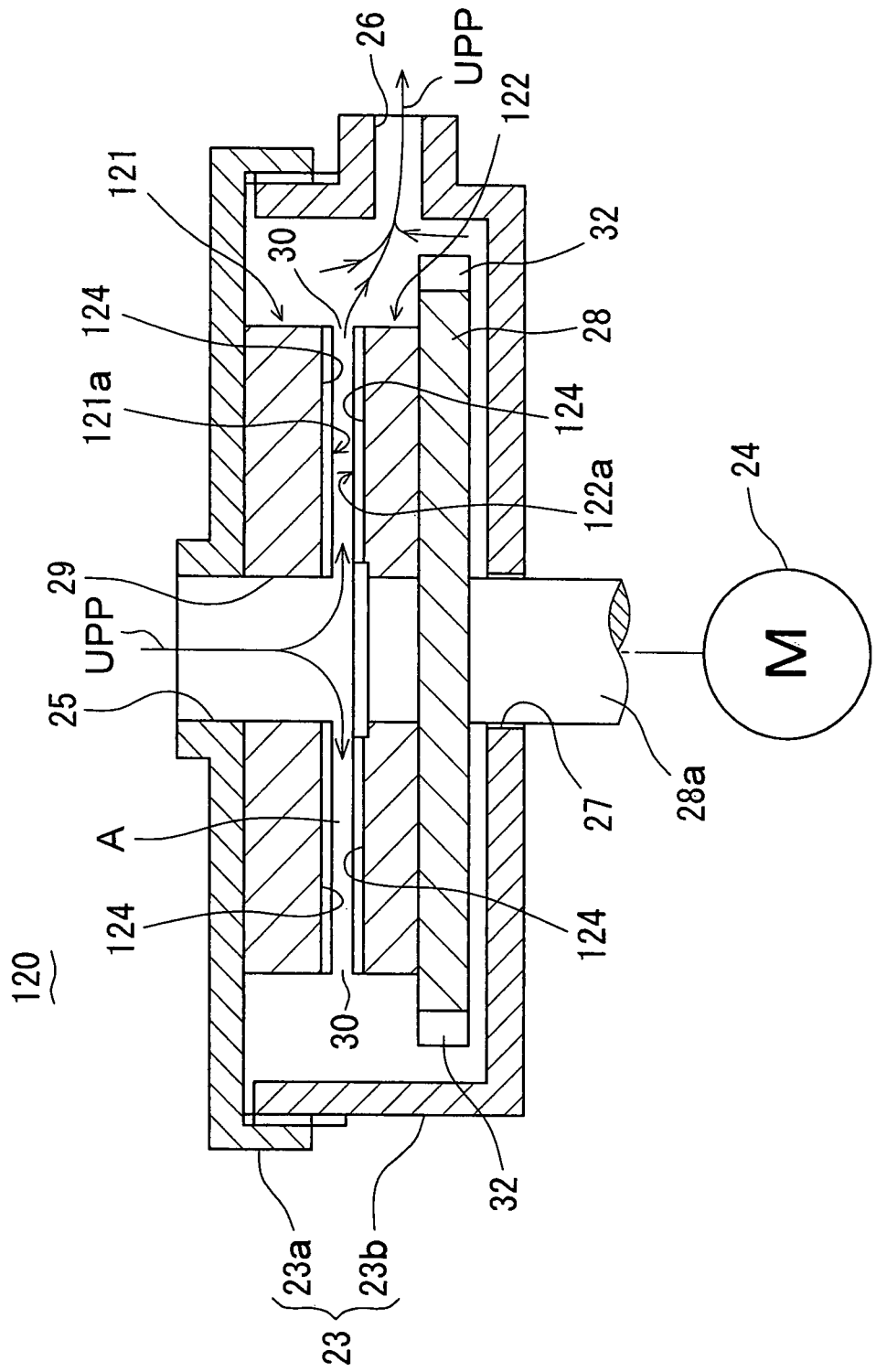
FIG. 11 is a front sectional view showing essential parts of mashing unit of pulp making section in used paper recycling apparatus in preferred embodiment 2 of the invention.

As shown in FIG. 11, the mashing machine 120 is mainly composed of a plurality (two in this example) of relatively moving mashing members 121, 122 disposed oppositely across a tiny mashing clearance A.

The two mashing members 121, 122 are relatively rotating disks, and the upper side mashing member 121 is fixed, and the lower side mashing member 122 is rotating.

That is, same as in preferred embodiment 1, the upper fixed mashing member 121 is fixed to the inner side of the ceiling of the upper tank 23a by proper fixing means, and the lower rotating mashing member 122 is concentrically and rotatably disposed oppositely to the fixed mashing member 121 across a tiny mashing clearance A. The rotating mashing member 122 is integrally provided on a rotary bench 28, and a rotary support shaft 28a of the rotary bench 28 is directly fixed to a rotary shaft 24a of the drive motor 24, and a direct motor structure is formed.

Mashing action surfaces 121a, 122a of the both mashing members 121, 122 forming the tiny mashing clearance A are flat planes on which multiple mashing grooves 124, 124, ... are provided, and the mashing clearance A formed on the plane at close distance is formed between the mashing action surfaces 121a, 122a as shown in FIG. 11.

Figure 12A:
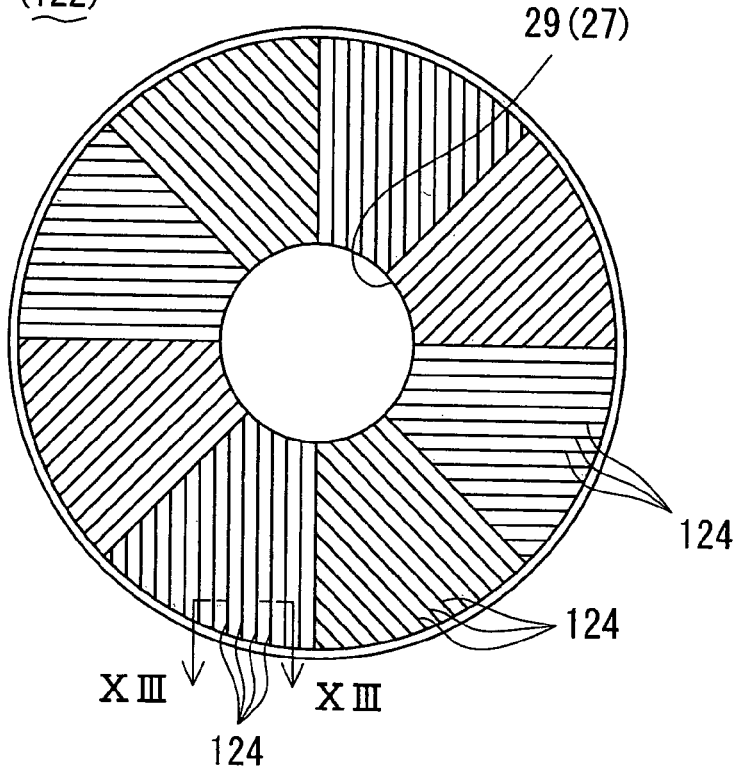
FIG. 12A and FIG. 12B are front views of mashing member as principal part of the mashing unit, showing forming patterns of mashing grooves in the mashing action surface of the mashing member.
Figure 12B:
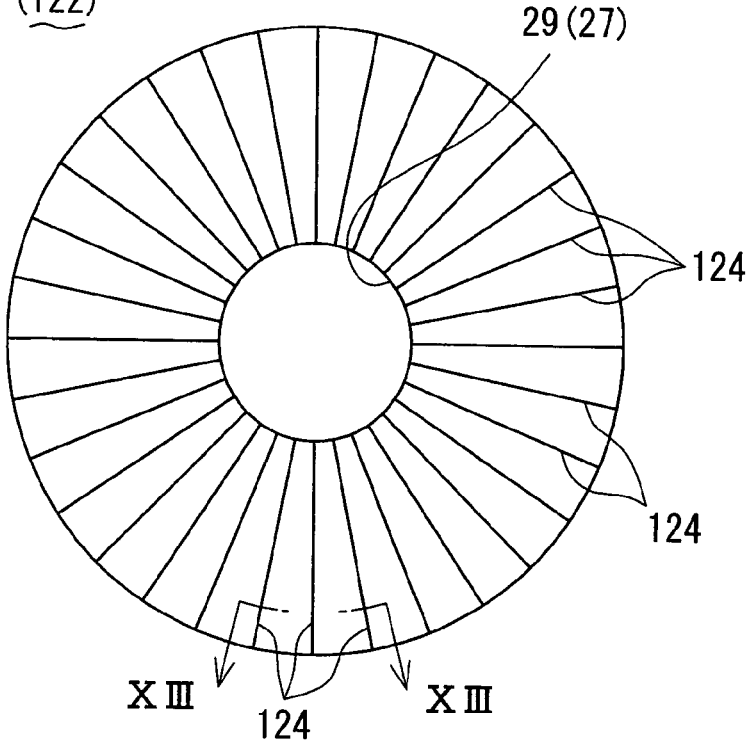
Figure 13A:
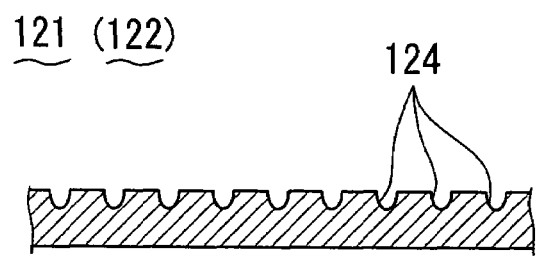
FIG. 13A, FIG. 13B, FIG. 13C, and FIG. 13D are sectional views along line XIII-XIII in FIG. 12A and FIG. 12B, showing the mashing member as principal part of the mashing unit, and the sectional shape of each mashing groove.
Figure 13B:
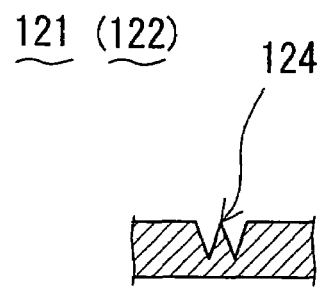
Figure 13C:
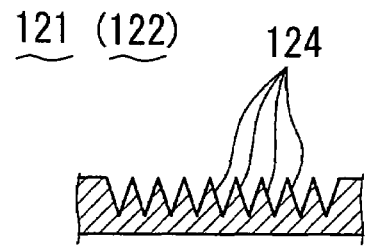
Figure 13D:
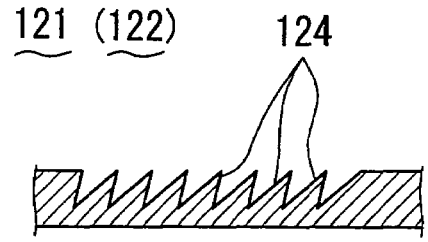
Figure 14A:
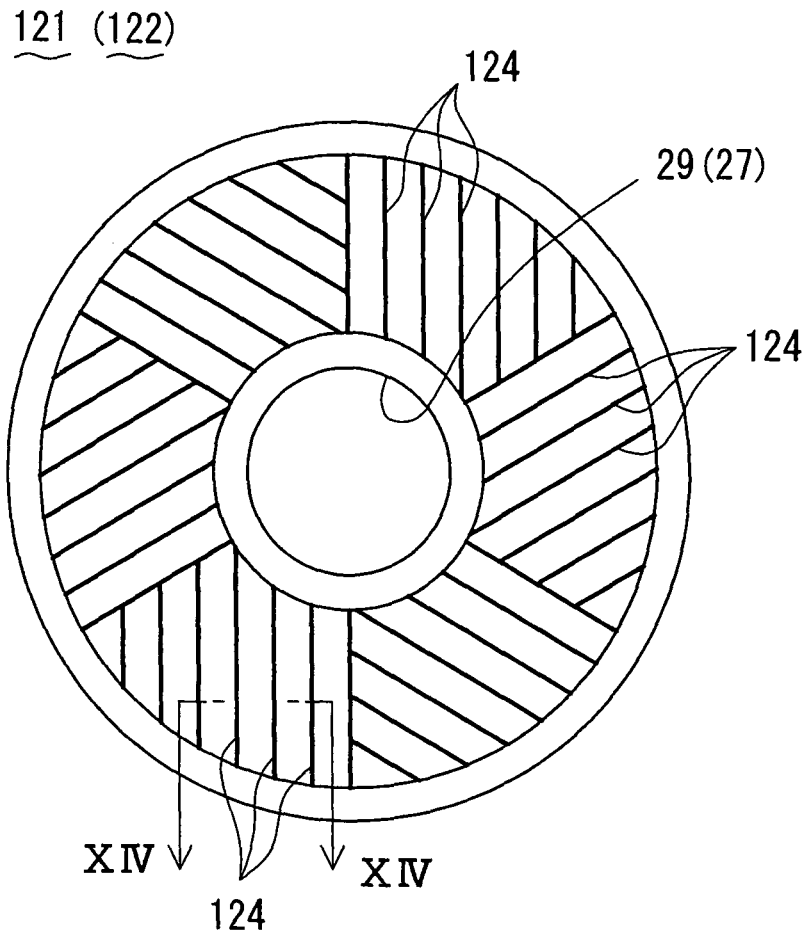
FIG. 14A is a front view of forming pattern of mashing groove of mashing tank, showing a modified example of the mashing member.
Figure 14B:
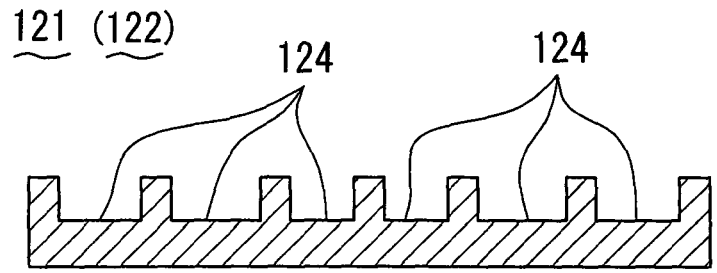
FIG. 14B is a sectional view along line XIV-XIV in FIG. 14A, showing a modified example of the mashing member, in particular, a sectional shape of mashing groove.

The mashing grooves 124, 124, ... are structures for raising the coefficient of thermal expansion of the mashing action surfaces 121a, 122a, and the forming patterns are various, as shown in FIG. 12A, FIG. 12B, or FIG. 14A. Sectional shapes of mashing grooves 124, 124, ... are also various as shown in FIGS. 13A, 13B, 13C, 13D, and FIG. 14B.

Materials for mashing action surfaces 121a, 122a, that is, mashing members 121, 122 include ceramics, stainless steel, aluminum, glass, porcelain, vinyl chloride, wood and others, and stainless steel or rigid metal is preferred from the viewpoint of durability of mashing members 121, 122 and mashing machine 120.

The gap dimension of mashing clearance A is set at about 0.05 to 0.8 mm. The gap dimension of mashing clearance A can be finely adjusted, same as in preferred embodiment 1, by relatively rotating the upper tank 23a and lower tank 23b of the mashing tank 23, and moving back and forth the engagement portion.

In the mashing machine 120 having such configuration, when the rotating mashing member 122 is rotated and driven to the fixed mashing member 121 by the drive motor 24, the used paper pulp UPP supplied into the feed port 25 of the mashing tank 23 from the agitating tank 10 of the macerating unit 6 flows into the mashing clearance A from the inlet 29, passes through the mashing clearance A, and receives the pressurizing and mashing action by the relatively rotating mashing action surfaces 121a, 122a, and inks forming characters and patterns on the used paper UP are ground and pulverized, and it returns to the agitating tank 10 from the outlet 30 by way of the discharge port 26 of the mashing tank 23 (see the flow passage indicated by arrow in FIG. 11).

Other structure and operation are same as in preferred embodiment 1.

Preferred Embodiment 3

This preferred embodiment is shown in FIG. 15 and FIG. 16, and is similar to preferred embodiment 1, except that the structure of mashing unit 7 is modified.

The mashing unit 7 of the preferred embodiment has one mashing machine 130 same as in preferred embodiment 1. As shown in FIG. 15, the mashing machine 130 is mainly composed of a plurality (two in this example) of relatively moving mashing members 131, 132 disposed oppositely across a tiny mashing clearance A.

The two mashing members 131, 132 are relatively rotating bowls, and the outline shape is as shown in FIG. 16.

A mashing tank 133 containing these mashing members 131, 132 in closed state has a contour section along the outer circumference of the both mashing members 131, 132 as shown in FIG. 15, and same as in preferred embodiment 1, it has an upper and lower divided structure having upper tank 133a and lower tank 133b engaged with each other.

Specifically, the upper mashing member 131 is fixed, and is fixed to the inner side of the upper tank 133a of the upper tank 133 by proper fixing means, and the lower rotating mashing member 132 is concentrically and rotatably disposed oppositely to the fixed mashing member 131 across a tiny mashing clearance A.

The rotating mashing member 132 has its central position directly fitted and fixed to a rotary support shaft 28a, and this rotary support shaft 28a is opposite to the outside of the mashing tank 23 by way of an opening 27 in the center of bottom of the lower tank 133b of the mashing tank 133, and it is directly fitted and fixed to the rotary shaft 24a of the drive motor 24 as rotary drive source, and a direct motor structure is formed.

Mashing action surfaces 131a, 132a of the both mashing members 131, 132 forming the tiny mashing clearance A are taper planes increased in diameter continuously in downward direction as shown in FIG. 15, and multiple mashing grooves 134, 134, . . . are provided, and the mashing clearance A formed on parallel conical planes at close distance is formed between the mashing action surfaces 131a, 132a.

The mashing grooves 134, 134, . . . are structures for raising the coefficient of thermal expansion of the mashing action surfaces 131a, 132a, and the forming patterns are various as shown in FIG. 16. Sectional shapes of mashing grooves 134, 134, . . . are also various as shown in FIGS. 13A, 13B, 13C, 13D, and FIG. 14B in preferred embodiment 2.

Materials for mashing members 131, 132 include ceramics, stainless steel, aluminum, glass, porcelain, vinyl chloride, wood and others, and stainless steel or rigid metal is preferred from the viewpoint of durability of mashing members 131, 132 and mashing machine 130.

The gap dimension of mashing clearance A is set at about 0.05 to 0.8 mm. The gap dimension of mashing clearance A can be finely adjusted, same as in preferred embodiment 1, by relatively rotating the upper tank 133a and lower tank 133b of the mashing tank 133, and moving back and forth the engagement portion.

In the mashing machine 130 having such configuration, when the rotating mashing member 132 is rotated and driven to the fixed mashing member 131 by the drive motor 24, the used paper pulp UPP supplied into the feed port 25 of the mashing tank 133 from the agitating tank 10 of the macerating unit 6 flows into the mashing clearance A spreading conically from the inlet 29, passes through the mashing clearance A, and receives the pressurizing and mashing action by the relatively rotating mashing action surfaces 131a, 132a, and inks forming characters and patterns on the used paper UP are ground and pulverized, and it returns to the agitating tank 10 from the outlet 30 by way of the discharge port 26 of the mashing tank 133 (see the flow passage indicated by arrow in FIG. 15).

Other structure and operation are same as in preferred embodiment 1.

Preferred Embodiment 4

Figure 17:
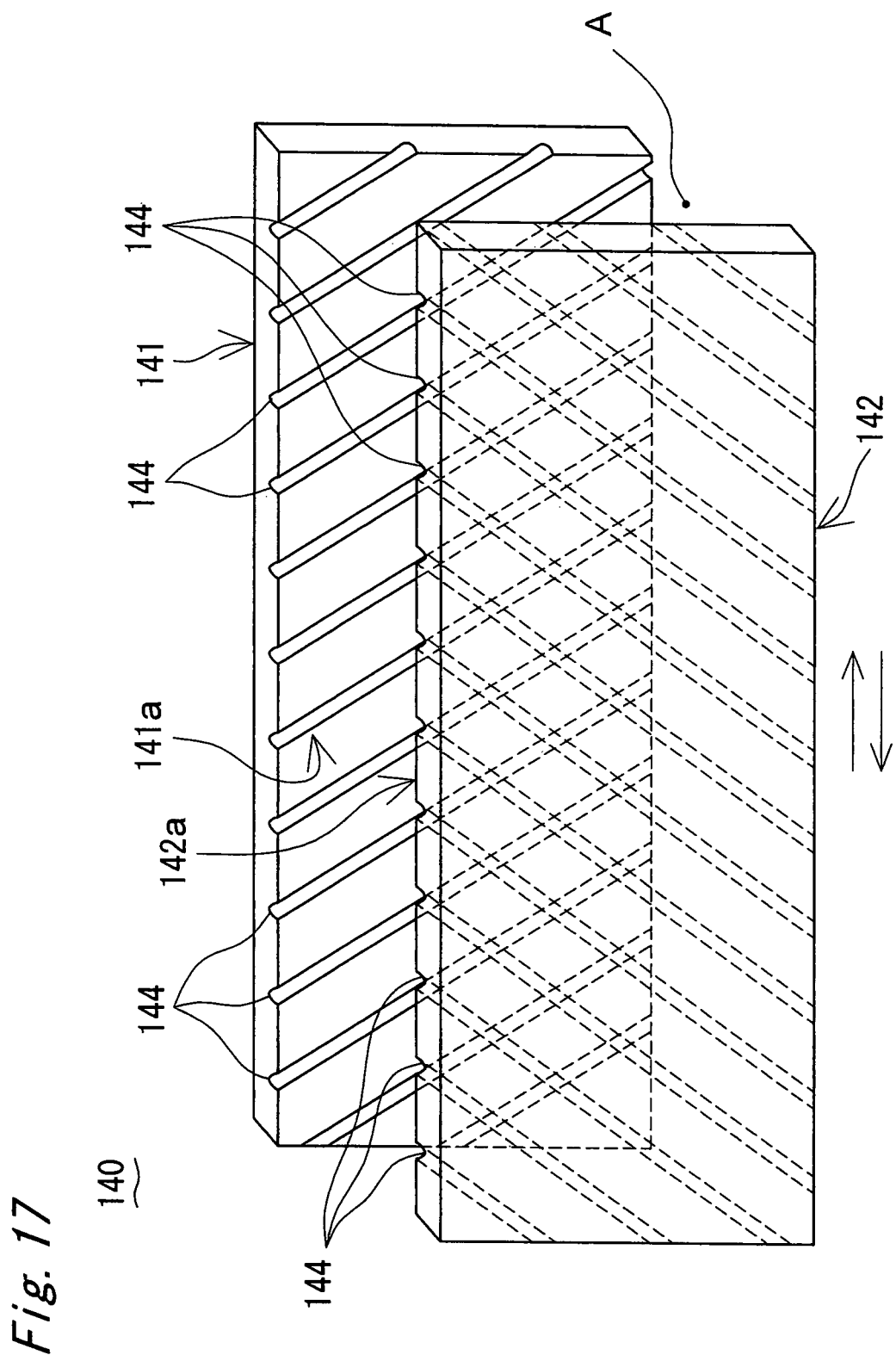
FIG. 17 is a perspective view of mashing member of mashing unit of pulp making section in used paper recycling apparatus in preferred embodiment 4 of the invention.

This preferred embodiment is shown in FIG. 17, and is similar to preferred embodiment 1, except that the structure of mashing unit 7 is modified.

The mashing unit 7 of the preferred embodiment has one mashing machine 140 same as in preferred embodiment 1. As shown in FIG. 17, the mashing machine 140 is mainly composed of a plurality (two in this example) of relatively moving mashing members 141, 142 disposed oppositely across a tiny mashing clearance A.

The two mashing members 141, 142 are relatively commuting flat plates and are incorporated in a closed type mashing tank not shown.

Specifically, one mashing member 141 is fixed, and is fixed to the inner side of the mashing tank by proper fixing means, the other moving mashing member 142 is disposed oppositely to the fixed mashing member 141 movably back and forth in parallel to the arrow direction in FIG. 17 across a tiny mashing clearance A.

Specific driving mechanism of the moving mashing member 142 is not shown, but is guided and supported by proper communicating guide means, and is driven by and coupled to proper communicating drive source such as combination mechanism of reciprocating cylinder mechanism, cam mechanism, and drive motor.

Mashing action surfaces 141a, 142a of the both mashing members 141, 142 forming the tiny mashing clearance A are flat as shown in the drawing, and multiple mashing grooves 144, 144, . . . are provided, and the mashing clearance A formed on parallel flat planes at close distance is formed between the mashing action surfaces 141a, 142a.

The mashing grooves 144, 144, . . . are structures for raising the coefficient of thermal expansion of the mashing action surfaces 141a, 142a, and the forming patterns are various as shown in the drawing. Sectional shapes of mashing grooves 144, 144, . . . are arc shapes as shown in the drawing, or various shapes as shown in FIGS. 13A, 13B, 13C, 13D, and FIG. 14B in preferred embodiment 2.

Materials for mashing members 141, 142 include ceramics, stainless steel, aluminum, glass, porcelain, vinyl chloride, wood and others, and stainless steel or rigid metal is preferred from the viewpoint of durability of mashing members 141, 142 and mashing machine 140.

The gap dimension of mashing clearance A is set at about 0.05 to 0.8 mm same as in preferred embodiment 2 or 3.

In the mashing machine 140 having such configuration, when the rotating mashing member 142 is moved back and forth to the fixed mashing member 141 by reciprocal drive source not shown, the used paper pulp UPP supplied into the feed port 25 of the mashing tank (not shown) from the agitating tank 10 of the macerating unit 6 flows into the mashing clearance A spreading in parallel from the inlet 29, passes through the mashing clearance A, and receives the pressurizing and mashing action by the relatively rotating mashing action surfaces 141a, 142a, and inks forming characters and patterns on the used paper UP are ground and pulverized, and it returns to the agitating tank 10 from the outlet 30 by way of the discharge port 26 of the mashing tank.

Other structure and operation are same as in preferred embodiment 1.

Preferred Embodiment 5

Figure 18:
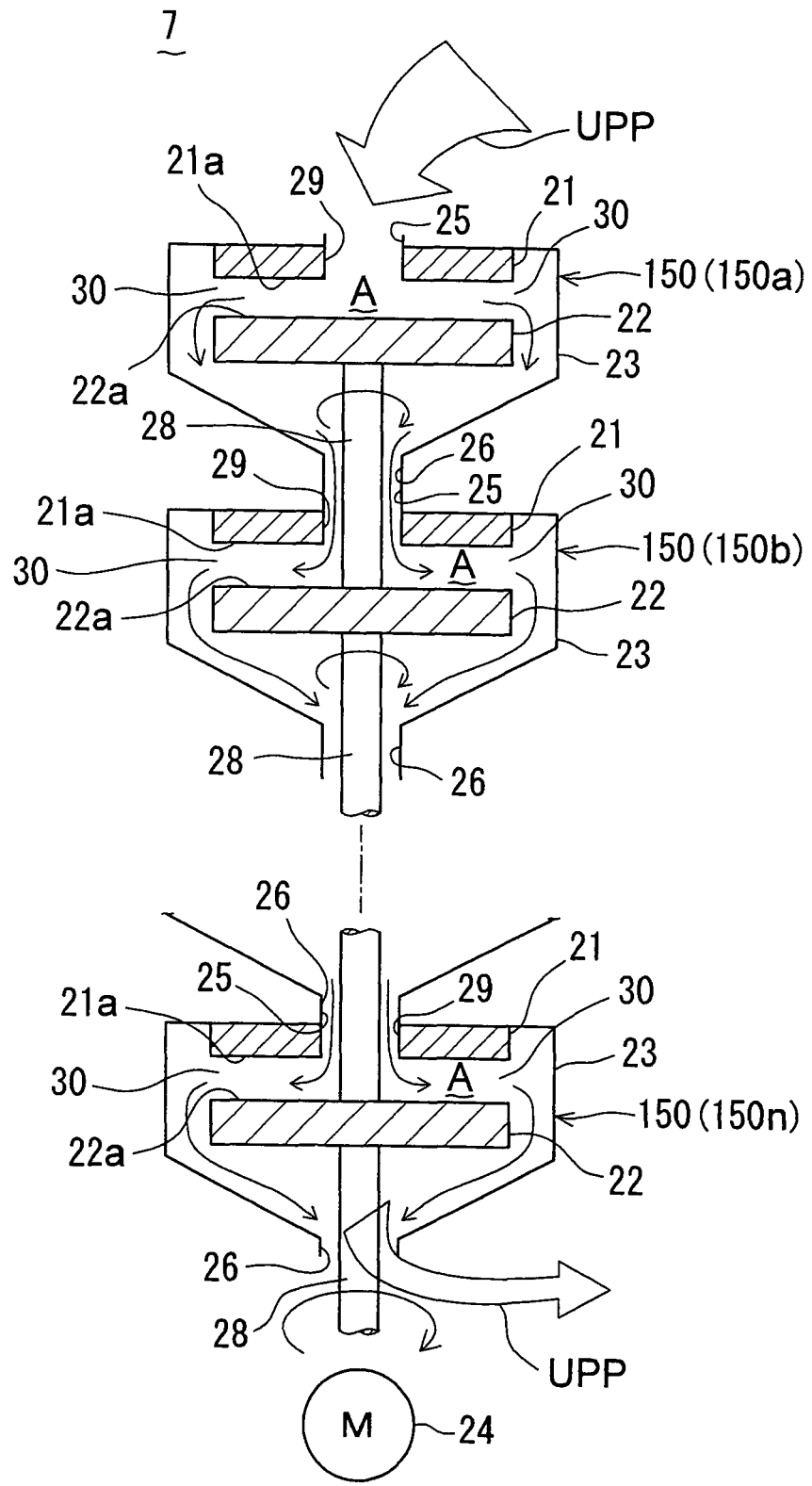
FIG. 18 is a front sectional view of outline of mashing unit of pulp making section in used paper recycling apparatus in preferred embodiment 5 of the invention.

This preferred embodiment is shown in FIG. 18, and is similar to preferred embodiment 1, except that the structure of mashing unit 7 is modified.

The mashing unit 7 of the preferred embodiment has a plurality of mashing machines 150, 150, . . . as shown in the drawing, instead of one mashing machine 20 in preferred embodiment 1.

The plurality of mashing machines 150, 150, . . . have their mashing tanks 23, 23, . . . communicating and connecting with each other, and form one enclosed tank on the whole, and the feed port 25 of the mashing tank 23 of the mashing machine 150a of the highest upstream side communicates with the agitating tank 10 of the mashing unit 6, and the discharge port 26 of the mashing tank 23 of the mashing machine of the mashing machine 150n of the lowest downstream side communicates with the agitating tank 10 of the mashing unit 6.

Between the mashing tanks 150a and 150n of the higher upstream side and lowest downstream side, mashing machines 150b, . . . , 150n-1 are interposed, and the feed port 25 of the mashing tank 23 communicates with the discharge port 26 of the mashing machine adjacent to the upstream side, and the discharge port 26 of this mashing tank 23 communicates with the feed port 25 of the mashing machine adjacent at the downstream side.

In the illustrated preferred embodiment, the specific structure of each mashing machine 150 is similar to that of the mashing machine 20 in preferred embodiment 1 (see FIG. 4 and FIG. 5), but may be also similar to the structure of mashing machine 120 in preferred embodiment 2 (see FIG. 11 to FIG. 14), preferred embodiment 3 (see FIG. 15 and FIG. 16), or preferred embodiment 4 (see FIG. 17), or the structures of these preferred embodiments may be properly combined.

In the preferred embodiment, the rotary support shafts 28a, 28a, . . . of mashing machines 150 are disposed and connected coaxially, and are driven by and connected to a single drive motor 24, and the rotary drive source is used commonly.

The gap dimension of tiny mashing clearance A formed by mashing members 21, 22 of each mashing machine 150 is set to be smaller gradually from the upstream side to the downstream side, and the gap dimension of the mashing clearance A is, for example, set at about 0.8 mm at the highest upstream side, and gradually smaller toward the downstream side, and the dimension of the mashing clearance A at the lowest downstream side is about 0.05 mm.

The rotating mashing members 22, 22, . . . of the continuous mashing machines 150a, 150b, . . . 150n are rotated and driven by the single drive motor 24 on the corresponding fixed mashing members 21, 21, . . . , and the used paper pulp UPP supplied in the feed port 25 of the mashing tank 23 at the highest upstream side from the agitating tank 10 of the mashing unit 6 sequentially passes through the mashing clearances 21a, 22a, . . . of the continuous mashing machines 150a, 150b, . . . 150n, and is pressurized and mashed by the mashing action surfaces 21a, 22a, and the inks forming characters and patterns on the used paper are ground and pulverized, and it returns to the agitating tank 10 of the mashing unit 6 again from the discharge port 26 of the mashing tank 150n at the lowest downstream side (see the flow passage indicated by arrow in FIG. 18).

In this configuration of mashing machines 150, 150, . . . connected in plural stages or multiple stages, as compared with the circulation system of circulating the used paper pulp UPP plural times between the macerating unit 6 and mashing unit 7 of the pulp making section as in preferred embodiment 1, the number of circulations is decreased or eliminated, and the mashing time can be shortened, and the used paper pulp UPP can be mashed more efficiently.

Other structure and operation are same as in preferred embodiment 1.

Preferred Embodiment 6

Figure 19:
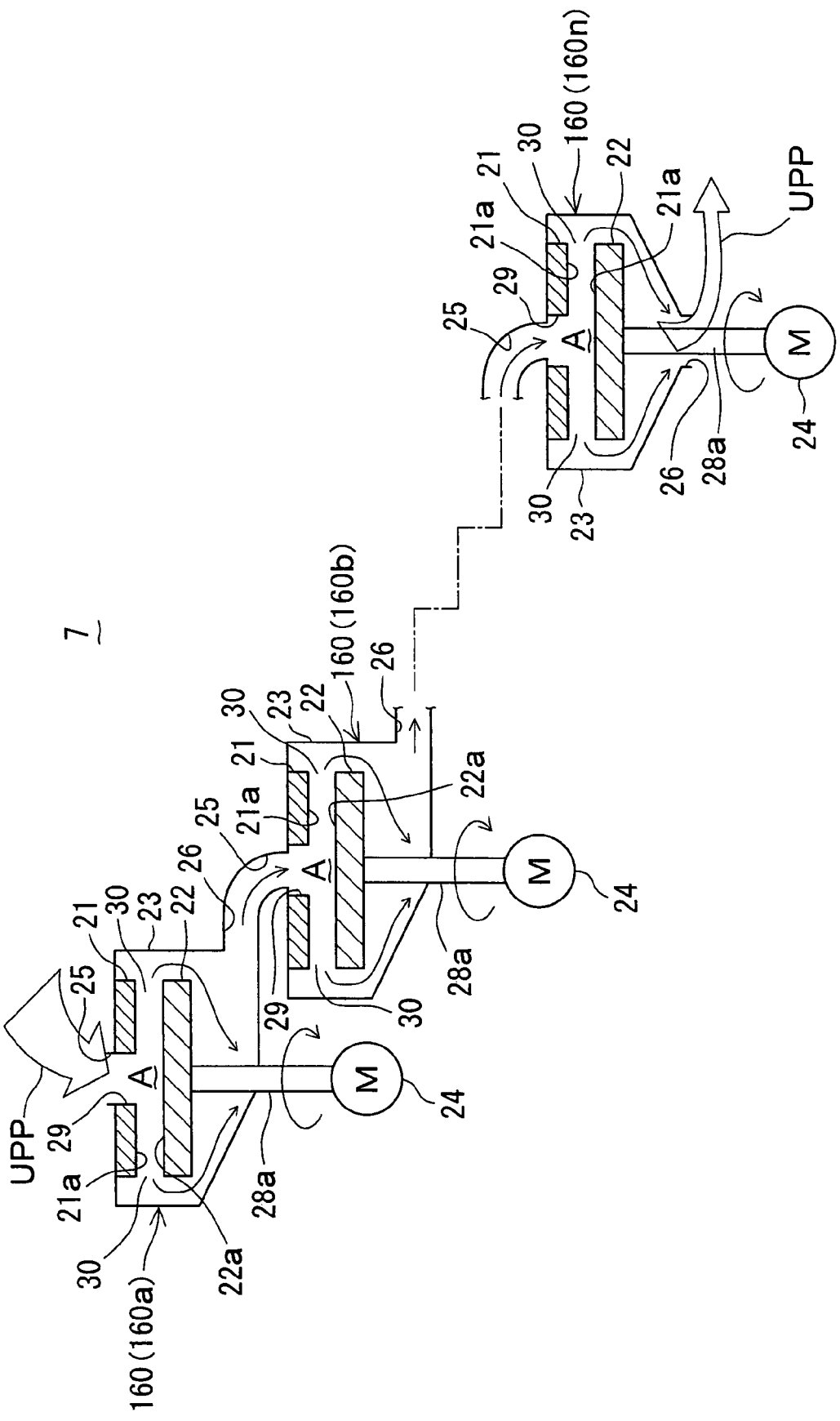
FIG. 19 is a front sectional view of outline of mashing unit of pulp making section in used paper recycling apparatus in preferred embodiment 6 of the invention.

This preferred embodiment is shown in FIG. 19, and is similar to preferred embodiment 1, except that the structure of mashing unit 7 is modified.

The mashing unit 7 of the preferred embodiment comprises a plurality of mashing machines 160, 160, . . . same as in preferred embodiment 5.

In the mashing unit 7 of the preferred embodiment, the plurality of mashing machines 160a, 160b, . . . 160n connected continuously are provided with individual drive motors 24, 24, . . . , and the relative rotating speed of mashing members 21, 22 in each mashing machine 160 can be controlled individually depending on the purpose.

Other structure and operation are same as in preferred embodiment 1.

Preferred Embodiment 7

Figure 20A:
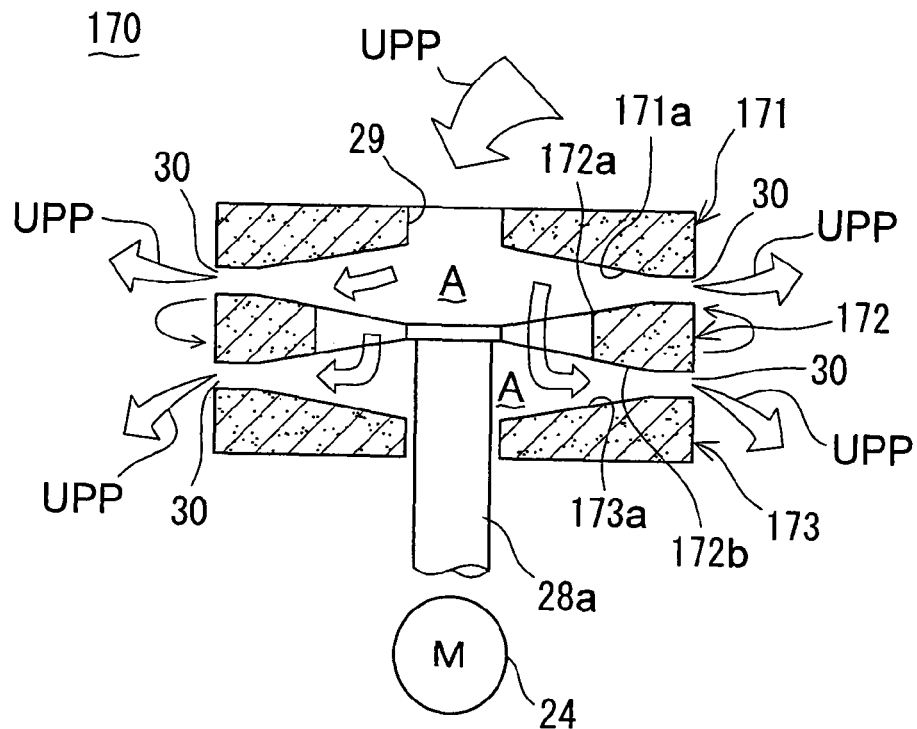
FIG. 20A is a front sectional view of outline of mashing machine of mashing unit, showing essential parts of mashing unit of pulp making section in used paper recycling apparatus in preferred embodiment 7 of the invention.
Figure 20B:
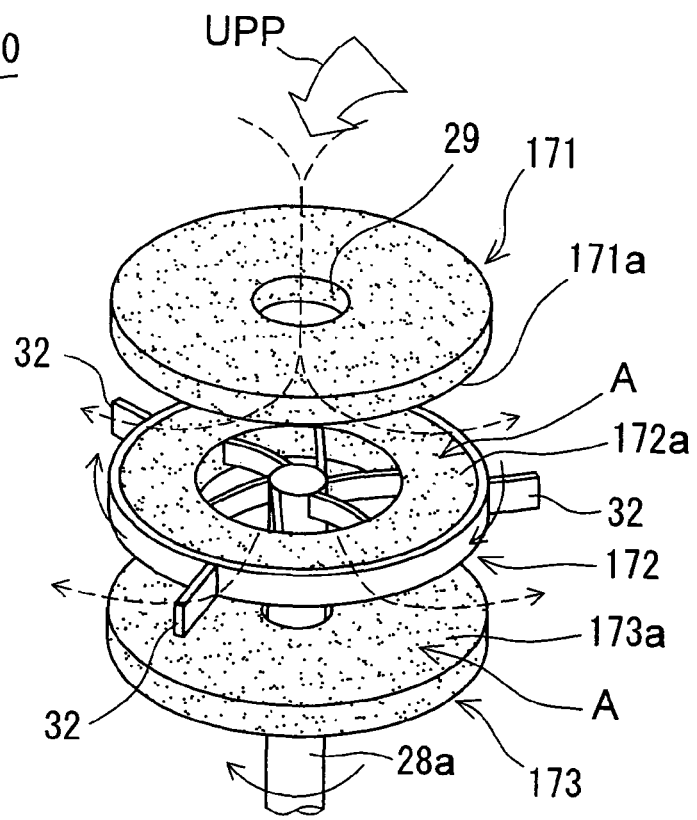
FIG. 20B is a perspective exploded view of outline of the mashing machine.

This preferred embodiment is shown in FIG. 20 (FIG. 20A, FIG. 20B), and is similar to preferred embodiment 1, except that the structure of mashing unit 7 is modified.

The mashing unit 7 of the preferred embodiment has only one mashing machine 170 same as in preferred embodiment 1.

As shown in the drawing, the mashing machine 170 is mainly composed of a plurality (three in this example) of relatively moving mashing members 171, 172, 173 disposed oppositely across a tiny mashing clearance A.

The mashing members 171, 172, 173 are relatively rotating disks, and the upper and lower mashing members 171 and 173 are fixed, and the middle mashing member 172 disposed oppositely to these both fixed mashing members 171, 173 is rotating.

Although not shown in the drawing, the mashing tank accommodating these mashing members 171, 172, 173 in a closed state is a cylindrical structure having a sectional contour along the outer circumference of the mashing members 171, 172,173, and an upper and lower divided structure is formed, same as in preferred embodiment 1, that is, the upper tank and lower tank are mutually coupled by engagement.

The upper and lower mashing members 171 and 173 are fixed to the inner side of the ceiling of the upper tank and the inner side of the bottom of the lower tank properly by fixing means, and the rotating mashing member 172 interposed between the upper and lower mashing members 171 and 173 is oppositely disposed concentrically and rotatably to the upper and lower mashing members 171 and 173 across tiny mashing clearances A, A. The rotating mashing member 122 is attached and fixed to the rotary support shaft 28a in its center, and the rotary support shaft 28a is directly connected to the rotary shaft of the drive motor 24 as the rotary drive source, and a direct motor structure is formed.

In the center of the mashing action surface 171a of the upper fixed mashing member 171, an inlet 29 communicating with the feed port of the mashing tank is formed, and two annular gaps 30, 30 formed between outer peripheral edges of mashing action surfaces 171a, 172a, 172b, 173a of three mashing members 171, 172,173 are formed as outlets 30, 30 communicating with the discharge port of the mashing tank.

The mashing action surfaces 171a, 172a, 172b, 173a mutually corresponding to the mashing members 171, 172,173 are grindstone surfaces having multiple abrasive grains coupled by a binding material, and these mashing action surfaces 171a, 172a, 172b, 173a are formed in a taper shape continuously increasing in the diameter toward the mutual opposite directions, and conical clearances A, A are formed between them, same as in preferred embodiment 1.

In the center of rotating mashing member 172, blades 174, 174, . . . are formed across a specified clearance in the peripheral direction for passing the used paper pulp UPP from the inlet 29 through the upper and lower clearances A, A, and forcing out toward the outlets 30, 30.

The gap dimension of the mashing clearances A, A is set at about 0.05 to 0.8 mm. Same as in preferred embodiment 1, the gap dimension of mashing clearance A can be adjusted finely by relatively rotating the upper and lower tan of the mashing tank not shown, and moving back and forth the engagement portion.

In the mashing machine 170 having such configuration, the middle rotating mashing member 172 is rotated and driven by the drive motor 24 on the upper and lower fixed mashing members 171, 173, and the used paper pulp UPP supplied in the feed port 25 of the mashing tank from the agitating tank 10 of the mashing unit 6 flows into the mashing clearances A, A from the inlet 29 and passes through the mashing clearances A, A, and is pressurized and mashed by the relatively rotating mashing action surfaces 171a, 172a, 172b, 173a, and the inks forming characters and patterns on the used paper are ground and pulverized, and it returns to the agitating tank 10 through the outlet 26 of the mashing tank from the outlets 30, 30 (see the flow passage indicated by arrow in FIG. 20A and FIG. 20B).

Other structure and operation are same as in preferred embodiment 1.

Preferred Embodiment 8

Figure 21:
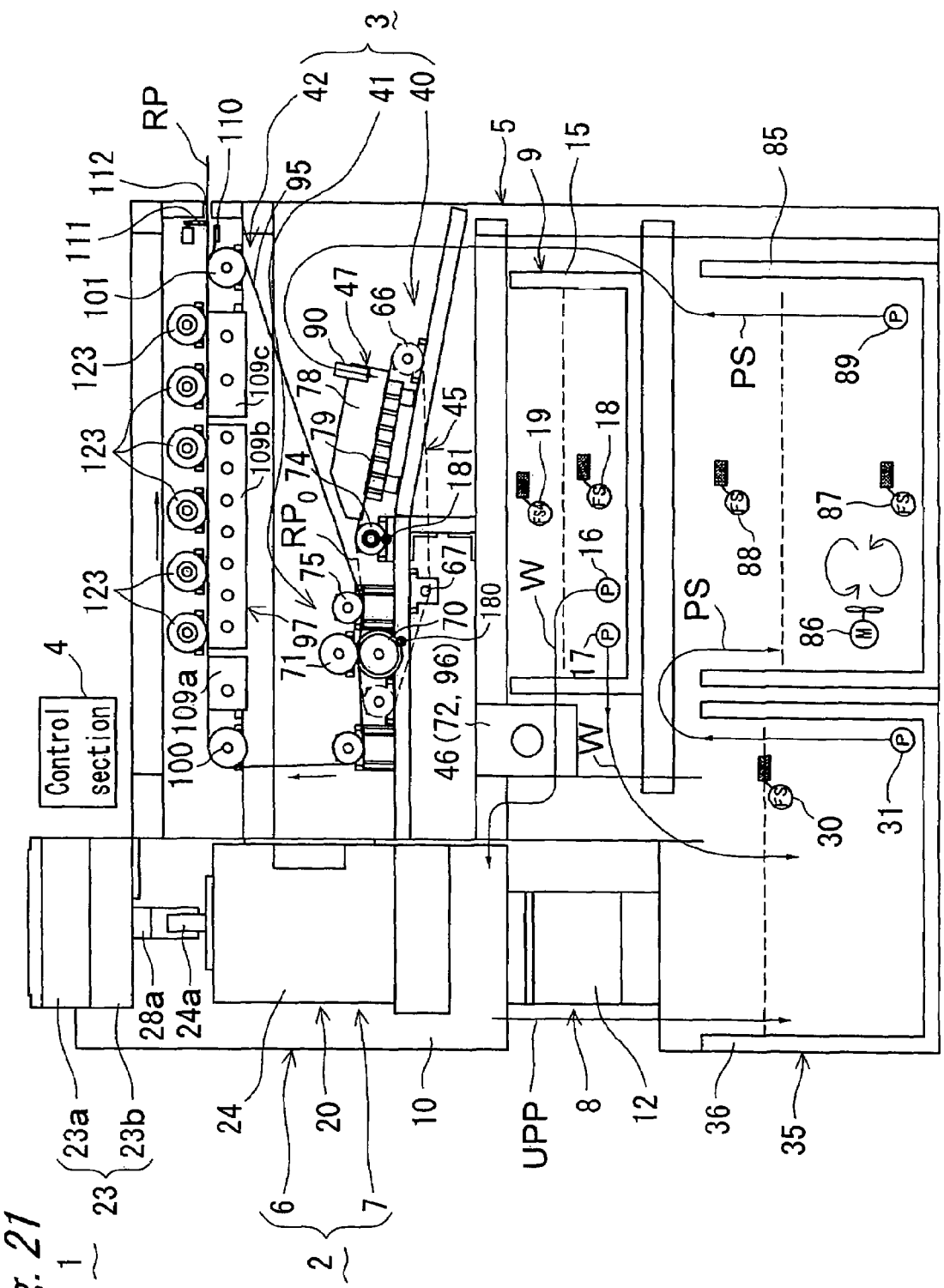
FIG. 21 is a front view of entire structure of used paper recycling apparatus in preferred embodiment 8 of the invention, showing a cut-away view of apparatus case.
Figure 22:
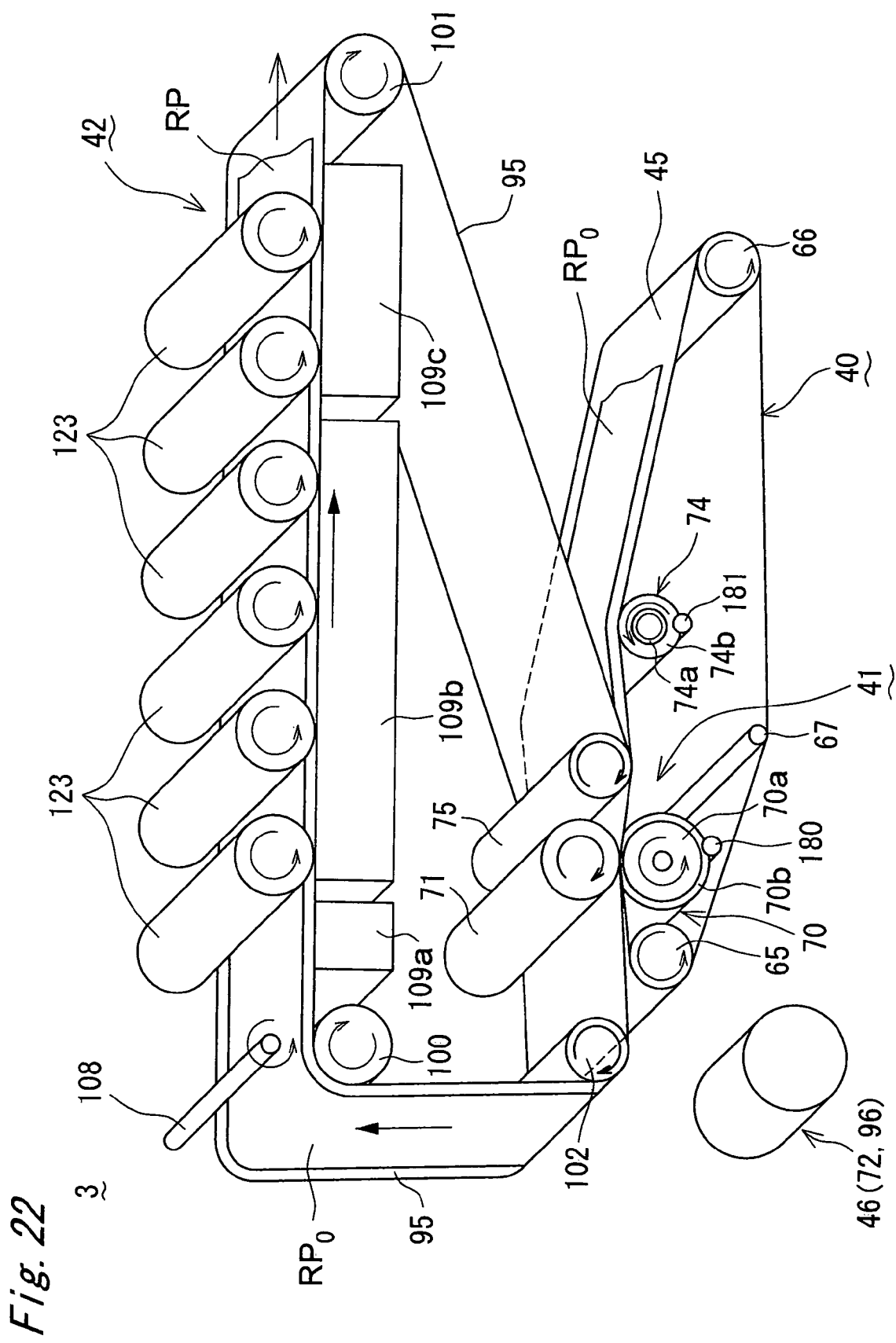
FIG. 22 is a perspective view of outline of paper making section of the used paper recycling apparatus.
Figure 23:
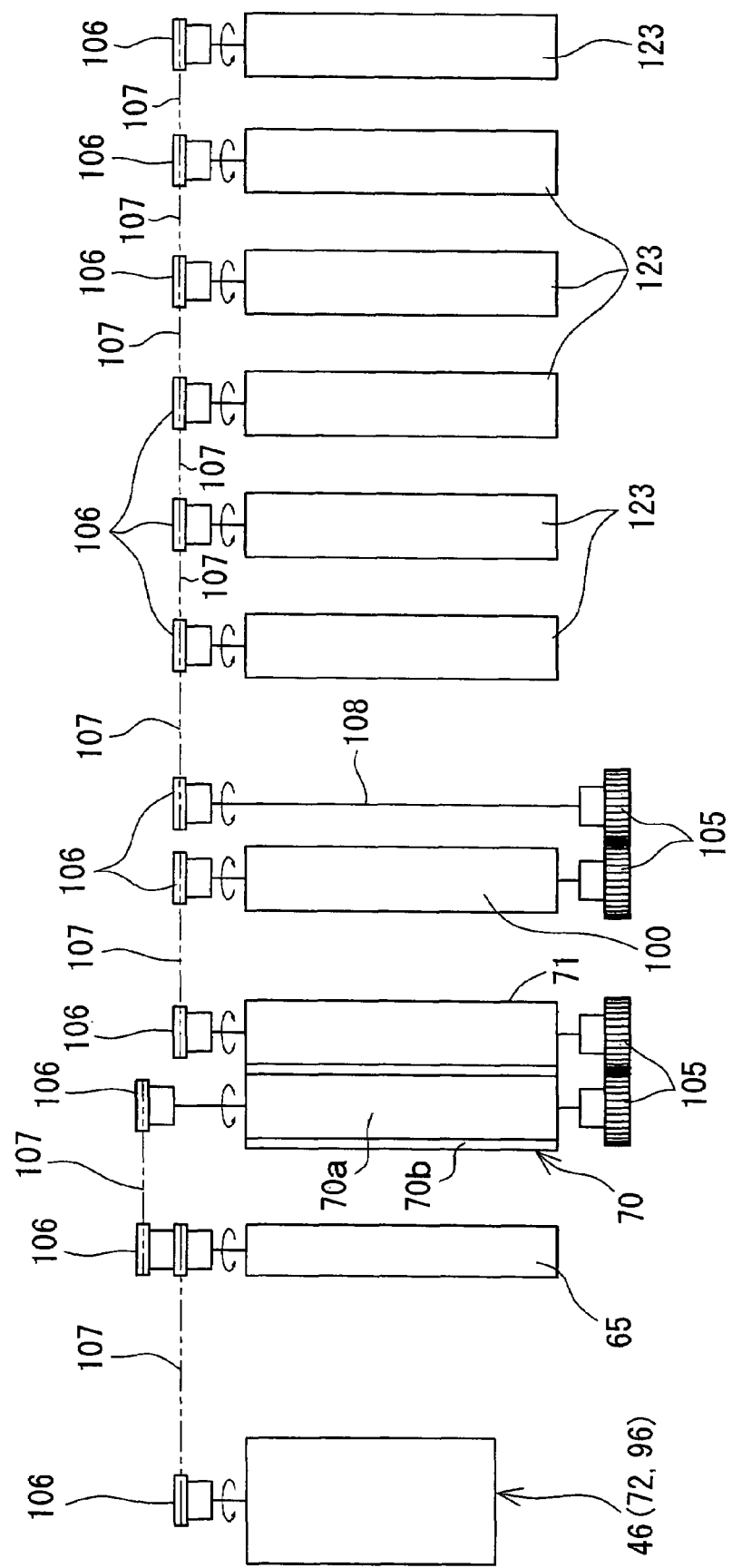
FIG. 23 is a plan view of drive coupling mechanism in the paper making section.
Figure 24:
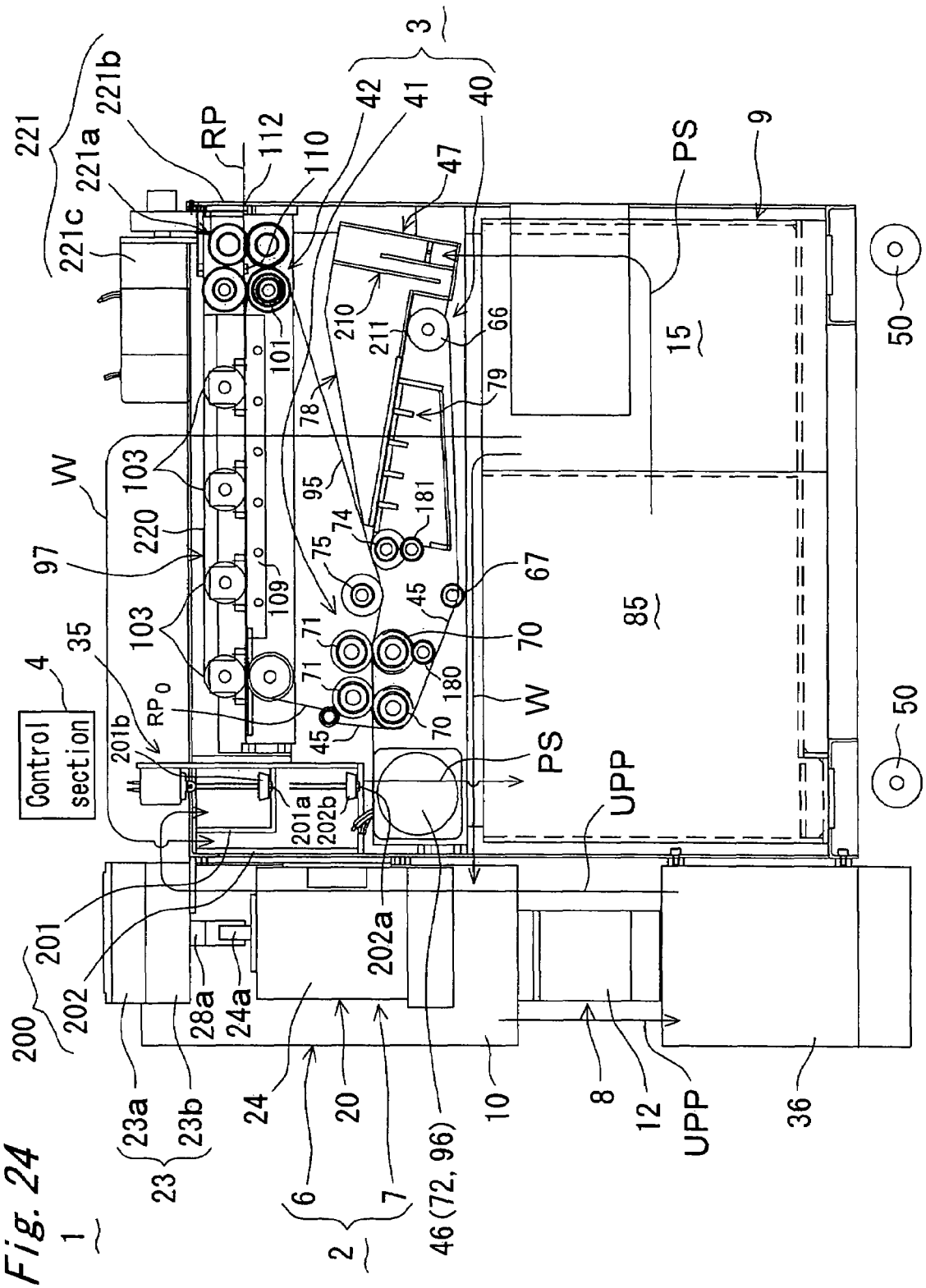
FIG. 24 is a front view of entire structure of used paper recycling apparatus in preferred embodiment 9 of the invention, showing a cut-away view of apparatus case.
Figure 25:
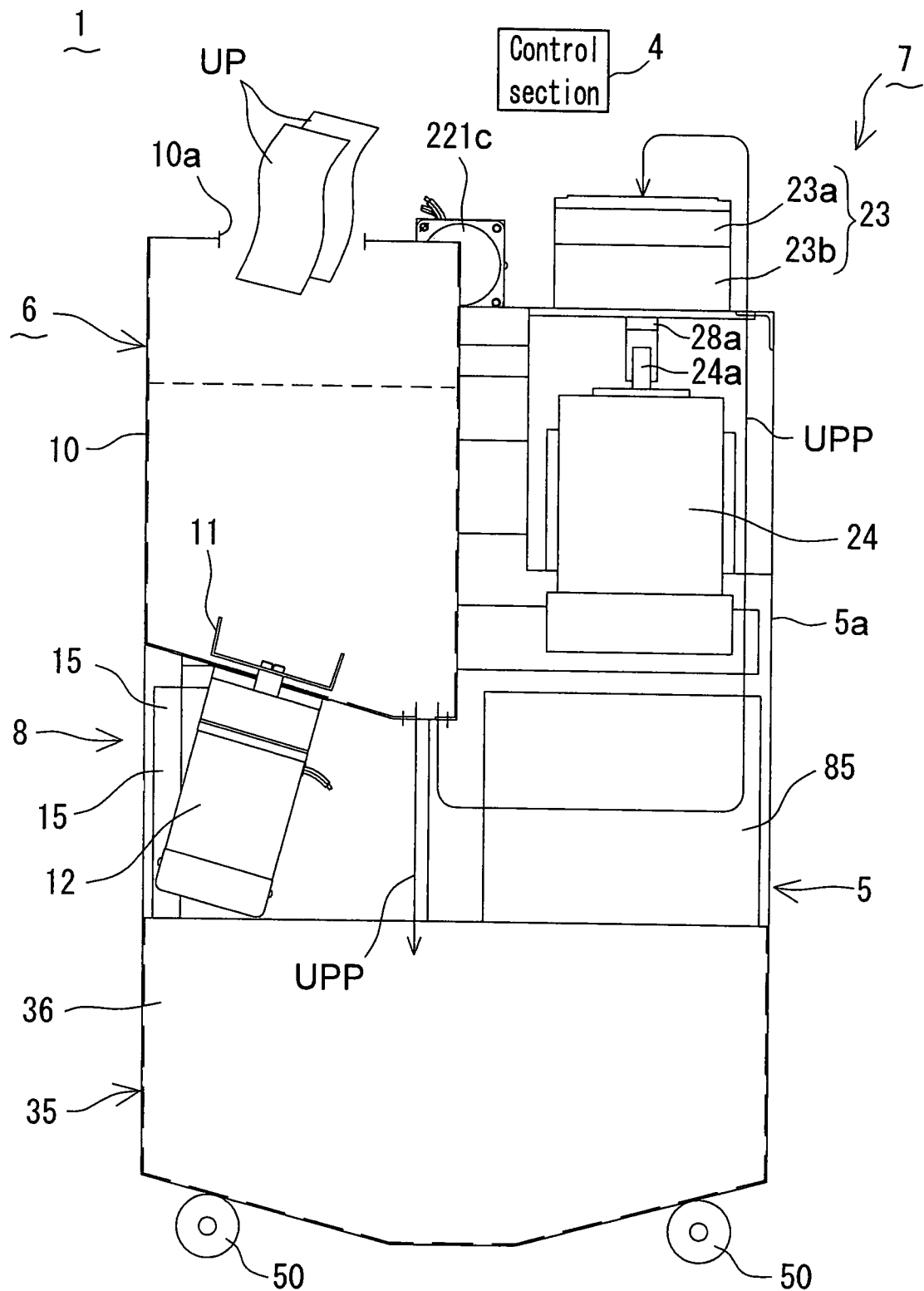
FIG. 25 is a side view of entire structure of the used paper recycling apparatus, showing a cut-away view of apparatus case.

This preferred embodiment is shown in FIG. 21 to FIG. 23, and is similar to preferred embodiment 1, except that the used paper recycling apparatus 1 is slightly modified.

In the used paper recycling apparatus 1 of the preferred embodiment, the structure of the dewatering roll 41 and drying conveyor belt 42 in the paper making section 3 of preferred embodiment 1 is modified.

The dewatering roll 41 of the preferred embodiment has a drain roll 180 in addition to the preliminary dewatering roll 74 and slurry preventive roll 75, as assisting units to the principal components of dewatering roll 70, press roll 71, and drive motor 72.

The drain roll 180 is designed to squeeze and drain the moisture contained in the dewatering layer 70b of the dewatering roll 70, and it is a cylindrical roll of small diameter made of high rigidity material, and rolls on the outer circumference of the dewatering roll in pressed state.

Along with rotating action of the dewatering roll 70, the drain roll 180 rolls and squeezes the dewatering layer 70b of the dewatering roll 70, and the moisture absorbed in the dewatering layer 70b is squeezed and drained.

In such configuration, since the macerated used paper pulp UPP may be inferior in filtering and dewatering efficiency, and may not be easily dewatered from the mesh endless belt 45, the drain roll 180 is disposed to assist the dewatering roll 70, and drainage from the dewatering roll 70b may be increased substantially, and the squeezing and dewatering action in the dewatering roll 41 may be improved as compared with preferred embodiment 1.

By the same purpose, a drain roll 181 is also provided to assist the preliminary dewatering roll 74 in the illustrated preferred embodiment. The structure of drain roll 181 is same as that of the drain roll 180.

The drying belt conveyor 42 specifically has the heater plate 109 for composing the heating and drying unit 97 provided at plural positions.

In the preferred embodiment, the heater plate 109 in preferred embodiment 1 is divided into three sections, and the heating temperature of the heater plates 109a, 109b, 109c can be adjusted individually.

Also in the preferred embodiment, the number of smooth surface finishing rolls 123 disposed oppositely to the heater plates 109a, 109b, 109c is increased from two at the preferred embodiment 1 to six, and these six smooth surface finishing rolls 123, 123, . . . are disposed parallel at small intervals oppositely to the entire surface of the heater plates 109a, 109b, 109c.

The smooth surface finishing rolls 123 of the preferred embodiment have heaters incorporated inside, and function also as heating rolls.

In the heating and drying unit 97 having such configuration, the wet paper RP0 on the smooth surface endless belt 95 is heated and dried by the heater plates 109a, 109b, 109c, and depending on the moisture content of the wet paper RP0, the wet paper RP0 may be wound about the smooth surface finishing rolls 123, 123, . . . , and it is dried to such a moisture content so as not to be wound about the smooth surface finishing rolls 123, 123, . . . , for example, by the first heater plate 109a.

After the next heater plates 109b, 109c, the wet paper RP0 is sequentially rolled and pressed from the upper side by the smooth surface finishing rolls 123, 123, . . . , and the wet paper RP0 is heated from face and back sides together by the smooth surface finishing rolls 123, 123 . . . and heater plates 109b, 109c, so that the face and back side surfaces can be dried to a proper smooth surface without creasing the paper surface.

Such configuration solve the conventional problems, that is, the macerated used paper pulp UPP is inferior in filtering and dewatering efficiency, and the remaining steam is not easily removed in the drying process, and crease, curl, warp or distortion is likely to be formed by the remaining steam.

Other structure and operation are same as in preferred embodiment 1.

Preferred Embodiment 9

This preferred embodiment is shown in FIG. 24 to FIG. 27 (FIG. 27A, FIG. 27B), and is similar to preferred embodiment 1, except that the used paper recycling apparatus 1 is slightly modified.

In the used paper recycling apparatus 1 of the preferred embodiment, the structure of the pulp concentration adjusting device 35 of the pulp making section 2 is modified, and the water consumption is decreased, and the entire used paper recycling apparatus 1 is built in a compact design. The components modified from preferred embodiment 1 are specifically described below.

II. Pulp Making Section 2

The pulp concentration adjusting device 35 of the pulp making section 2 of the preferred embodiment is similar to the concentration adjusting tank 36 in preferred embodiment 1, in which water W is added from the concentration adjusting water feed unit 9 to the whole volume of used paper pulp UPP supplied from the agitating tank 10 (about 32 g of used paper UP+1.5 liters of water W), and the pulp suspension PS is adjusted to specified concentration (about 0.1% as target concentration) until the total volume of used paper pulp UPP and water W may reach a specified amount (32 liters), but is different in that a specified portion is dispensed from the whole volume of used paper pulp UPP supplied from the agitating tank 10, and that water W is added from the concentration adjusting water feed unit 9 to this dispensed portion, and that the pulp suspension PS is adjusted to specified concentration until the total volume of dispensed portion of used paper pulp UPP and water W may reach a specified amount.

As a result, in the used paper recycling apparatus 1 of the preferred embodiment, although the water consumption is saved and the size is reduced as compared with the apparatus of preferred embodiment 1, the processing capacity is substantially enhanced. For example, the inner volume of agitating tank 10 is determined depending on the number of sheets of used paper UP process in batch, and in the preferred embodiment, as described below, the agitating tank 10 has a volume for agitating (in batch process) about 25 sheets (about 100 g) of used paper UP of A4 format by adding about 5 liters of water (the processing capacity is about three times that of preferred embodiment 1).

For this purpose, in the preferred embodiment, the concentration adjusting tank 36 in preferred embodiment 1 also functions as pulp storage tank for temporarily storing the macerated and mashed used paper pulp UPP sent from the agitating tank 10, and a concentration adjusting tank 200 composed of two tanks 201, 202 is provided at the downstream side of the pulp storage tank 36.

Figure 26:
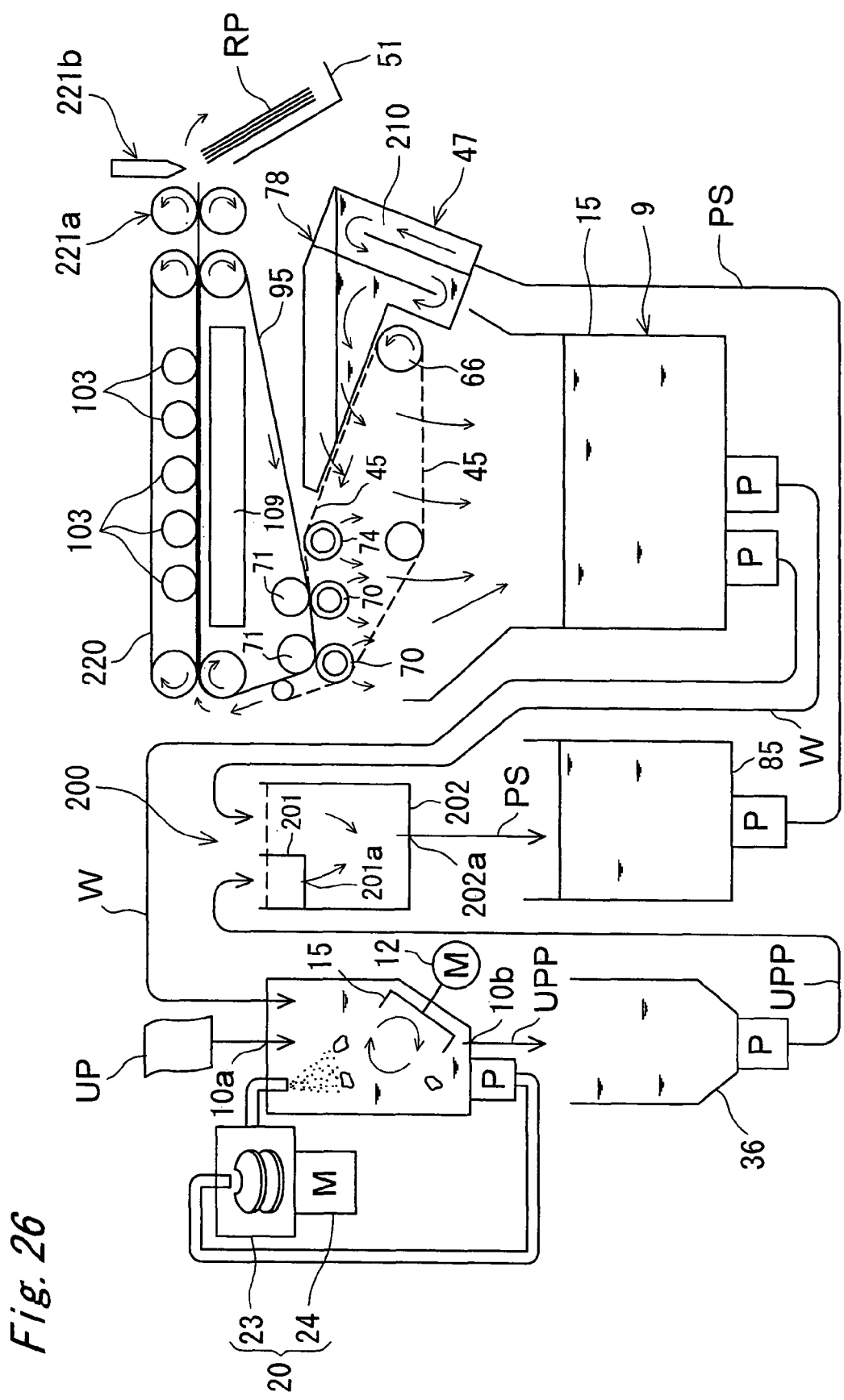
FIG. 26 is a block diagram schematically showing the entire structure of the used paper recycling apparatus.

That is, as shown in FIG. 26, the concentration adjusting tank 200 includes a pulp division tank 201 for dispensing a specified portion from the total volume of used paper pulp UPP stored in the pulp storage tank 36, that is, the whole volume of used paper pulp UPP supplied from the agitating tank 10, and a water storage tank 202 for storing the water W corresponding to the dispensed portion of used paper pulp UPP supplied from the concentration adjusting water feed unit 9.

Specifically, the pulp division tank 201 is mounted on the top of the water storage tank 202 in two-layer structure, and a drain port 201a is provided in the bottom of the pulp division tank 201.

The inner volume of the pulp division tank 201 is determined according to the portion dispensed from the used paper pulp UPP stored in the pulp storage tank 36, and the inner volume of the water storage tank 202 is similarly determined depending on the amount of water W corresponding to the dispensed used paper pulp UPP stored in the pulp division tank 201 in addition to the volume of the pulp division tank 201. In the shown preferred embodiment, supposing the pulp storage tank 36 to have a volume capable of storing the corresponding amount of used paper pulp UPP after batch processing of about 25 sheets (about 100 g) of A4 format used paper UP (same as volume of concentration adjusting tank 36 in preferred embodiment 1), the inner volume of pulp division tank 201 is set to a capacity of, for example, about 150 cc, and the inner volume of water storage tank 202 is set, for example, at a capacity of about 3 liters.

Therefore, the drain port 201a is provided in the bottom of the pulp division tank 201, and this drain port 201a is opened or closed by a drain valve 201b. The drain valve 201b is specifically an electromagnetic valve, and is electrically connected to the control section 4. Similarly, a drain port 202a is provided in the bottom of the water storage tank 202, and this drain port 202a is opened or closed by a drain valve 202b. The drain valves 201b, 202b are specifically electromagnetic valves, and are electrically connected to the control section 4 individually.

In the concentration adjusting tank 200, a specified portion (150 cc) is dispensed from the whole volume of used paper pulp UPP supplied in the pulp storage tank 36 from the agitating tank 10 (about 100 g of used paper UP+5 liters of water W), and is transferred into the pulp division tank 201 of the concentration adjusting tank 200. In the dispensed portion of the used paper pulp UPP, water W is supplied from the concentration adjusting water feed unit 9 and transferred into the water storage tank 202 by about 3 liters (to be precise, a balance to make up a total volume of 3 liters with dispensed portion (150 cc) of used paper pulp UPP).

In succession, the drain port 201a of the pulp division tank 201 is opened by the drain valve 201b, the whole volume (150 cc) of used paper pulp UPP in the pulp division tank 201 is dropped by gravity and supplied into the water storage tank 202, and mixed with water W in the water storage tank 202, and pulp suspension PS of specified concentration (about 0.1% of target concentration) is prepared in the water storage tank 202.

The target concentration of the pulp suspension PS to be adjusted is determined in consideration of the paper making capacity of the paper making section 3 as mentioned below, on the basis of the preliminary experiment, same as in preferred embodiment 1.

The pulp suspension PS adjusted to target concentration of about 0.1% in the concentration adjusting tank 200 of the concentration adjusting unit 9 is wholly dropped by gravity and supplied and stored in the pulp storage tank 85 of the paper making section 3 in next process as the drain port 201a of the pulp division tank 201 is opened by the drain valve 201b.

The concentration adjustment interval by the division system in the pulp concentration adjusting unit 35 is determined at a timing so that the pulp concentration PS in the pulp feed tank 85 may not decline from a specific value, and for example supposing the paper making section 3 to be controlled so that about 3 liters of pulp suspension PS to be processed into paper in about 1 minute, the concentration adjustment interval by the pulp concentration adjusting unit 35 is set within 1 minute.

Thus, the concentration adjustment by the pulp concentration adjusting unit 35 is divided into dispensed portion, instead of the batch process of whole volume in preferred embodiment 1, and therefore the water consumption is saved substantially, and the shape and size of concentration adjusting tank 200 can be reduced substantially, and the entire used paper recycling apparatus 1 is built in a compact design.

III. Paper Making Section 3

Figures 27A, 27B:
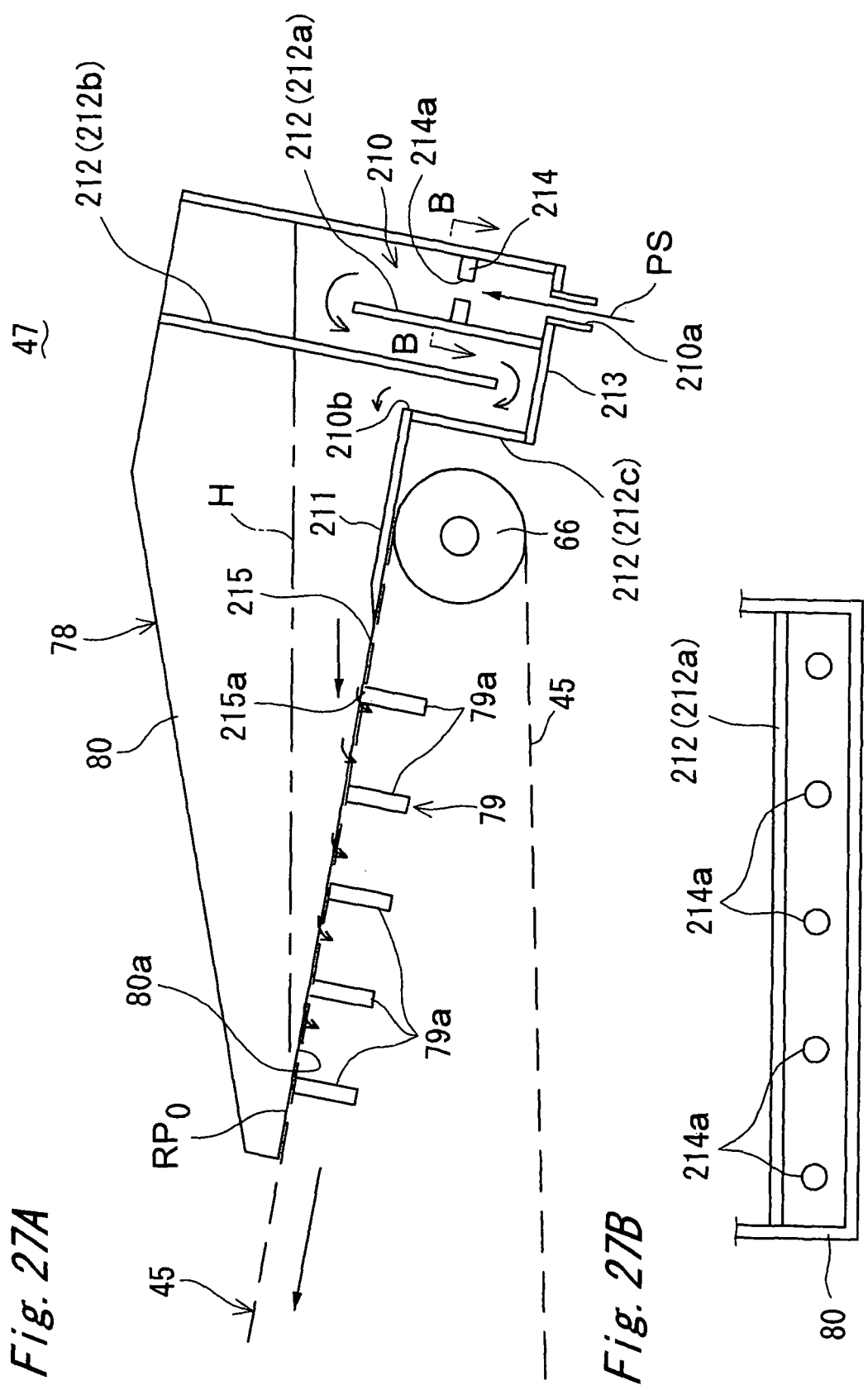
FIG. 27A is a front sectional view of pulp feeder in paper making section of the used paper recycling apparatus.
FIG. 27B is a sectional view along line B-B in FIG. 27A, showing the pulp feeder in paper making section of the used paper recycling apparatus.
Figure 28:
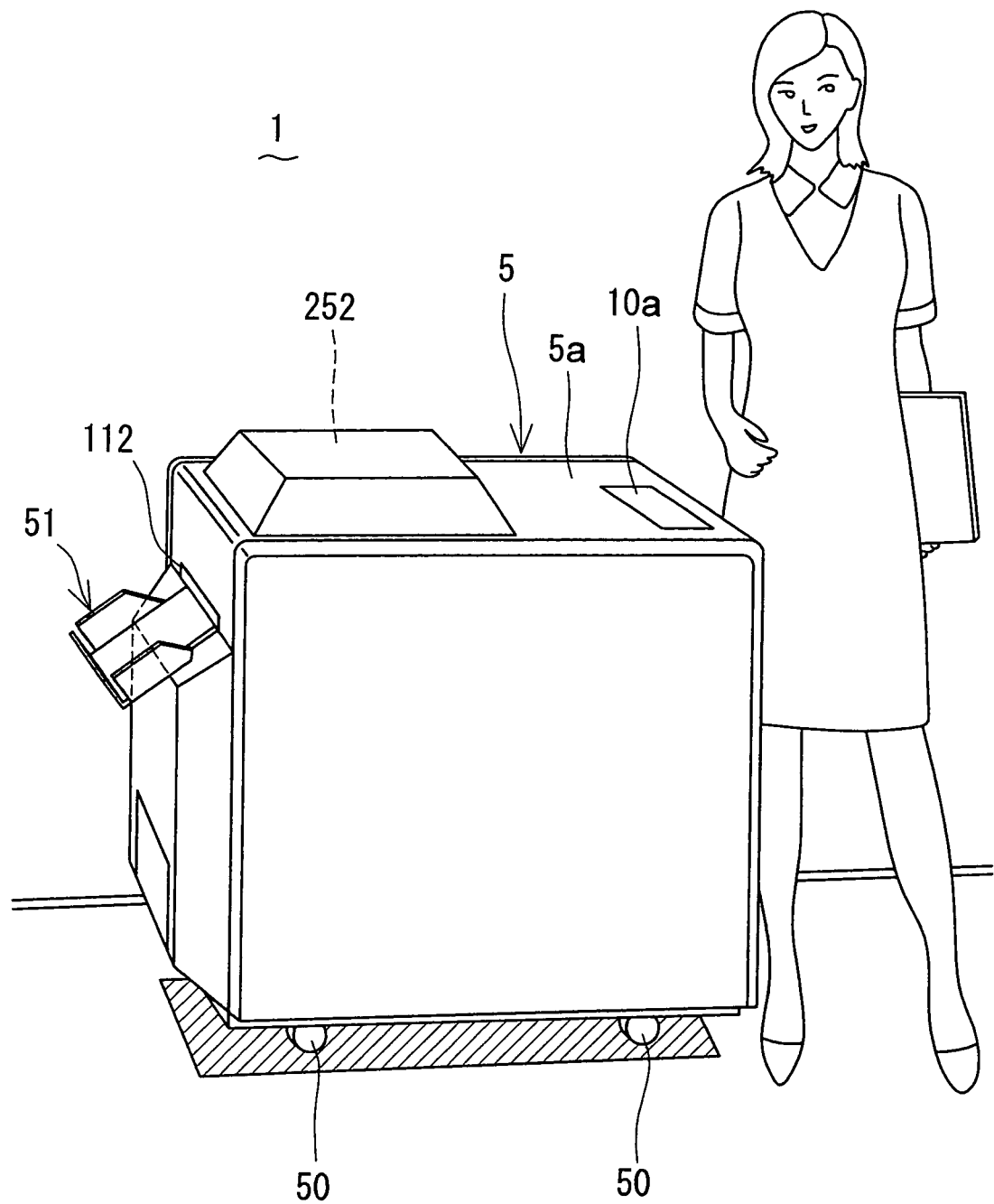
FIG. 28 is a perspective view of outline of used paper recycling apparatus in preferred embodiment 10 of the invention.
Figure 29:
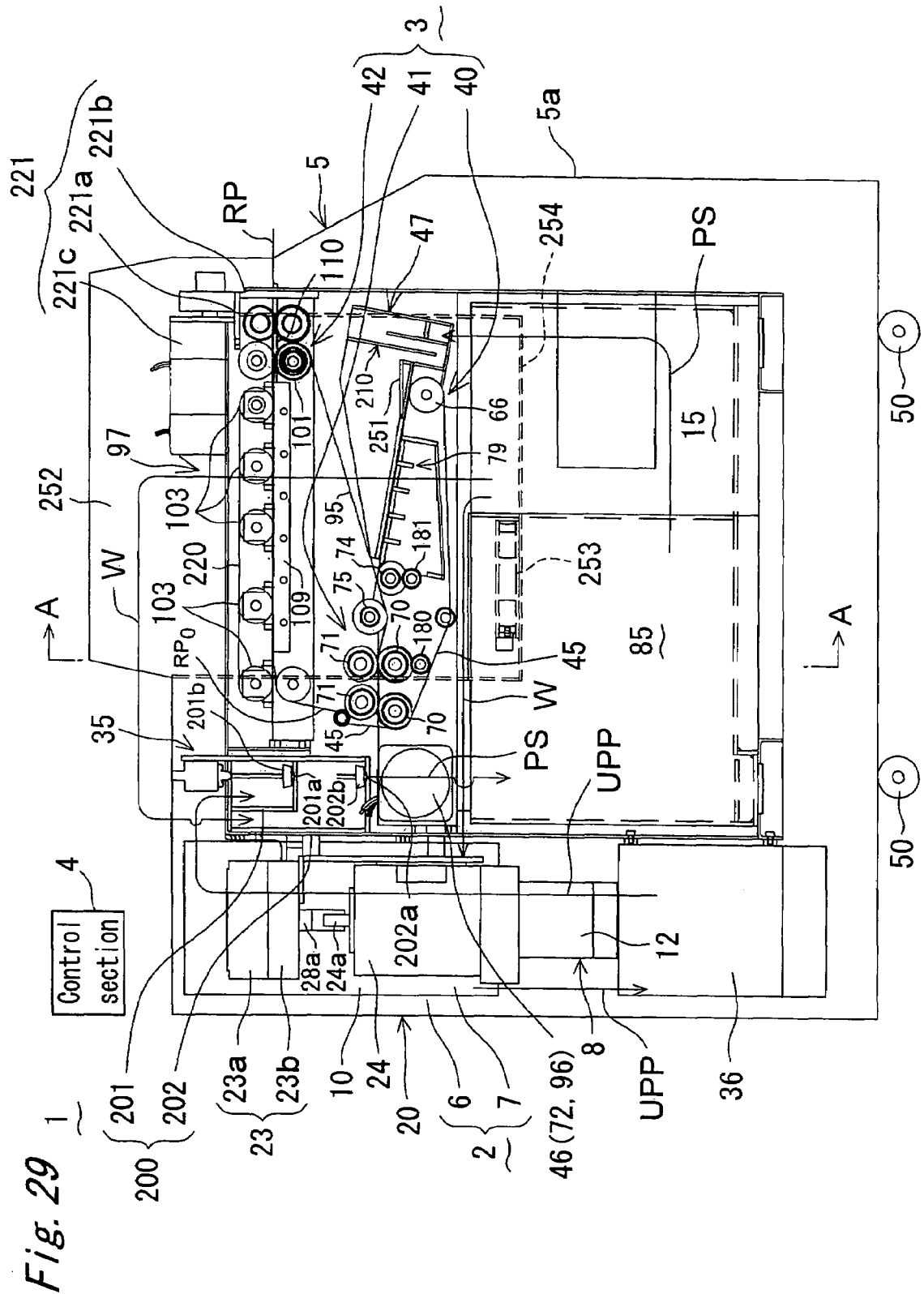
FIG. 29 is a front view of entire structure of the used paper recycling apparatus, showing a cut-away view of apparatus case.
Figure 30:
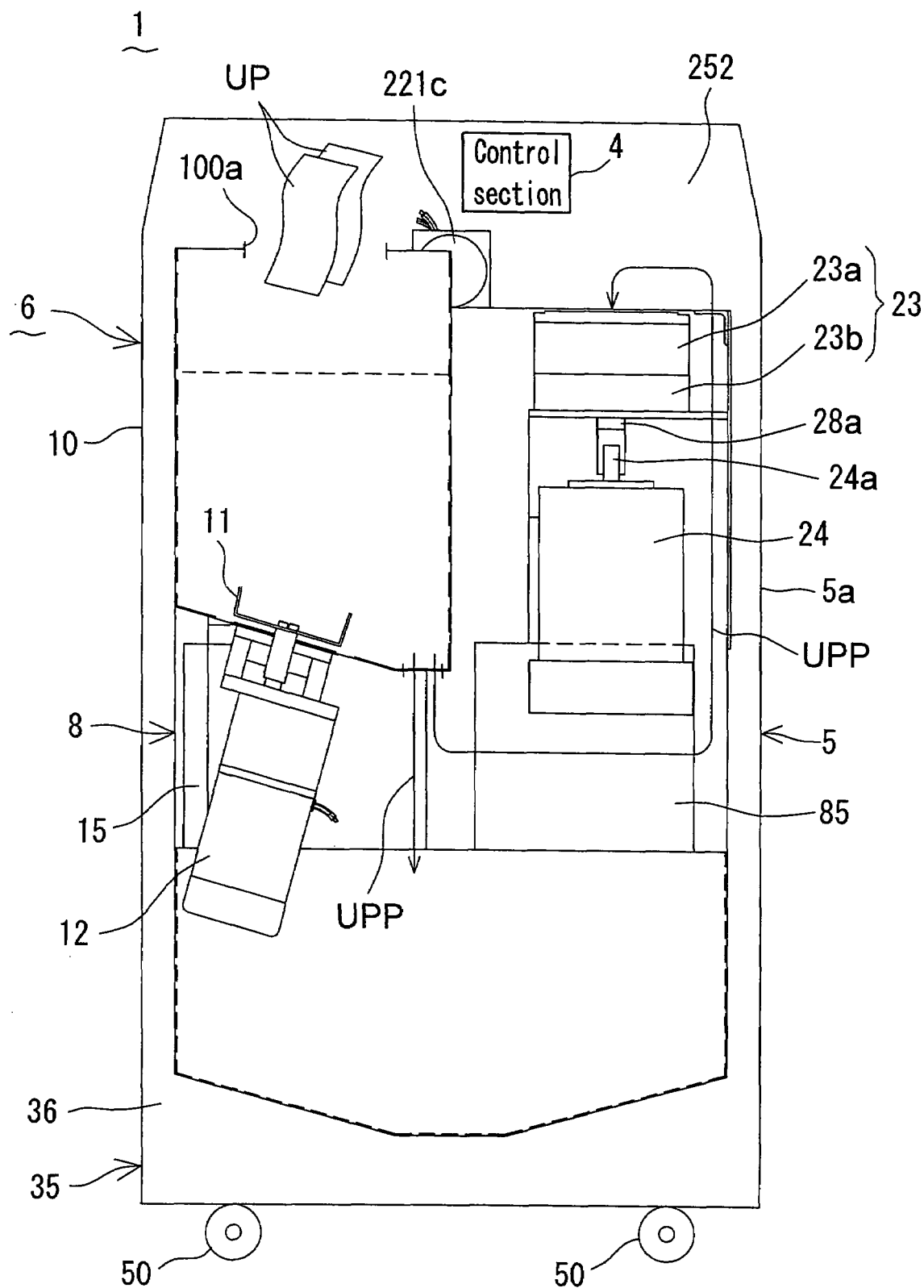
FIG. 30 is a side view of entire structure of the used paper recycling apparatus, showing a cut-away view of apparatus case.

In the paper making net conveyor 40 of the paper making section 3, specific structure of pulp feed unit 47 is as shown in FIG. 27A and FIG. 27B, in which the mesh endless belt 45 is disposed in upward inclination toward the running direction, and paper making frame 78 and partition member 79 are disposed at upper and lower positions of the mesh endless belt 45.

The paper making frame 78 is disposed slidably on the upside of the mesh endless belt 45, and includes a main body frame 80, a flow passage 210 provided inside of the main body frame 80, and a flat member 211 disposed near the exit side of the flow passage 210.

The main body frame 80 has a U-shape plane, same as in preferred embodiment 1, opened at the leading end, that is, the running direction side of the mesh endless belt 45, and its lower end 80a is disposed to slide on the upside of the obliquely running mesh endless belt 45, and the inside width L (see FIG. 8) of the main body frame 80 is set at the width dimension of the recycle paper RP to be manufactured.

The flow passage 210 is mainly composed of a plurality of gate members 212, 212, . . . provided in the main body frame 80.

In the illustrated preferred embodiment, the flow passage 210 is formed of a bottom plate 213 forming the bottom of the main body frame 80, and three gate members 212a, 212b, 212c provided upright in the main body frame 80.

Specifically, as shown in FIG. 27A, the three gate members 212a, 212b, 212c are disposed upright and parallel at specific equal intervals in the main body frame 80, and the flow passage 210 is meandering in vertical direction, and the running direction of the flow passage 210 is extended in upward direction from the inlet 210a, that is, the opening provided in the bottom plate 213, and also extended in upward direction toward the outlet 210b (see arrow in FIG. 27A). The inlet 210a communicates with the pulp feed tank 85 for supplying the pulp suspension PS.

Of the upright gate members 212a, 212b, 212c provided in the main body frame 80, the gate member forming partition of upward and downward direction of the flow passage 210, that is, the upper end edge of the gate member 212a in the preferred embodiment is set to be lower than the water level (horizontal line H in FIG. 27A) of the pulp suspension PS flowing and staying on the flat member 211 as described below.

Near the inlet 210a of the flow passage 210, a partition plate 214 is provided so as to partition the flow passage 210, and a plurality of communication holes 214a, 214a, . . . are opened in this partition plate 214 at specific intervals as shown in FIG. 27B.

The flat member 211 is provided at the side of exit 210b of the flow passage 210, and is covering the mesh cells of the mesh endless belt 45 in closed state from the upper side.

The partition member 79 has a draining louver structure composed of a plurality of framework members 79a, 79a, . . . same as in preferred embodiment 1, and has the shape and size for slidably supporting the entire width of the downside of the mesh endless belt 45, while the flat member 82 in preferred embodiment 1 is omitted.

At the leading end edge of the flat member 211, a thin guide sheet 215 is provided for assuring a smooth flow of pulp suspension onto the mesh endless belt 45. The leading end edge 215a of the guide sheet 215 is set at a position corresponding to one of the gate for forming the louver structure of the partition member 79, that is, the framework members 79a, 79a, . . . (the final gate 79a in this preferred embodiment), and specifically it is slidably disposed at the upside position of the mesh endless belt 45 supported by the gate 79a.

When the pulp suspension PS is supplied from the pulp feed tank 85 into the flow passage 210 in the paper making frame 78 through the inlet 210a, it slowly flows through the meandering flow passage 210 as indicated by arrows in FIG. 27A and FIG. 27B, and flows and stays on the flat member 211 from the outlet 210b, and is hence uniformly diffused and supplied on the upside of the running mesh endless belt 45 disposed in upward inclination toward the running direction.

The action and effect of the flow passage structure of pulp suspension PS in this pulp feed unit 47 may be estimated as follows.

(i) Presence of Partition Plate 214 Having a Plurality of Communication Holes 214a, 214a, . . . .

The partition plate 214 is provided to partition the flow passage 210, and a plurality of communication holes 214a, 214a, . . . are opened in this partition plate 214, and hence the pulp suspension PS supplied from the pulp feed tank 85 passes through the plurality of communication holes 214a, 214a, . . . of this partition 214, and is diffused in the entire flow passage 210, and is adjusted so that the flow rate may be uniform in the entire opening of the section of the flow passage.

(ii) Meandering Route of Flow Passage 210

The flow passage 210 divided and formed by the gate members 212 (212a, 212b, 212c) is meandering and long, and the pulp suspension PS passes through this flow passage 210, and is diffused uniformly.

(iii) Height of Upper End Edge of Gate Member 212a

In the flow passage 210, the height of upper end edge of the gate member 212a forming the partition at the turning point from upward to downward direction is set to be lower than the water level H of the pulp suspension PS flowing and staying on the flat member 211 as shown in FIG. 27A, so that pulsation of water level of pulp suspension PS can be effectively prevented.

When the height of upper end edge of the gate member 212a is very close to the water level H of the pulp suspension Ps (lower than water level H by 1 o 2 mm), the pulp suspension PS is filtered by the net of the net of the mesh endless belt 45, and the water level H is lowered, and a time lag occurs until the pulp suspension PS supplied in the flow passage 210 from the lower part of the inlet 210a rides over the gate member 212a, and the water level H pulsates, and lateral creases may be formed in the matrix of the recycled paper RP.

By contrast, in the illustrated preferred embodiment, since the height of the upper end edge of the gate member 212a is set to be lower than the water level H, and such troubles are avoided effectively.

(iv) Thin Guide Sheet 215 at the Leading End Edge of Flat Member 211

Since the leading end edge 215a of the guide sheet 215 is slidably disposed at the upside position of mesh endless belt 45 supported by the gate 79a forming the louver structure of the partition member 79, uniform filtering performance is assured by the net of the mesh endless belt 45.

Located between the gates 79*a* and 79*a* of the partition member 79, the pulp suspension PS tends to flow freely also in the direction of follower roller 66 when filtered by the net of the mesh endless belt 45, and hence uniform filtering by the net is difficult, and uneven filtering may occur locally. When filtering is not uniform, vertical creases may be formed in the matrix of the recycled paper RP.

By contrast, in the illustrated preferred embodiment, since the upper end edge 215 of the guide sheet 215 is set at upside position of the gate 79*a* for forming the louver structure of the partition member 79, such troubles are avoided effectively.

The dewatering roll 41 of the paper making section 3 is designed to roll and squeeze the both belts 45 and 95 from upper and lower sides in pressed state, at the upper and lower adjacent engaging portions of the smooth surface endless belt 95 of the drying belt conveyor 42 at the downstream side and the mesh endless belt 45 of the paper making net conveyor 40 at the upstream side, and in the preferred embodiment, two sets of dewatering roll 70 and press roll 71 in preferred embodiment 1 are provided continuously. The main squeezing function is realized by the set of dewatering roll 70 and press roll 71 at the upstream side, while the set of dewatering roll 70 and press roll 71 at the downstream side plays a supporting squeezing action. Due to such difference in purpose, the upstream side dewatering roll 70 is provided with drain roll 180 same as in preferred embodiment 8.

In the drying belt conveyor 42 of the paper making section 3, a crease preventive endless belt 220 is rotatably suspended and supported in the plurality of smooth surface finishing rolls 103, 103, . . . in preferred embodiment 1. In the shown preferred embodiment, four smooth surface finishing rolls 103, 103, . . . are provided, but the number of smooth surface finishing rolls 103 may be properly increased or decreased according to the purpose.

The crease preventive endless belt 220 is designed to maintain the smoothness by preventing creasing of the wet paper RP0 by applying a tension while pressing the wet paper RP0 on the smooth surface endless belt 95 from the upper side.

Specifically, the running speed of the crease preventive endless belt 220 is set larger than the running speed of the smooth surface endless belt 95, and tension is applied to the wet paper RP0 due to difference in speed of the two bets 220, 95.

The crease preventive endless belt 220 is made of a permeable material capable of passing and dissipating moisture and steam remaining inside the wet paper RP0 on the smooth surface endless belt 95, and the belt is preferably formed of felt belt, mesh belt having fine mesh cells, or mesh base material having fine mesh cells coated with a felt material, and a felt belt is used in the illustrated preferred embodiment.

Instead of the smooth surface finishing roll 103, a smooth surface finishing roll 123 of preferred embodiment 8 having a built-in heater and functioning as heating roll may be used.

At the terminal end of the drying belt conveyor 42, the size cutter 221 of the preferred embodiment cuts the recycled paper RP separated from the smooth endless belt 95 not only in specified length as in preferred embodiment 1, but also in specified length to cut in a specified rectangular shape. Specifically, the size cutter 221 has a composite structure composed of a roll slitter 221*a* for cutting the recycled paper RP in specified width, and a guillotine cutter 221*b* for cutting the recycle paper RP in specified length, and these cutters are driven by a drive motor 221*c*.

Other structure and operation are same as in preferred embodiment 1.

Preferred Embodiment 10

This preferred embodiment is shown in FIG. 28 to FIG. 32, and is similar to preferred embodiment 9, except that the used paper recycling apparatus 1 is slightly modified.

In the used paper recycling apparatus 1 of the preferred embodiment, the structure of the pulp feed unit 47 of the paper making section 3 is modified, and the heating and drying unit 97 of the drying belt conveyor 42 is provided with a steam collection unit 250 for collecting steam generated by heating and drying. The components modified from preferred embodiment 9 are specifically described below.

III. Paper Making Section 3

Figure 31A:
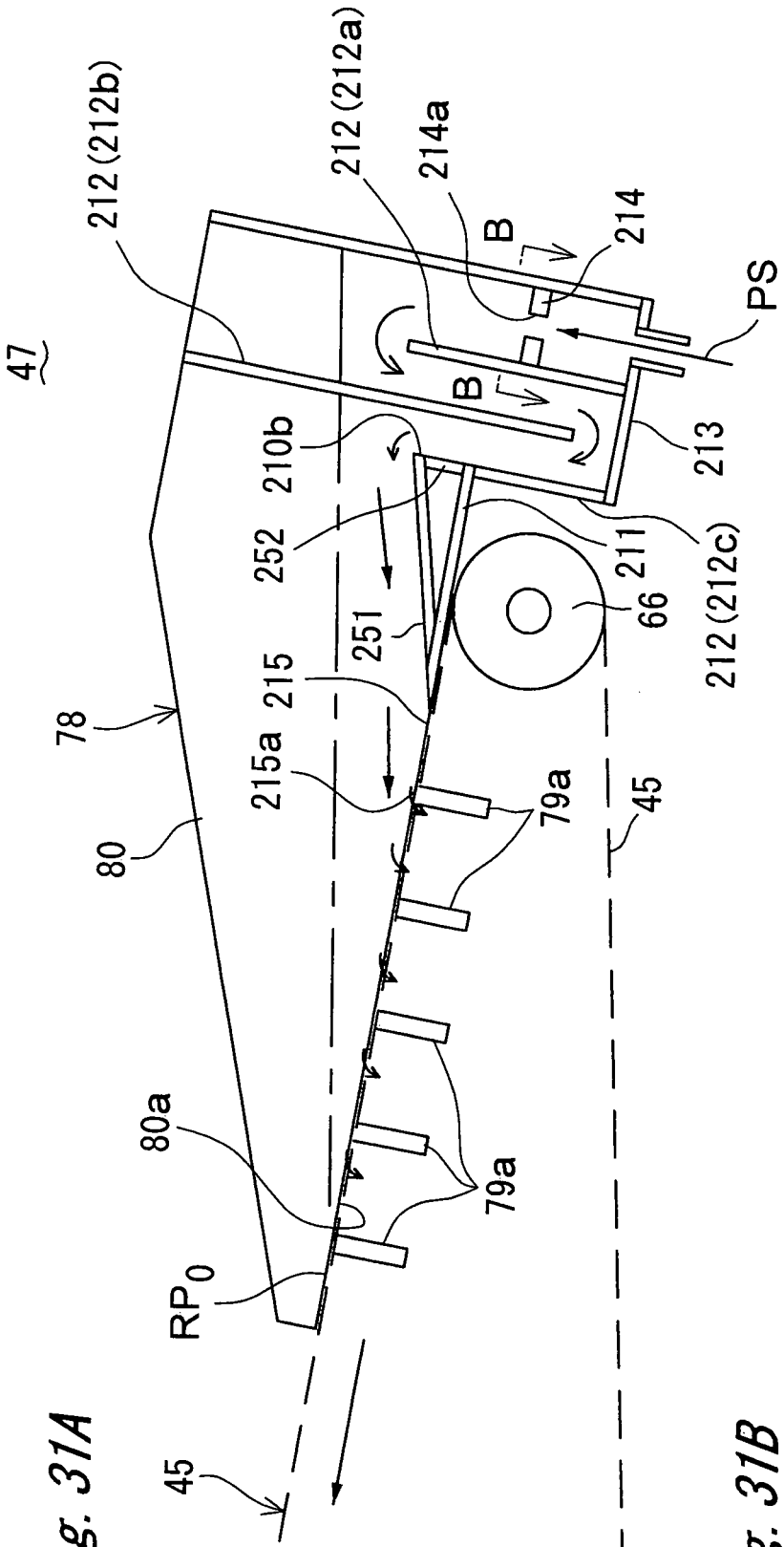
FIG. 31A is a front sectional view of pulp feeder in paper making section of the used paper recycling apparatus.
Figure 31B:
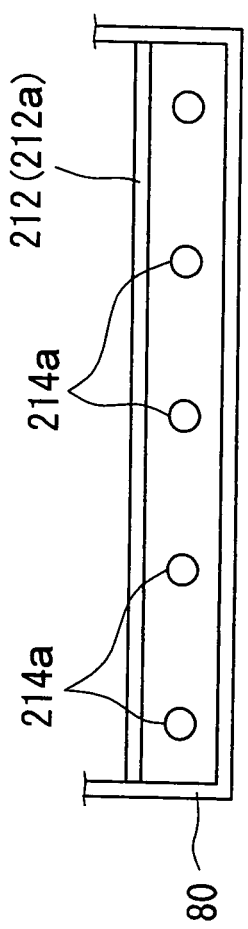
FIG. 31B is a sectional view along line B-B in FIG. 31A, showing the pulp feeder in paper making section of the used paper recycling apparatus.

In the paper making net conveyor 40 of the paper making section 3, specific structure of pulp feed unit 47 is as shown in FIG. 31A and FIG. 31B, in which the mesh endless belt 45 is disposed in upward inclination toward the running direction same as in preferred embodiment 9, and paper making frame 78 and partition member 79 are disposed at upper and lower positions of the mesh endless belt 45.

The paper making frame 78 is disposed slidably on the upside of the mesh endless belt 45, and includes a main body frame 80, a flow passage 210 provided inside of the main body frame 80, and a flat member 251 disposed near the exit side of the flow passage 210.

Specifically, in the structure of paper making frame 78 in preferred embodiment 8 (see FIG. 27A and FIG. 27B), the flat member 251 is attached and fixed to the flat member 211 so that the inclination may be downward by way of the support plate 252.

Referring to FIG. 31A and FIG. 31B, for example, if only the plate member 211 of upward slope is provided same as in preferred embodiment 8, without having flat member 251, the pulp suspension PS supplied in the paper making frame 78 from the pulp feed tank 85 passes through the flow passage 210, and flows onto the flat member 211 from its outlet 210*b*, and since the flat member 211 has an upward slope, the pulp suspension PS climbs up the flat member 211. The pulp suspension PS climbing up the flat member 211 may be disturbed in flow, and such turbulent flow in the pulp suspension PS staying on the flat member 211 may have adverse effects on the matrix of the recycled paper RP manufactured by the mesh endless belt 45.

In consideration of this point, in the preferred embodiment, a flat member 251 of downward slope is provided, and the pulp suspension PS flowing from the outlet 210*b* of the flow passage 210 onto the flat member 211 flows down smoothly on the upside of the flat member 251, and turbulent flow is prevented securely, so that the matrix of the recycled paper RP may be further enhanced.

Figure 32:
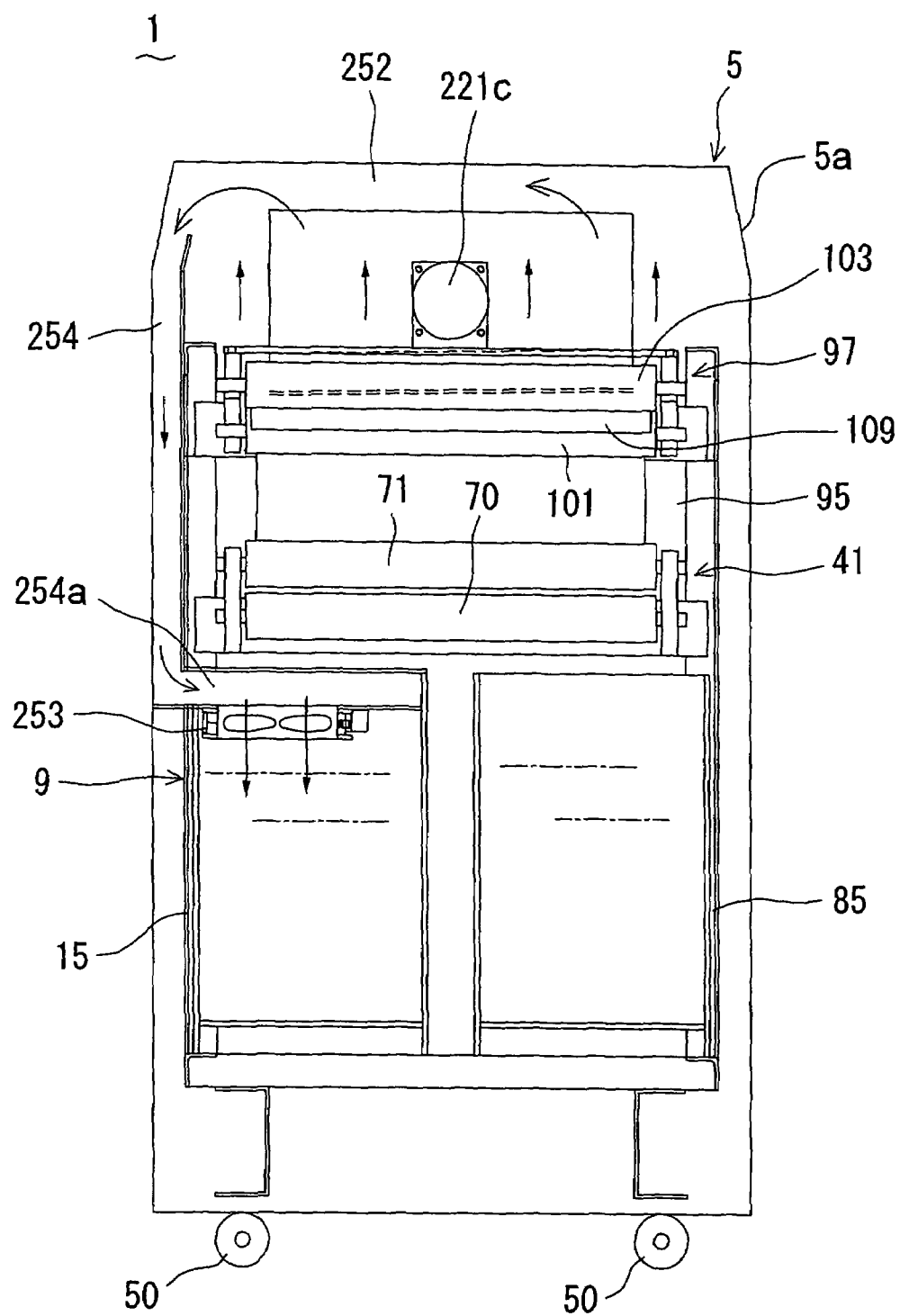
FIG. 32 is a sectional view alone line A-A in FIG. 29 of the used paper recycling apparatus.

The steam collection unit 250 provided in the heating and drying unit 97 of the drying belt conveyor 42 is mainly composed of a steam collection chamber 252 formed in part of the cover of the apparatus case 5, that is, decorative case cover 5*a*, as shown in FIG. 32, and an exhaust fan 253 for exhausting the steam collection chamber 252.

Specifically, as shown in FIG. 32, an exhaust duct 254 is extending from the steam collection chamber 252 to the ceiling of the white water collect tank 15 of the water feed device 9 along the inner side of the decorative case cover 5*a*, and is opposite to the white water collect tank 15 from the upside. The exhaust fan 253 is provided horizontally downward in the exhaust port 254*a* of the exhaust duct 254.

The mounting position of the exhaust fan 253 is not limited to the preferred embodiment, but may be provided at the air intake side of the exhaust duct 254, or other proper position capable of exhausting the steam collection chamber 252.

In the heating and drying unit 97, the steam generated by heating and drying action is first collected in the steam collection chamber 25 by the exhaust action of the exhaust fan 253 as indicated by arrow in FIG. 32, and is circulated to return to the white water collect tank 15 through the exhaust duct 254.

In this case, the steam generated to fill in the steam collection chamber 252 is very hot, and although not shown specifically, by changing the mounting position of the exhaust fan 253 or exhaust direction, the reflux passage of the steam may by intersected with the dropping collection route of the white water W filtered and dewatered in the paper making section 3 into the white water collect tank 15, and the cooling effect of the white water W may be utilized.

Other structure and operation are same as in preferred embodiment 1.

Preferred Embodiment 11

Figure 33:
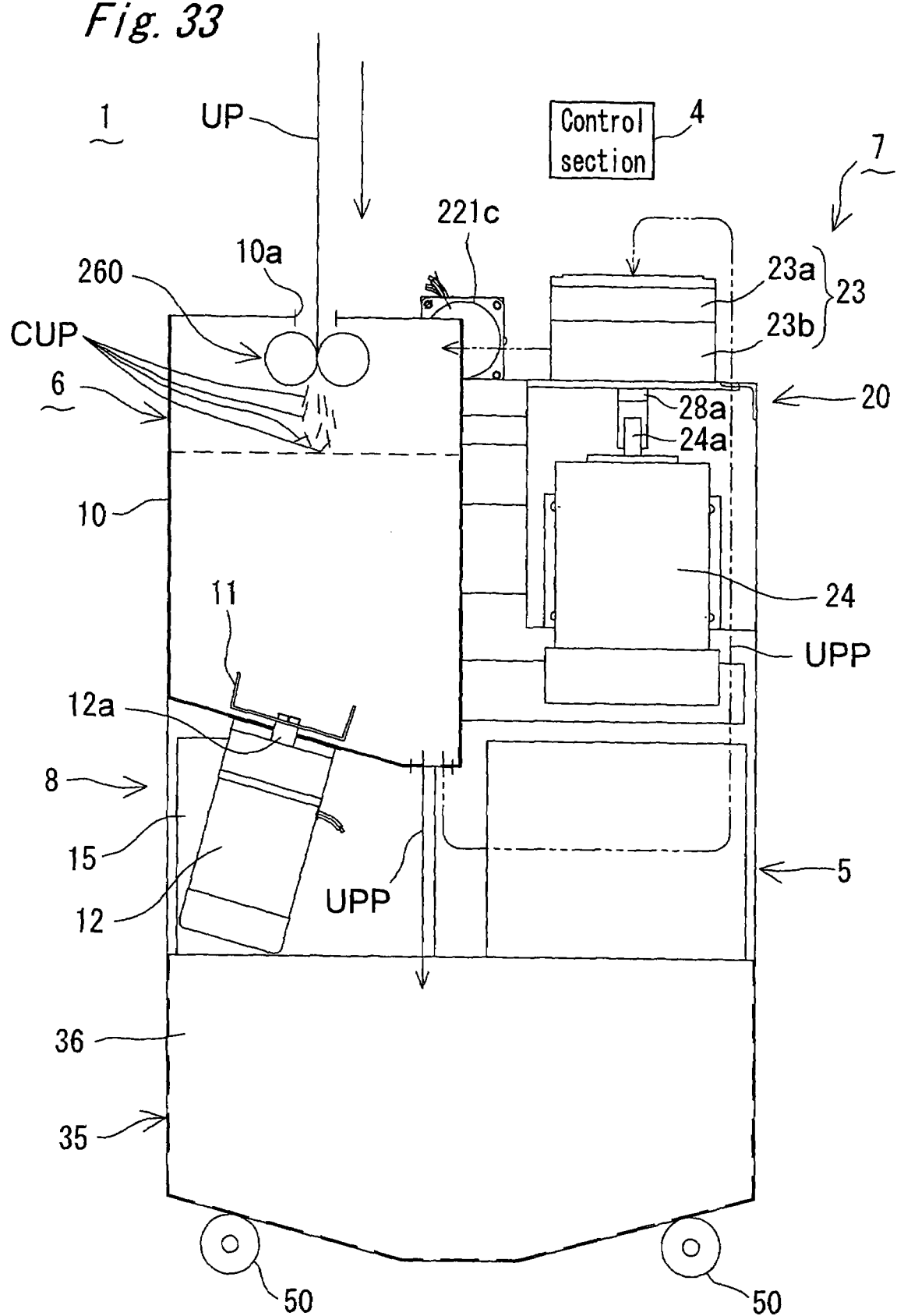
FIG. 33 is a partially magnified sectional view of agitating tank of pulp making section of used paper recycling apparatus in preferred embodiment 11 of the invention.

This preferred embodiment is shown in FIG. 33, and is similar to preferred embodiment 1, except that the used paper recycling apparatus 1 is slightly modified.

In the used paper recycling apparatus 1 of the preferred embodiment, a shredder 260 is provided at the inlet 10a of the agitating tank 10 of the pulp making section 2. The shredder 260 is intended to enhance the efficiency of macerating and mashing by the agitating device 8 by preliminarily shredding the used paper UP, UP, . . . charged into the inlet 10a into small pieces.

The specific structure of the shredder 260 is same as that of the conventional shredder, having functions of cutting used paper UP into small pieces, and the cutting size by the shredding mechanism is designed to satisfy the following condition.

That is, the conventional shredder is designed to cut into a very small size in order to prevent leak of confidential information or private information of the printed characters and patterns effectively by shredding the used paper until the printed characters and patterns are not legible, but the main purpose of shredder 260 of the preferred embodiment is to assist the operation of the apparatus by cutting the used paper pulp UPP manufactured from the cut used paper CUP, CUP, . . . to a size enough as material pulp for recycled paper RP to be manufactured in the paper making section 3 in next process.

For this purpose, the cutting size of shredding mechanism of the shredder 260 is set to such an extent that the paper fiber of cut used paper CUP is not smaller than the required size as material pulp for recycled paper RP. Therefore, as far as this condition is satisfied, the shredding mechanism may be realized by double cut method, cross cut method, and any other method selectively.

When used paper UP is charged from the inlet 10a, the used paper UP is preliminarily cut by the shredder 260, and cut used paper CUP, CUP, . . . of specified size is obtained, and it is agitated for a specified time in the water W supplied from the water feed device 9 by normal and reverse rotation of the agitating impeller 11 of the agitating device 8, and macerated and mashed, and used paper pulp UPP is prepared. The time required for macerating and mashing is shorter than in preferred embodiment 1.

Other structure and operation are same as in preferred embodiment 1.

The foregoing preferred embodiments 1 to 11 are examples showing preferred embodiments of the invention, and the invention is not limited to these preferred embodiments alone, but may be changed and modified within the scope of the true spirit of the invention. The following modified examples are also included in the scope of the invention.

(1) In the foregoing preferred embodiments, the heater plate 109 is used as heating unit of the heating and drying unit 97, and this heater plate 109 may be replaced by rotating heater roll, hot air heater, and other heating means.

Although not shown in the drawing, when the heater roll is used as the heating unit of the heating and drying unit 97, for example, the heater roll is disposed to roll directly on the wet paper RP0 on the smooth surface endless belt 95, and the wet paper RP0 on the smooth surface endless belt 95 may be directly heated and dried by the heater roll.

Alternatively, when the hot air heater is provided as heating unit of the heating and drying unit 97, for example, the hot air heater blows hot air directly to the wet paper RP0 on the smooth surface endless belt 95, and the wet paper RP0 on the smooth surface endless belt 95 is directly heated and dried by the hot air heater.

(2) The specific processing operation by the control section 4 may be executed, by change of program or the like, after the process executed in preferred embodiment 1 (pulp making process of pulp making section 2 and paper making section by paper making section 3), or the design may be properly changed depending on the purpose or processing capacity.

As the invention may be embodied in several forms without departing from the spirit of essential characteristics thereof, the present preferred embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A used paper recycling apparatus comprising, in an apparatus case of furniture size, a pulp making section for manufacturing used paper pulp by macerating and mashing used paper, a paper making section for manufacturing recycled paper by making the used paper pulp manufactured in the pulp making section, and a control section for driving and controlling the pulp making section and paper making section by interlocking, wherein the pulp making section comprises a macerating unit for macerating the used paper by agitating and tearing, and a mashing unit for mashing the used paper macerated in the macerating unit, and the mashing unit has at least one mashing machine, and this mashing machine includes a fixed mashing member and a rotatable mashing member disposed oppositely across a slight mashing clearance between opposing faces of these mashing members that are relatively movable and cooperate to form mashing action surfaces, and the mashing action surfaces are formed in a taper shape gradually increased in diameter toward the mutually opposite directions, and the mashing clearance of conical shape is formed between the mashing action surfaces, the used paper passing the mashing clearance is pressurized and mashed by the mashing action surfaces, to form a used paper pulp, and the mashing unit comprises a feed port and a discharge port communicating with each other allowing circulation of the used paper pulp through the mashing unit, such that used paper pulp passes directly from the discharge port to the macerating unit, and directly from the macerating unit to the feed port.

2. The used paper recycling apparatus of claim 1,
wherein the mashing machine comprises a mashing tank having a feed port and a discharge port communicating with an agitating tank of the macerating section, the plurality of mashing members disposed relatively movably in this mashing tank, and a drive source for relatively moving these mashing members, and the used paper pulp supplied into the feed port of the mashing tank from the agitating tank is pressurized and mashed by the mashing action surface while passing the mashing clearance of the mashing members, and the inks forming characters and patterns on the used paper are pulverized, and returned back to the agitating tank again from the discharge port, of the mashing tank.

3. The used paper recycling apparatus of claim 2,
wherein the mashing section comprises a plurality of mashing machines, the feed port of the mashing machine at the uppermost upstream side communicates with the agitating tank of the macerating section, the discharge port of the mashing machine at the lowermost downstream side communicates with the agitating tank of the macerating section, and the mashing machines interposed between the mashing machines at the mashing machines at the uppermost upstream side and lowermost downstream side have their feed ports communicating with the discharge ports of the mashing machines adjacent to the upstream side, and their discharge ports communicating with the feed ports of the mashing machines adjacent to the downstream side, and the used paper pulp supplied into the feed port of the mashing tank at the uppermost upstream side from the agitating tank is pressurized and mashed by the mashing action surface while sequentially passing through the mashing clearances of the consecutive mashing machines, and the inks forming characters and patterns on the used paper are pulverized, and returned back to the agitating tank of the macerating section again from the discharge port of the mashing tank at the lowermost downstream side.

4. The used paper recycling apparatus of any one of claims 1 to 3,
wherein the pulp making section is a circulation type in which the used paper pulp circulates between the macerating section and the mashing section in a specified time.

5. The used paper recycling apparatus of claim 1,
wherein the water used in the pulp making section is the water collected from the paper making section after dewatering.

6. The used paper recycling apparatus of claim 1,
wherein drive sources of the pulp making section and paper making section are power drive sources driven by general household power source.

7. The used paper recycling apparatus of claim 1,
wherein the apparatus case is provided with moving means, and is movable on the floor.

8. The used paper recycling apparatus of claim 1,
wherein the macerating unit of the pulp making section includes agitating means for agitating used paper, and water feed means for supplying water to this agitating means, and the used paper supplied from the inlet of the apparatus case is agitated in water, and macerated and mashed.

9. The used paper recycling apparatus of claim 8,
wherein the agitating means includes a used paper inlet, an agitating tank for storing the water supplied from the water feed means, an agitating impeller rotatably provided in the agitating tank, and a drive motor for rotating and driving the agitating impeller.

10. The used paper recycling apparatus of claim 9,
wherein a shredder unit is provided at the inlet of the agitating unit, and the water paper charged in the inlet is preliminarily shredded by the shredder unit, and is agitated by the agitating impeller.

11. The used paper recycling apparatus of claim 8,
wherein the water feed means includes a white water collecting tank for collecting white water filtered and dewatered in the paper making section, and a water feed pump for supplying the water in the white water collecting tank to the agitating means of the pulp making section.

12. The used paper recycling apparatus of claim 9,
wherein the pulp making section is disposed at the downstream side of the agitating tank of the macerating section, and has pulp concentration adjusting means for adjusting the concentration of the used paper pulp supplied from the agitating tank, and this pulp concentration adjusting means includes a concentration adjusting tank for storing the used paper pulp supplied from the agitating tank, and concentration adjusting water feed means for supplying water to this concentration adjusting tank, and in the concentration adjusting tank, the used paper pulp supplied from the agitating tank is adjusted in concentration by the water added from the concentration adjusting water feed means, and a pulp suspension of specified concentration is produced.

13. The used paper recycling apparatus of claim 12,
wherein the concentration adjusting tank is designed to produce a pulp suspension of specified concentration by adding water from the concentration adjusting water feed means into the whole volume of the used paper pulp supplied from the agitating tank, and adjusting the total volume of used paper pulp and water may be a specified amount.

14. The used paper recycling apparatus of claim 12,
wherein the concentration adjusting tank is designed to produce a pulp suspension of specified concentration by dividing a specific portion from the whole volume of the waster paper pulp supplied from the agitating tank, adding water from the concentration adjusting water feed means into the divided portion, and adjusting the total volume of divided portion of used paper pulp and water may be a specified amount.

15. The used paper recycling apparatus of any one of claims 12 to 14,
wherein the water feed means for supplying water to the agitating means also has a function as concentration adjusting water feed means.

16. The used paper recycling apparatus of claim 1,
wherein the paper making section includes a paper making net conveyor for making wet paper from mixed slurry pulp suspension of used paper pulp and water sent from the pulp making section, a drying belt conveyor for making recycled paper by drying the wet paper made and formed in the paper making net conveyor, and a dewatering roll for compressing and dewatering the wet paper at the junction of the paper making net conveyor and drying belt conveyor, and is designed to make paper from the pulp suspension supplied from the pulp making section, and dewater and dry.

17. The used paper recycling apparatus of claim 16,
wherein the paper making net conveyor has a mesh endless belt having a specified width for conveying the pulp suspension while making, a drive motor for moving and driving this mesh endless belt, and a pulp feeder for supplying the pulp suspension from the pulp making section onto the mesh endless belt, and
this pulp feeder distributes and supplies the pulp suspension uniformly on the upper surface of the mesh endless belt.

18. The used paper recycling apparatus of claim 17,
wherein in the pulp feeder, the mesh endless belt is disposed obliquely upward toward the running direction, and
the pulp feeder has a partition member slidably disposed on the downside of the mesh endless belt, and a paper making frame slidably disposed on the upside of the mesh endless belt, and
the pulp suspension supplied into the paper making frame is uniformly diffused on the upside of the mesh endless belt by the stagnant action by cooperation of the paper making frame and partition member, and is conveyed together with the mesh endless belt while maintaining the width dimension defined by the paper making frame by the running action of the mesh endless belt, and is dewatered by the gravity filtering action by the mesh cells of the mesh endless belt.

19. The used paper recycling apparatus of claim 18,
wherein the partition member is formed in a louver structure for sliding and supporting the downside of the mesh endless belt.

20. The used paper recycling apparatus of claim 19,
wherein at the base end side position of the partition member, a flat member is provided for supporting the mesh cells of the mesh endless belt in closed state from the lower side, and overflow tank is provided in the paper making frame, and
the pulp suspension supplied in the paper making frame is once stored in the overflow tank, and then overflows and flows down onto the flat member of the partition member.

21. The used paper recycling apparatus of claim 19,
wherein a meandering passage bending up and down is provided in the paper making frame, and at the outlet side position of the passage, a flat member is provided for covering the mesh cells or the mesh endless belt in closed state from the upper side, and
the pulp suspension supplied in the paper making frame passes through the meandering passage, and flows on the flat member.

22. The used paper recycling apparatus of claim 21,
wherein at the leading edge of the flat member of the paper making frame, a thin guide sheet is provided for assuring a smooth flow of pulp suspension on the mesh endless belt, and
the leading edge of this guide sheet is closely disposed at the upper position of the mesh endless belt supported by the beams for forming the louver structure of the partition member.

23. The used paper recycling apparatus of claim 21,
wherein the flat member of the paper making frame is set and disposed in a downward slope of downward inclination toward the running direction of the mesh endless belt.

24. The used paper recycling apparatus of claim 17,
wherein at the upstream side of the pulp feeder, a pulp feed tank is provided for storing the pulp suspension manufactured in the pulp making section, and the pulp suspension in the pulp feed tank is continuously supplied into the paper making frame of the pulp feeder by means of a suspension feed pump.

25. The used paper recycling apparatus of claim 24,
wherein the pulp feed tank includes agitating means for agitating the pulp suspension.

26. The used paper recycling apparatus of claim 16,
wherein the drying belt conveyor includes a smooth surface endless belt having a specified width for receiving and conveying the wet paper sent from the paper making net conveyor, a drive motor for moving and driving the smooth surface endless belt, and a heating and drying unit for heating and drying the wet paper on the smooth surface endless belt, and
at the downstream side position of the dewatering roll, the squeezed and dewatered wet paper on the paper making net conveyor is transferred tightly and conveyed to the downside of the smooth surface endless belt by the smooth surface structure of the smooth surface endless belt.

27. The used paper recycling apparatus of claim 26,
wherein the running speed of the smooth surface endless belt is set larger than running speed of the mesh endless belt, and by difference in speed of the two belts, a tension is applied to the wet paper.

28. The used paper recycling apparatus of claim 26,
wherein the heating and drying unit has at least one heating unit provided along the running route of the smooth surface endless belt, and
the wet paper on the smooth surface endless belt is heated and dried by the heating unit in the process of conveyance.

29. The used paper recycling apparatus of claim 28,
wherein the heating unit is provided at a plurality of positions, and heating temperature of each heating unit can be adjusted individually.

30. The used paper recycling apparatus of claim 26,
wherein the heating unit of the heating and drying unit is formed as a heater plate sliding on the opposite side of the holding side of the wet paper in the smooth surface endless belt, and the wet paper on the smooth surface endless belt is heated and dried indirectly by the smooth surface endless belt heated by the heater plate.

31. The used paper recycling apparatus of claim 26,
wherein the heating unit of the heating and drying unit is formed as a heater roll rolling and rotating on the wet paper on the smooth surface endless belt, and the wet paper on the smooth surface endless belt is heated and dried directly by the heater roll.

32. The used paper recycling apparatus of claim 26,
wherein the heating unit of the heating and drying unit is formed as a hot air heater for blowing hot air to the wet paper on the smooth surface endless belt, and the wet paper on the smooth surface endless belt is heated and dried directly by the hot air heater.

33. The used paper recycling apparatus of claim 26,
wherein the smooth surface endless belt is formed of a flexible heat resistant material capable of withstanding the heating action of the heating and drying unit.

34. The used paper recycling apparatus of claim 33,
wherein the smooth surface endless belt is a fluoroplastic belt.

35. The used paper recycling apparatus of claim 33,
wherein the smooth surface endless belt is a steel belt.

36. The used paper recycling apparatus of claim 16,
wherein the dewatering roll is rolls and squeezes the mesh endless belt of the paper making net conveyor and the smooth surface endless belt of the drying belt conveyor from upper and lower sides, and squeezes and dewaters the wet paper on the mesh endless belt.

37. The used paper recycling apparatus of claim 36,
wherein the dewatering roll includes a dewatering roll rolling on the mesh endless belt from the lower side, a press roll rolling and pressing the smooth surface endless belt together with the dewatering roll from the upper side, and a drive motor for rotating and driving the two rolls in cooperation, and by these two rolls, the mesh endless belt and smooth surface endless belt are rolled and squeezed from upper and lower sides, and the moisture contained in the wet paper on the mesh endless belt is absorbed in the dewatering roll by way of the mesh endless belt.

38. The used paper recycling apparatus of claim 37,
wherein the dewatering roll has a dewatering layer of porous material having fine and continuous pores wound on the outer circumference of a cylindrical roll of high rigidity material.

39. The used paper recycling apparatus of claim 38,
wherein the dewatering roll has a draining roll for squeezing and discharging the moisture contained in its dewatering layer, and this draining roll is rolls on the outer circumference of the dewatering roll in pressurized state, and along with the rotary motion of the dewatering, roll, the draining roll rolls and squeezes the dewatering layer of the dewatering roll, and the moisture absorbed in the dewatering layer is squeezed and discharged.

40. The used paper recycling apparatus of claim 37,
wherein the press roll is a cylindrical roll composed of high rigidity material.

41. The used paper recycling apparatus of claim 17,
wherein at the downstream side of the dewatering roll, a preliminary dewatering roll is disposed to roll on the mesh endless belt from the lower side.

42. The used paper recycling apparatus of claim 41,
wherein the preliminary dewatering roll comprises a dewatering sheet of porous material having fine and continuous pores wound on the outer circumference of a cylindrical roll of high rigidity material.

43. The used paper recycling apparatus of claim 26,
wherein near the upstream side position of the dewatering roll, a slurry preventive roll is disposed for rolling and pressing the smooth surface endless belt from the upper side.

44. The used paper recycling apparatus of claim 43,
wherein the slurry preventive roll is a cylindrical roll of high rigidity material.

45. The used paper recycling apparatus of claim 26,
wherein in the midst of running route of the smooth surface endless belt, a smooth surface finishing roll is disposed for rolling and pressing the wet paper on the smooth surface endless belt.

46. The used paper recycling apparatus of claim 45,
wherein the smooth surface finishing roll is provided in a plurality in parallel to the opposite side of the smooth surface endless belt, relatively to the heating unit provided along the running route of the smooth surface endless belt of the heating and drying unit.

47. The used paper recycling apparatus of claim 46,
wherein crease preventive endless belts are suspended and supported on the plurality of smooth surface finishing rolls so as to be free to rotate and run, and the crease preventive endless belts apply tension while pressing from the upper side to the wet paper on the smooth surface endless belt, and prevent the wet paper from creasing, thereby maintaining smoothness.

48. The used paper recycling apparatus of claim 47,
wherein the running speed of the crease preventive endless belt is set larger than running speed of the smooth surface endless belt, and by difference in speed of the two belts, a tension is applied to the wet paper.

49. The used paper recycling apparatus of claim 47 or 48,
wherein the crease preventive endless belt comprises a permeable material enough to pass and evaporate moisture and steam remaining in the wet paper on the smooth surface endless belt.

50. The used paper recycling apparatus of claim 49,
wherein the crease preventive endless belt is a felt belt.

51. The used paper recycling apparatus of claim 50,
wherein the crease preventive endless belt is a mesh belt having fine mesh cells.

52. The used paper recycling apparatus of claim 50,
wherein the crease preventive endless belt is a belt of mesh base material having fine mesh cells coated with a felt material.

53. The used paper recycling apparatus of claim 45,
wherein the smooth surface finishing roll has a built-in heater, and functions also as heating roll.

54. The used paper recycling apparatus of claim 26,
wherein the heating and drying unit of the drying belt conveyor includes a steam collection unit for collecting the steam generated by heating and drying, and
this steam collection unit has a steam collection chamber formed in the cover of the apparatus case, and an exhaust fan for exhausting the steam collection chamber.

55. The used paper recycling, apparatus of claim 54,
wherein an exhaust duct is extending from the steam collection chamber to the white water collect tank of the water feed means, and an exhaust fan is provided at the exhaust port of the opposite exhaust duct in the white water collect tank, and
the steam collected in the steam collection chamber is circulated and returned to the white water collect tank.

56. The used paper recycling apparatus of claim 55,
wherein a reflux route of steam to the white water collect tank is provided to intersect with drop collection route of filtered and dewatered white water in the white water collect tank.

57. The used paper recycling apparatus of claim 26,
wherein at the downstream side of the heating an drying unit of the smooth surface endless belt, a stripping member is provided for peeling off the dried paper on the smooth surface endless belt.

58. The used paper recycling apparatus of claim 26,
wherein at terminal end of drying belt conveyor, a size cutter is provided for cutting the recycled paper peeled from the smooth surface endless belt to a specified size.

59. The used paper recycling apparatus of claim 16,
wherein in the paper making section, the smooth surface endless belt of the drying belt conveyor and the mesh endless belt of the paper making net conveyor at the upstream side are laminated in upper and lower layers, and
in the vertical adjacent parts of the smooth surface endless belt and mesh endless belt, the dewatering roll squeezes and rolls on the smooth surface endless belt and mesh endless belt from the upper and lower sides.

60. The used paper recycling apparatus of claim 59,
wherein the paper making net conveyor and drying belt conveyor are driven by a common drive source.

61. A pulp manufacturing apparatus of used paper recycling apparatus, being a pulp manufacturing apparatus for manufacturing used paper pulp by macerating and mashing the used paper in a used paper recycling apparatus of furniture size installed at the site of origin of used paper, comprising:
a macerating unit for macerating the used paper by agitating and tearing, and a mashing unit for mashing the used paper macerated in the macerating unit,
wherein the mashing unit has at least one mashing machine, and this mashing, machine includes a fixed mashing member and a rotatable mashing member disposed oppositely across a slight mashing clearance between opposing faces of these mashing members that are relatively movable and cooperate to form mashing action surfaces, and
the mashing action surfaces are formed in a taper shape gradually increased in diameter toward the mutually opposite directions, and the mashing clearance of conical shape is formed between the mashing action surfaces,
the used paper passing the mashing clearance is pressurized and mashed by the mashing action surfaces, to form a used paper pulp, and
the mashing unit comprises a feed port and a discharge port communicating with each other allowing circulation of the used paper pulp through the mashing unit, such that used paper pulp passes directly from the discharge port to the macerating unit, and directly from the macerating unit to the feed port.

62. The pulp manufacturing apparatus of used paper recycling apparatus of claim 61,
wherein the mashing machine comprises a mashing tank having a feed port and a discharge port communicating with an agitating tank of the macerating section, the plurality of mashing members disposed relatively movably in this mashing tank, and a drive source for relatively moving these mashing members, and
the used paper pulp supplied into the feed port of the mashing tank from the agitating tank is pressurized and mashed by the mashing action surface while passing the mashing clearance of the mashing members, and the inks forming characters and patterns on the used paper are pulverized, and returned back to the agitating tank again from the discharge port of the mashing tank.

63. The pulp manufacturing apparatus of used paper recycling apparatus of claim 62,
wherein the mashing section comprises a plurality of mashing machines,
the feed port of the mashing machine at the uppermost upstream side communicates with the agitating tank of the macerating section, the discharge port of the mashing machine at the lowermost downstream side communicates with the agitating tank of the macerating section, and
the mashing machines interposed between the mashing machines at the mashing machines at the uppermost upstream side and lowermost downstream side have their feed ports communicating with the discharge ports of the mashing machines adjacent to the upstream side, and their discharge ports communicating with the feed ports of the mashing machines adjacent to the downstream side, and
the used paper pulp supplied into the feed port of the mashing tank at the uppermost upstream side from the agitating tank is pressurized and mashed by the mashing action surface while sequentially passing through the mashing clearances of the consecutive mashing machines, and the inks forming characters and patterns on the used paper are pulverized, and returned back to the agitating tank of the macerating section again front the discharge port of the mashing tank at the lowermost downstream side.

64. The pulp manufacturing apparatus of used paper recycling apparatus of claim 62,
wherein the mashing machine includes a fixed mashing member fixed to the inside of the mashing tank, a rotating mashing member provided oppositely to the fixed mashing member, and a rotary drive source for rotating and driving the rotating mashing member, and
an inlet communicating with the feed port of the mashing tank is formed near the center of the mashing action surface of the fixed mashing member, and the annular clearance formed between the outer peripheral edges of the mashing action surfaces of the both mashing members is an outlet communicating with the discharge port of the mashing tank.

65. The pulp manufacturing apparatus of used paper recycling apparatus of claim 64,
wherein the opposing mashing action surfaces of the both mashing members are grindstone surfaces having multiple abrasive grains coupled by a binding material, and
these two mashing action surfaces are formed in a taper shape gradually increased in diameter toward the mutually opposite directions, and mashing clearances of conical shape are formed between them.

66. The pulp manufacturing apparatus of used paper recycling apparatus of claim 65,
wherein the mashing action surface at the rotating mashing member side has a plurality of guide ribs for guiding the used paper pulp flowing in from the inlet to the outlet.

67. The pulp manufacturing apparatus of used paper recycling apparatus of claim 64,
wherein the opposing mashing action surfaces of the both mashing members are formed in a flat plane having multiple mashing grooves, and a mashing clearance formed in parallel at as close direction are provided between these mashing action surfaces.

68. The pulp manufacturing apparatus of used paper recycling apparatus of claim 64,
wherein the opposing mashing action surfaces of the both mashing members are formed in a taper shape gradually increased in diameter downward, and a plurality of mashing grooves are provided, and mashing clearance formed of parallel conical planes at close distance are formed between these two mashing action surfaces.

69. The pulp manufacturing apparatus of used paper recycling apparatus of any one of claims 64 to 67,
wherein on the outer circumference of the rotating mashing member, blades are formed at specified intervals in the peripheral direction for acting as a pump for forcing out the used paper pulp from the outlet to the discharge port of the mashing tank.

70. The pulp manufacturing apparatus of used paper recycling apparatus of claim 62,
wherein the mashing machine includes a fixed mashing member fixed to the inside of the mashing tank, a movable mashing member provided parallel and oppositely to the fixed mashing member, and a reciprocating drive source for moving the moving mashing member back and forth.

71. The pulp manufacturing apparatus of used paper recycling apparatus of claim 62,
wherein the mashing machine includes a pair of fixed mashing members fixed to the upper and lower inside of the mashing tank, a rotating mashing member provided oppositely to these two fixed mashing members between the two fixed mashing members, and a rotary drive source for rotating and driving the rotating mashing member, and
an inlet communicating with the feed port of the mashing tank is formed near the center of the mashing action surface of the upper fixed mashing member, and two annular clearances formed between the outer peripheral edges of the mashing action surfaces of the three mashing members are outlets communicating with the discharge port of the mashing tank, and the mutually opposite mashing action surfaces of the mashing members are grindstone surfaces having multiple abrasive grains coupled by a binding material, and
these two mashing action surfaces are formed in a taper shape gradually increased in diameter toward the mutually opposite directions, and mashing clearances of conical shape are formed between them.

72. The pulp manufacturing apparatus of used paper recycling apparatus of claim 71,
wherein near the center of the rotating mashing member, blades are formed at specified intervals in the peripheral direction for passing the used paper pulp from the inlet into the upper and lower mashing clearances and forcing out toward the outlet.

73. The pulp manufacturing apparatus of used paper recycling apparatus of any one of claims 61 to 63,
wherein the pulp making section is a circulation type in which the used paper pulp circulates between the macerating section and the mashing section in a specified time.

74. The pulp manufacturing apparatus of used paper recycling apparatus of claim 61,
wherein the macerating unit of the pulp making section includes agitating means for agitating used paper, and water feed means for supplying water to this agitating means, and
the used paper supplied from the inlet of the apparatus case is agitated in water, and macerated and mashed.

75. The pulp manufacturing apparatus of used paper recycling apparatus of claim 74,
wherein the agitating means includes a used paper inlet, an agitating tank for storing the water supplied from the water feed means, an agitating impeller rotatably provided in the agitating tank, and a drive motor for rotating and driving the agitating impeller.

76. The pulp manufacturing apparatus of used paper recycling apparatus of claim 75,
wherein a shredder is provided at the inlet of the agitating tank, and the used paper supplied in the inlet is preliminarily shredded by the shredder, and is agitated by the agitating impeller.

77. The used paper recycling apparatus of claim 1 comprising a pulp concentration adjusting apparatus for adjusting the concentration of used paper pulp provided in a pulp manufacturing apparatus for manufacturing used paper pulp by macerating and mashing the used paper, in a used paper recycling apparatus of furniture size installed at the site of origin of used paper, and the pulp concentration adjusting apparatus comprising:
a concentration adjusting tank for storing the used paper pulp manufactured in the pulp manufacturing apparatus, and concentration adjusting water feed means for supplying water into the concentration adjusting tank,
wherein the concentration of the used paper pulp supplied from the agitating tank is adjusted in the concentration adjusting tank by the water supplied from the concentration adjusting water feed means, and a pulp suspension of specified concentration is prepared.

78. The used paper recycling apparatus of claim 77,
wherein in the concentration adjusting tank, in the whole volume of used paper pulp supplied from the agitating tank, water is added from the concentration adjusting water feed means, and when the total volume of used paper pulp and water becomes a specified value, the pulp suspension is adjusted to the specified concentration.

79. The used paper recycling apparatus of claim 77,
wherein in the concentration adjusting tank, a specified portion is dispensed from the whole volume of used paper pulp supplied from the agitating tank, water is added to the specified dispensed portion from the concentration adjusting water feed means, and when the total volume of specified dispensed portion of used paper pulp and water becomes a specified value, the pulp suspension is adjusted to the specified concentration.

80. The used paper recycling apparatus of claim 79,
wherein the concentration adjusting tank includes a pulp dispensing tank for dispensing a specified amount from the whole volume of used paper pulp supplied from the agitating tank, and a water storage tank receiving a specific volume of water corresponding to the dispensed amount of used paper pulp from the concentration adjusting water feed means, and the used paper pulp in the pulp dispensing tank is supplied and mixed in the water in the water storage tank, and the pulp suspension is adjusted to the specified concentration.

81. The used paper recycling apparatus of any one of claims 77 to 80,
wherein the water feed means for supplying water into the agitating means functions also as the concentration adjusting water feed means.

82. The used paper recycling apparatus of claim 1, comprising a paper making apparatus for manufacturing recycled paper from the used paper pulp manufactured in the pulp making section in the preceding process, in a used paper recycling apparatus of furniture size installed at the site of origin of used paper, and the paper making apparatus comprising:
a paper making net conveyor for manufacturing wet paper from slurry pulp suspension in mixture of water and used paper pulp sent from the pulp making section,
a drying belt conveyor for manufacturing recycled paper by drying the wet paper manufactured in the paper making net conveyor, and
a dewatering roll for squeezing and dewatering the wet paper at the junction of the paper making net conveyor and dewatering roll,
wherein the pulp suspension supplied from the pulp making section is manufactured, dewatered and dried.

83. The used paper recycling apparatus of claim 82,
wherein the paper making net conveyor has a mesh endless belt having a specified width for conveying the pulp suspension while making, a drive motor for moving and driving this mesh endless belt, and a pulp feeder for supplying the pulp suspension from the pulp making section onto the mesh endless belt, and
this pulp feeder distributes and supplies the pulp suspension uniformly on the upper surface of the mesh endless belt.

84. The used paper recycling apparatus of claim 83,
wherein at the upstream side of the pulp feeder, a pulp feed tank is provided for storing the pulp suspension manufactured in the pulp making section, and the pulp suspension in this pulp feed tank is continuously supplied into the paper making frame of the pulp feeder by a suspension feed pump.

85. The used paper recycling apparatus of claim 82,
wherein the drying belt conveyor has a smooth surface endless belt having a specified width for receiving and conveying the wet paper sent from the paper making net conveyor, a drive motor for moving and driving the smooth surface endless belt, and a heating and drying unit for heating and drying the wet paper on the smooth surface endless belt, and
at the downstream side position of the dewatering roll, the squeezed and dewatered wet paper on the paper making net conveyor is transferred tightly and conveyed to the downside of the smooth surface endless belt by the smooth surface structure of the smooth surface endless belt.

86. The used paper recycling apparatus of claim 85,
wherein the running speed of the smooth surface endless belt is set larger than running speed of the mesh endless belt of the paper making net conveyor.

87. The used paper recycling apparatus of claim 82,
wherein the heating and drying unit has at least one heating unit provided along the running route of the smooth surface endless belt, and
the wet paper on the smooth surface endless belt is heated and dried by the heating unit in the process of conveyance.

88. The used paper recycling apparatus of claim 82,
wherein the dewatering roll is rolls and squeezes the mesh endless belt of the paper making net conveyor and the smooth surface endless belt of the drying belt conveyor from upper and lower sides, and squeezes and dewaters the wet paper on the mesh endless belt.

89. The used paper recycling apparatus of claim 88,
wherein the dewatering roll includes a dewatering roll rolling on the mesh endless belt from the lower side, a press roll rolling and pressing the smooth surface endless belt together with the dewatering roll from the upper side, and a drive motor for rotating and driving the two rolls in cooperation, and by these two rolls, the mesh endless belt and smooth surface endless belt are rolled and squeezed from upper and lower sides, and the moisture contained in the wet paper on the mesh endless belt is absorbed in the dewatering roll by way of the mesh endless belt.

90. The used paper recycling apparatus of claim 85,
wherein a smooth surface finishing roll is disposed for rolling and press the wet paper on the smooth surface endless belt while the smooth surface endless belt is running.

91. The used paper recycling apparatus of claim 90,
wherein a plurality of smooth surface finishing rolls are disposed in parallel to the opposite side of the smooth surface endless belt, to the heating unit provided along the running route of the smooth surface endless belt of the heating and drying unit.

92. The used paper recycling apparatus of claim 90,
wherein crease preventive endless belts are suspended and supported on the plurality of smooth surface finishing rolls so as to be free to rotate and run, and
the crease preventive endless belts apply tension while pressing, from the upper side to the wet paper on the smooth surface endless belt, and prevent the wet paper from creasing, thereby maintaining smoothness.

93. The used paper recycling apparatus of claim 92,
wherein the running speed of the crease preventive endless belt is set larger than running speed of the smooth surface endless belt, and by difference in speed of the two belts, a tension is applied to the wet paper.

94. The used paper recycling apparatus of claim 93,
wherein the crease preventive endless belt comprises a permeable material enough to pass and evaporate moisture and steam remaining in the wet paper on the smooth surface endless belt.

95. The used paper recycling apparatus of claim 94,
wherein the crease preventive endless belt is a felt belt.

96. The used paper recycling apparatus of claim 94,
wherein the crease preventive endless belt is a mesh belt having fine mesh cells.

97. The used paper recycling apparatus of claim 94,
wherein the crease preventive endless belt is a belt of mesh base material of fine mesh cells coated with a felt material.

98. The used paper recycling apparatus of claim 85,
wherein at terminal end of drying belt conveyor, a size cutter is provided for cutting the recycled paper peeled from the smooth surface endless belt to a specified size.

99. The used paper recycling apparatus of claim 82,
wherein the paper making net conveyor and drying belt conveyor are driven by a common drive source.

100. The used paper recycling apparatus of claim 1, comprising a pulp feeder of the paper making apparatus for manufacturing recycled paper from the used paper pulp manufactured in the pulp making section in the preceding process, in a used paper recycling apparatus of furniture size installed at the site of origin of used paper, and the pulp feeder comprising:
a partition member slidably disposed on the downside of the running mesh endless belt of the paper making net conveyor, and
a paper making frame slidably disposed on the upside of the mesh endless belt for defining the fled width of slurry pulp suspension in a mixture of water and used paper pulp sent from the pump making section,
wherein a meandering passage bending up and down is provided in the paper making frame, and at the outlet side position of the passage, a flat member is provided for covering the mesh cells of the mesh endless belt in closed state from the upper side, and
the pulp suspension supplied in the paper making frame passes through the meandering passage, and flows on the flat member and stays, and is diffused and supplied uniformly on the upside of the running mesh endless belt disposed in an upward slope toward the running direction.

101. The used paper recycling apparatus of claim 100,
wherein the partition member is formed in a louver structure for sliding and supporting the downside of the mesh endless belt.

102. The used paper recycling apparatus of claim 100,
wherein the paper making frame has a flat U-shaped main body frame opened at the leading end side in the running direction of the mesh endless belt, a plurality of gate members for composing the passage in the main body frame, and a flat member.

103. The used paper recycling apparatus of claim 102,
wherein since the plurality of gate members are provided upright in the main body frame, the passage is bent up and down, and the forwarding direction of the passage is extended upward from the inlet, and extended upward toward the outlet.

104. The used paper recycling apparatus of claim 103, wherein near the inlet of the passage, a partition board is provided, a plurality of through-holes are opened in the partition board at specified intervals, and of the gate members provided upright in the main body frame, the upper edge of the gate member forming the partition at the changing point from upward to downward direction of the passage is set to be lower than the water level of the pulp suspension flowing and staying on the flat member.

105. The used paper recycling apparatus of claim 102, wherein the main body frame has its inside width determined at the width of the recycled paper to be manufactured, and the feed width of the pulp suspension is defined, and its lower end is disposed to slide on the upside of the obliquely running mesh endless belt.

106. The used paper recycling apparatus of claim 101, wherein at the leading edge of the flat member of the paper making frame, a thin guide sheet is provided for assuring a smooth flow of pulp suspension on the mesh endless belt, and the leading edge of this guide sheet is closely disposed at the upper position of the mesh endless belt supported by the beams for forming the louver structure of the partition member.

107. The used paper recycling apparatus of claim 100, wherein the flat member of the paper making frame is set and disposed in a downward slope of downward inclination toward the running direction of the mesh endless belt.

\* \* \* \* \*